(12) United States Patent
Myung et al.

(10) Patent No.: US 12,587,305 B2
(45) Date of Patent: Mar. 24, 2026

(54) APPARATUS AND METHOD FOR TRANSMITTING AND RECEIVING CONTROL INFORMATION AND DATA IN COMMUNICATION SYSTEM

(71) Applicant: SAMSUNG ELECTRONICS CO., LTD., Suwon-si (KR)

(72) Inventors: Seho Myung, Suwon-si (KR); Kyungjoong Kim, Suwon-si (KR); Younsun Kim, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/772,094

(22) Filed: Jul. 12, 2024

(65) Prior Publication Data

US 2024/0388378 A1 Nov. 21, 2024

Related U.S. Application Data

(63) Continuation of application No. PCT/KR2023/000670, filed on Jan. 13, 2023.

(30) Foreign Application Priority Data

Jan. 14, 2022 (KR) ........................ 10-2022-0005960

(51) Int. Cl.
*H04L 1/00* (2006.01)
*H04L 1/08* (2006.01)
*H04L 5/00* (2006.01)

(52) U.S. Cl.
CPC .............. *H04L 1/0004* (2013.01); *H04L 1/08* (2013.01); *H04L 5/0044* (2013.01)

(58) Field of Classification Search
CPC .... H04B 7/0632; H04B 7/088; H04B 7/0695; H04B 7/06964; H04L 25/0204;
(Continued)

(56) References Cited

U.S. PATENT DOCUMENTS 8,238,302 B2 8/2012 Ahn et al.
9,203,589 B1 * 12/2015 Perets ................... H04L 5/0048
(Continued)

FOREIGN PATENT DOCUMENTS

EP 2615762 A1 7/2013
EP 3462654 A1 4/2019
(Continued)

OTHER PUBLICATIONS

International Search Report & Written Opinion for PCT/KR2023/000670 by Korean Intellectual Property Office dated Apr. 24, 2023.
(Continued)

*Primary Examiner* — Dung B Huynh
(74) *Attorney, Agent, or Firm* — Jefferson IP Law, LLP

(57) ABSTRACT

The present disclosure relates to a communication system, such as a 5G or 6G communication system, capable of supporting higher data transmission rates. Methods and associated devices for transmitting information in a wireless communication system, according to embodiments of the present disclosure, include, but are not limited to, a method for configuring a CQI table, a method for configuring an MCS table, methods for determining related LBRM, PT-RS and system-supported maximum data rates, and a method for determining MCS for retransmission.

12 Claims, 17 Drawing Sheets

(58) Field of Classification Search
CPC ... H04L 1/0003; H04L 1/0004; H04L 1/0009;
H04L 1/0016; H04L 1/0026; H04L 1/08;
H04L 1/1671; H04L 1/1812; H04L
1/1822; H04L 1/1845; H04L 1/1864;
H04L 27/34; H04L 5/0044
See application file for complete search history.

(56) References Cited

U.S. PATENT DOCUMENTS

| | | | |
|---|---|---|---|
| 10,616,031 B2 | 4/2020 | Yang et al. | |
| 10,887,791 B2 | 1/2021 | Sun et al. | |
| 11,528,091 B2* | 12/2022 | Lee | H04L 1/0011 |
| 12,021,612 B2 | 6/2024 | Inohiza | |
| 2010/0215109 A1* | 8/2010 | Onggosanusi | H04L 1/06 375/260 |
| 2010/0278225 A1* | 11/2010 | Chun | H04L 5/0007 375/295 |
| 2013/0182653 A1* | 7/2013 | Earnshaw | H04L 1/1822 370/329 |
| 2013/0235808 A1* | 9/2013 | Earnshaw | H04L 1/1887 370/329 |
| 2013/0343290 A1* | 12/2013 | Ren | H04L 1/0015 370/329 |
| 2014/0087744 A1* | 3/2014 | Yang | H04W 76/23 455/450 |
| 2014/0126551 A1* | 5/2014 | Nammi | H04L 1/1819 370/336 |
| 2014/0269454 A1* | 9/2014 | Papasakellariou | H04W 72/23 370/280 |
| 2015/0195818 A1 | 7/2015 | Davydov et al. | |
| 2016/0128032 A1* | 5/2016 | Wang | H04W 72/23 370/329 |
| 2016/0192385 A1* | 6/2016 | Tooher | H04L 5/0051 370/336 |
| 2016/0226623 A1* | 8/2016 | Fröberg Olsson | H04B 7/0626 |
| 2016/0302105 A1* | 10/2016 | Damnjanovic | H04W 28/065 |
| 2016/0337150 A1* | 11/2016 | Larsson | H04L 1/0025 |
| 2017/0070374 A1 | 3/2017 | Nakamura et al. | |
| 2017/0126378 A1* | 5/2017 | Luo | H04L 1/0007 |
| 2017/0135098 A1* | 5/2017 | Kang | H04W 4/70 |
| 2017/0295584 A1* | 10/2017 | Uchino | H04L 1/1822 |
| 2018/0070265 A1* | 3/2018 | Seo | H04W 52/48 |
| 2018/0160155 A1* | 6/2018 | Iguchi | H04N 21/8451 |
| 2018/0270022 A1* | 9/2018 | Sun | H04L 1/1614 |
| 2019/0007959 A1* | 1/2019 | Hwang | H04W 72/23 |
| 2019/0013900 A1* | 1/2019 | Patel | H04L 1/0041 |
| 2019/0037437 A1* | 1/2019 | Sun | H03M 13/356 |
| 2019/0045390 A1 | 2/2019 | Davydov et al. | |
| 2019/0104525 A1* | 4/2019 | Santhanam | H04W 72/02 |
| 2019/0158230 A1* | 5/2019 | Chen | H04L 1/1812 |
| 2019/0208510 A1* | 7/2019 | Park | H04W 52/34 |
| 2019/0222360 A1* | 7/2019 | Nam | H04W 28/06 |
| 2019/0246378 A1* | 8/2019 | Islam | H04L 1/1819 |
| 2019/0306876 A1* | 10/2019 | Golitschek Edler von Elbwart | H04L 5/0055 |
| 2019/0349978 A1* | 11/2019 | Lin | H04L 1/0023 |
| 2019/0356415 A1* | 11/2019 | Peng | H04L 1/0052 |
| 2019/0394758 A1* | 12/2019 | Cheng | H04W 24/08 |
| 2020/0021391 A1* | 1/2020 | Rico Alvarino | H04W 8/24 |
| 2020/0037317 A1* | 1/2020 | Guo | H04L 5/0092 |
| 2020/0059327 A1* | 2/2020 | Kini | H04L 5/0055 |
| 2020/0067628 A1* | 2/2020 | Xu | H04L 1/0004 |
| 2020/0351008 A1* | 11/2020 | Shao | H04L 1/0026 |
| 2020/0389280 A1* | 12/2020 | Li | H04L 1/1896 |
| 2020/0396024 A1* | 12/2020 | Ganesan | H04L 1/1864 |
| 2020/0412431 A1* | 12/2020 | Park | H04B 7/0469 |
| 2021/0034261 A1* | 2/2021 | Danilov | G06F 3/0664 |
| 2021/0105746 A1* | 4/2021 | Sarkis | H04L 1/1812 |
| 2021/0144738 A1* | 5/2021 | Yoshioka | H04L 5/0094 |
| 2021/0160826 A1* | 5/2021 | Bae | H04W 72/23 |
| 2021/0226737 A1* | 7/2021 | Huang | H04W 52/0229 |
| 2021/0250150 A1 | 8/2021 | Wu et al. | |
| 2021/0250871 A1* | 8/2021 | Rico Alvarino | H04W 52/365 |
| 2021/0298062 A1* | 9/2021 | Huang | H04W 72/23 |
| 2021/0306988 A1* | 9/2021 | Wang | H04L 1/0008 |
| 2021/0320759 A1* | 10/2021 | Lee | H04L 1/1896 |
| 2021/0352527 A1* | 11/2021 | Sridharan | H04L 1/1822 |
| 2022/0007436 A1* | 1/2022 | Xu | H04W 74/0841 |
| 2022/0046739 A1* | 2/2022 | Huang | H04L 5/0007 |
| 2022/0060276 A1* | 2/2022 | Chen | H04L 1/1867 |
| 2022/0086853 A1* | 3/2022 | Xiao | H04L 1/1893 |
| 2022/0104263 A1* | 3/2022 | Dutta | H04W 74/0808 |
| 2022/0150000 A1* | 5/2022 | Liu | H04W 28/06 |
| 2022/0158753 A1* | 5/2022 | Hwang | H04W 4/40 |
| 2022/0167236 A1* | 5/2022 | Melodia | H04W 28/24 |
| 2022/0174697 A1* | 6/2022 | Jung | H04L 1/1896 |
| 2022/0232613 A1* | 7/2022 | Gao | H04L 1/1887 |
| 2022/0232643 A1* | 7/2022 | Matsumura | H04W 74/0833 |
| 2022/0279551 A1* | 9/2022 | Liu | H04W 72/0446 |
| 2022/0322411 A1* | 10/2022 | Matsumura | H04W 72/23 |
| 2022/0353010 A1* | 11/2022 | Oved | H04W 72/20 |
| 2022/0353044 A1* | 11/2022 | Peng | H04L 1/18 |
| 2022/0353946 A1* | 11/2022 | Kanamarlapudi | H04W 72/23 |
| 2022/0376816 A1* | 11/2022 | Yoshioka | H04L 1/0016 |
| 2023/0065698 A1* | 3/2023 | Yang | H04W 72/23 |
| 2023/0114373 A1* | 4/2023 | Pick | H04L 1/0003 370/329 |
| 2023/0118778 A1* | 4/2023 | Pick | H04L 1/201 370/329 |
| 2023/0141159 A1* | 5/2023 | Sundararajan | H04L 1/189 370/329 |
| 2023/0170950 A1* | 6/2023 | Zhang | H04B 7/0456 375/262 |
| 2023/0208568 A1* | 6/2023 | Yuan | H04L 1/08 714/726 |
| 2023/0254069 A1* | 8/2023 | Lee | H04L 1/0009 370/252 |
| 2023/0283429 A1* | 9/2023 | Park | H04L 1/1854 370/329 |
| 2023/0291531 A1* | 9/2023 | Kim | H04L 5/0091 |
| 2023/0318735 A1* | 10/2023 | Mu | H04L 1/0003 370/329 |
| 2024/0121025 A1* | 4/2024 | Zhang | H04L 1/0016 |
| 2024/0146443 A1* | 5/2024 | Gao | H04L 1/0009 |
| 2024/0154761 A1* | 5/2024 | Xiong | H04L 1/0009 |
| 2024/0172224 A1* | 5/2024 | Xiong | H04W 72/21 |
| 2024/0284440 A1* | 8/2024 | Sarkis | H04L 1/189 |
| 2024/0406936 A1* | 12/2024 | Lee | H04L 1/0003 |

FOREIGN PATENT DOCUMENTS

| | | |
|---|---|---|
| EP | 3843305 A1 | 6/2021 |
| EP | 3861651 A1 | 8/2021 |
| KR | 10-1456004 B1 | 11/2014 |
| KR | 10-1502255 B1 | 3/2015 |
| KR | 10-2018-0136850 A | 12/2018 |
| KR | 10-2020-0033262 A | 3/2020 |
| KR | 10-2021-0118134 A | 9/2021 |
| KR | 10-2022-0018867 A | 2/2022 |
| WO | 2021/029440 A1 | 2/2021 |

OTHER PUBLICATIONS

3GPP TS 36.211 V16.7.0 "3rd Generation Partnership Project; Technical Specification Group Radio Access Network; Evolved Universal Terrestrial Radio Access (E-UTRA); Physical channels and modulation," Release 16. Sep. 2021.
3GPP TS 36.213 V16.7.0 "3rd Generation Partnership Project; Technical Specification Group Radio Access Network; Evolved Universal Terrestrial Radio Access (E-UTRA); Physical layer procedures," Release 16. Sep. 2021.
3GPP TSG RAN Meeting #88e "New WID on Introduction of DL 1024QAM for NR FR1," RP-201156. Jun. 2020.
Nimbalker, Ajit "LS on Introduction of DL 1024QAM for NR," 3GPP TSG-RAN WG1 Meeting #104-e, R1-2102088. Jan. 2021.
3GPP TS 38.214 V16.7.0 "3rd Generation Partnership Project; Technical Specification Group Radio Access Network; NR; Physical layer procedures for data," Release 16. Sep. 2021.
3GPP TS 38.212 V16.7.0 "3rd Generation Partnership Project; Technical Specification Group Radio Access Network; NR; Multiplexing and channel coding," Release 16. Sep. 2021.

(56)     References Cited

OTHER PUBLICATIONS

3GPP TS 38.306 V16.6.0 "3rd Generation Partnership Project; Technical Specification Group Radio Access Network; NR; User Equipment (UE) radio access capabilities," Release 16. Sep. 2021.
3GPP TS 38.201 V16.0.0 "3rd Generation Partnership Project; Technical Specification Group Radio Access Network; NR; Physical layer; General description," Release 16. Sep. 2019.
3GPP TS 38.211 V16.7.0 "3rd Generation Partnership Project; Technical Specification Group Radio Access Network; NR; Physical channels and modulation," Release 16. Sep. 2021.
3GPP TSG RAN WG1 #104-e "1024-QAM for NR DL," R1-2101564. Jan. 2021.
Extended European Search Report for EP 23740506.3 by European Patent Office dated Feb. 24, 2025.
Mediatek Inc., "On the issues of BG selection", 3GPP TSG RAN WG1 Meeting #91, R1-1721543, Dec. 2017.
Qualcomm Incorporated, "LDPC base graph determination and indication", 3GPP TSG RAN WG1 #90, R1-1713463, Aug. 2017.

* cited by examiner

Backhaul communication unit 220

Storage unit 230

Controller 240

Wireless communication unit 210

...

APPARATUS AND METHOD FOR TRANSMITTING AND RECEIVING CONTROL INFORMATION AND DATA IN COMMUNICATION SYSTEM

CROSS-REFERENCE TO RELATED APPLICATIONS

This application is a continuation of and, under 35 USC § 119(a), claims the benefit of International Application PCT/KR2023/000670, filed on Jan. 13, 2023, which itself claims the benefit of Korean Patent Application No. 10-2022-0005960, filed on Jan. 14, 2022, the entire disclosures of both of these applications are hereby incorporated herein in their entirety by reference for all purposes.

TECHNICAL FIELD

The present disclosure relates generally to a communication or broadcasting system and, more specifically, to an apparatus and method for transmitting and receiving control and data information, for example, in a communication or broadcasting system.

BACKGROUND 5G mobile communication technologies define broad frequency bands such that high transmission rates and new services are possible, and can be implemented not only in "Sub 6 GHz" bands such as 3.5 GHz, but also in "Above 6 GHz" bands, referred to as mmWave, including 28 GHz and 39 GHz. In addition, implementing 6G mobile communication technologies (referred to as Beyond 5G systems) in terahertz bands (for example, 95 GHz to 3 THz bands) can accomplish greater transmission rates, for example, rates fifty times faster than 5G mobile communication technologies and ultra-low latencies, for example, latencies one-tenth of 5G mobile communication technologies.

In order to support services and to satisfy performance requirements in connection with enhanced Mobile Broad-Band (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance-enhancement of initial 5G mobile communication technologies in view of services to be supported by 5G mobile communication technologies, and there has been physical layer standardization regarding technologies, such as: V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there is ongoing standardization in air interface architecture/protocol regarding technologies such as Industrial Internet of Things (IIoT) for supporting new services through interworking and convergence with other industries, for example: IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also is ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, exponentially increasing numbers of connected devices will be connected to communication networks, and it is expected that enhanced functions and performances of 5G mobile communication systems and integrated operations of connected devices will become necessary. To this end, new research is scheduled in connection with eXtended Reality (XR) for efficiently supporting AR (Augmented Reality), VR (Virtual Reality), MR (Mixed Reality) and the like, 5G performance improvement, and complexity reduction, by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE

The disclosure provides a device and a method for generating (and/or configuring) a modulation and coding scheme (MCS) table and a channel quality indicator (CQI) used for supporting of 4096 quadrature amplitude modulation (QAM) in a communication system.

The disclosure provides methods of determining associated limited buffer rate matching (LBRM), a phase tracking reference signal (PT-RS), and/or a processing time when support of 4096 quadrature amplitude modulation (QAM) is allowed in the communication system.

A method for transmitting and receiving information in a wireless communication system according to an embodiment of the disclosure may include designing a channel quality indicator (CQI) table to transmit channel state information (CSI), and configuring and using the designed CQI table.

In addition, the method may include designing a CQI table designed when 4096 QAM is supported, or using the designed CQI table.

In addition, the method may include determining or configuring an appropriate MCS by using a designed MCS table or an appropriate MCS table corresponding to the CQI table.

In addition, the determining or configuring of the MCS may be applied retransmission as well as initial transmission.

The determining of the MCS table may be determined based on the configured CQI table and a CQI index.

A base station or a terminal for receiving channel state information (CSI) in a wireless communication system according to an embodiment of the disclosure may include a transceiver, and a controller connected to the transceiver so as to control the transceiver, and configured to identify a configured CQI table, and configure an appropriate MCS table and an MCS index included in the MCS table, based on the identified CQI table and a configured CQI index, so as to perform control to determine a code rate and a modulation order for data transmission.

In addition, in the wireless communication system, the base station or the terminal includes multiple CQI tables and MCS tables, wherein at least two of the multiple CQI tables and MCS tables have different maximum modulation orders respectively.

In particular, at least one of the CQI tables and MCS tables may have a maximum modulation order of 12, that is, a value indicating 4096-QAM.

Advantageous Effects

According to an embodiment of the disclosure, when communication is performed between a base station and a terminal, more efficient communication may be possible by using an appropriate channel quality indicator (CQI) table or modulation coding scheme (MCS) table from multiple CQI tables and MCS tables.

According to an embodiment of the disclosure, when communication is performed between the base station and the terminal, efficient communication may be possible by supporting 4096 quadrature amplitude modulation (QAM).

According to an embodiment of the disclosure, more efficient communication may be possible by configuring an appropriate MCS for retransmission.

Advantageous effects obtainable from the disclosure are not limited to the above-mentioned effects, and other effects which are not mentioned may be clearly understood, through the following descriptions, by those skilled in the art to which the disclosure pertains.

BRIEF DESCRIPTION OF DRAWINGS

FIG. 2 illustrates a configuration of a base station in the wireless communication system according to an embodiment of the disclosure;

4

Figure 3:
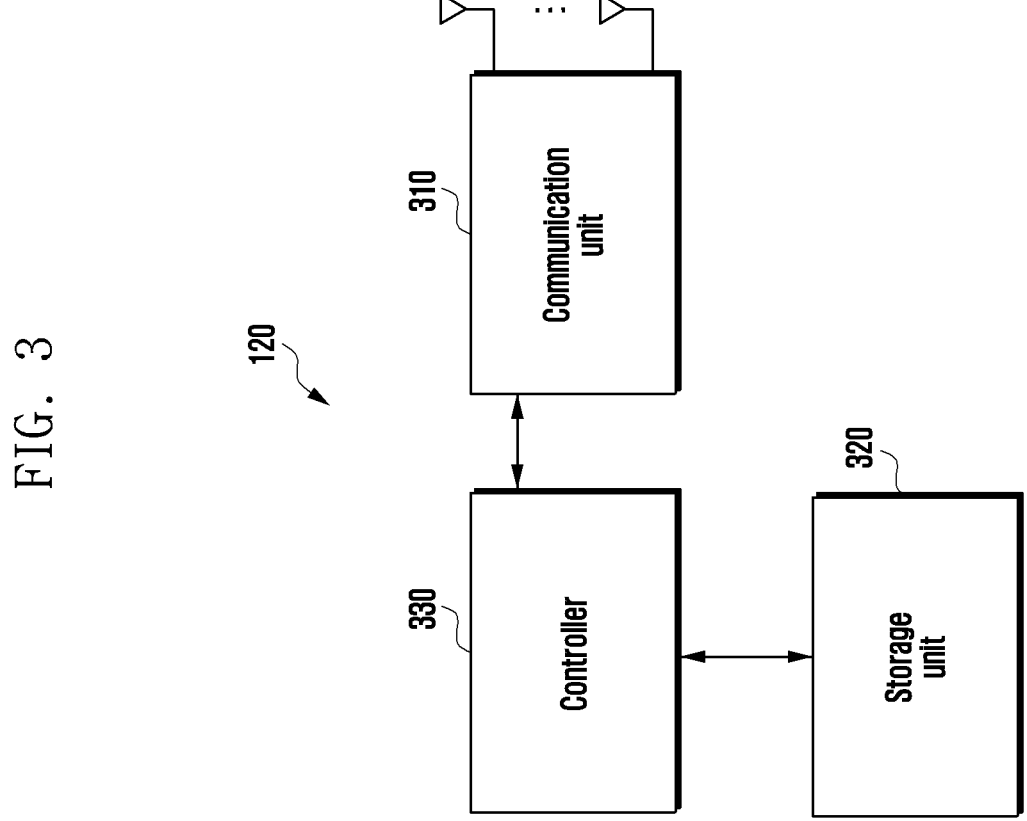
Figure 4A:
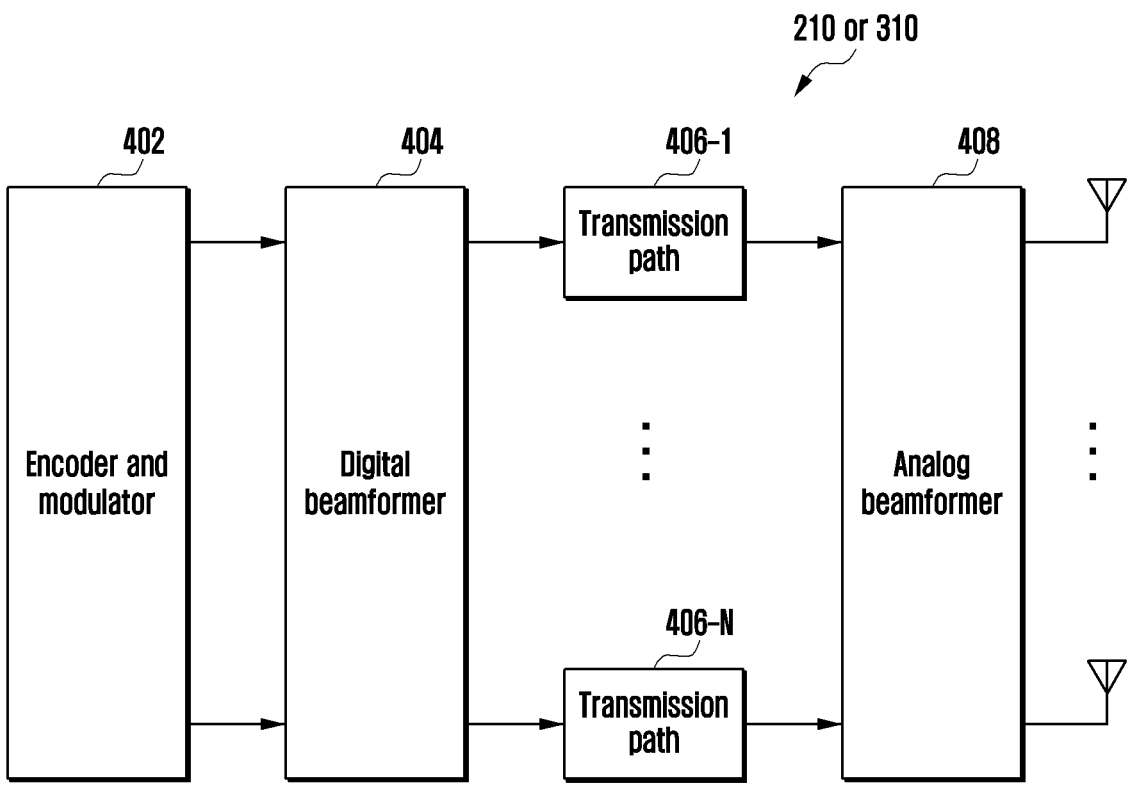
Figure 4B:
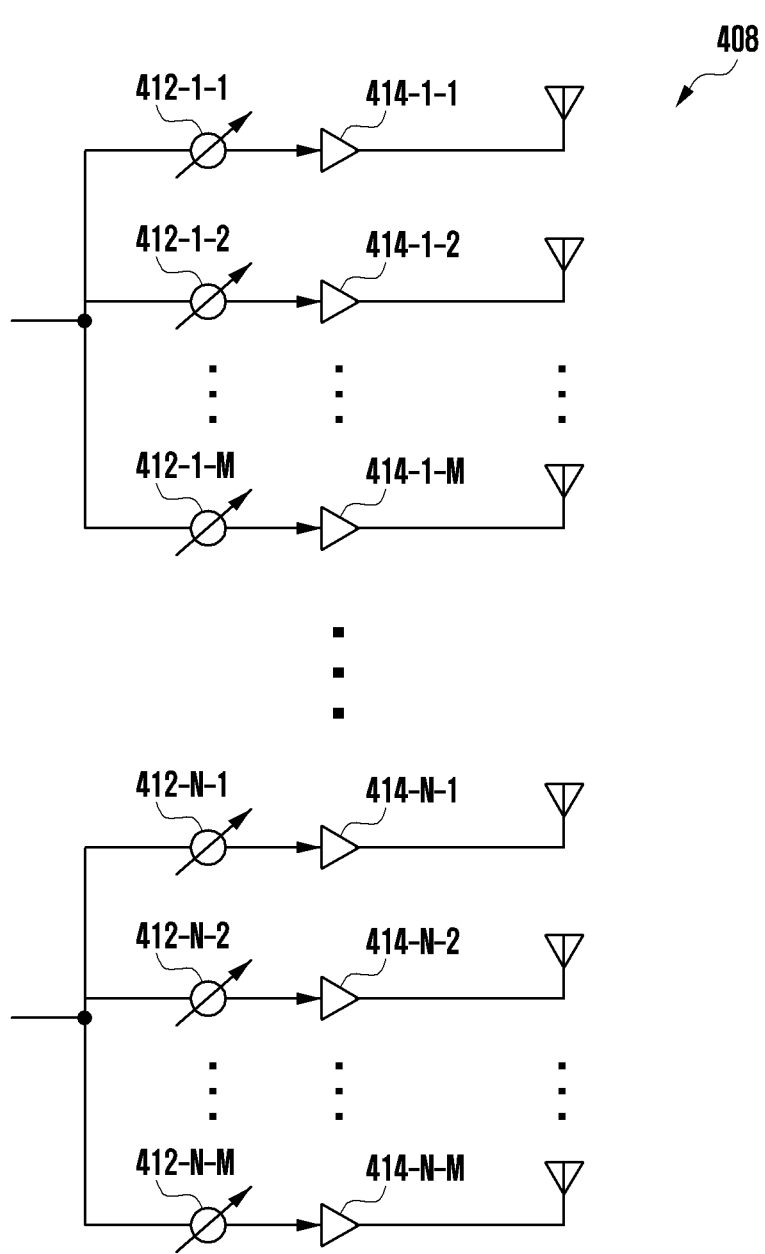
Figure 4C:
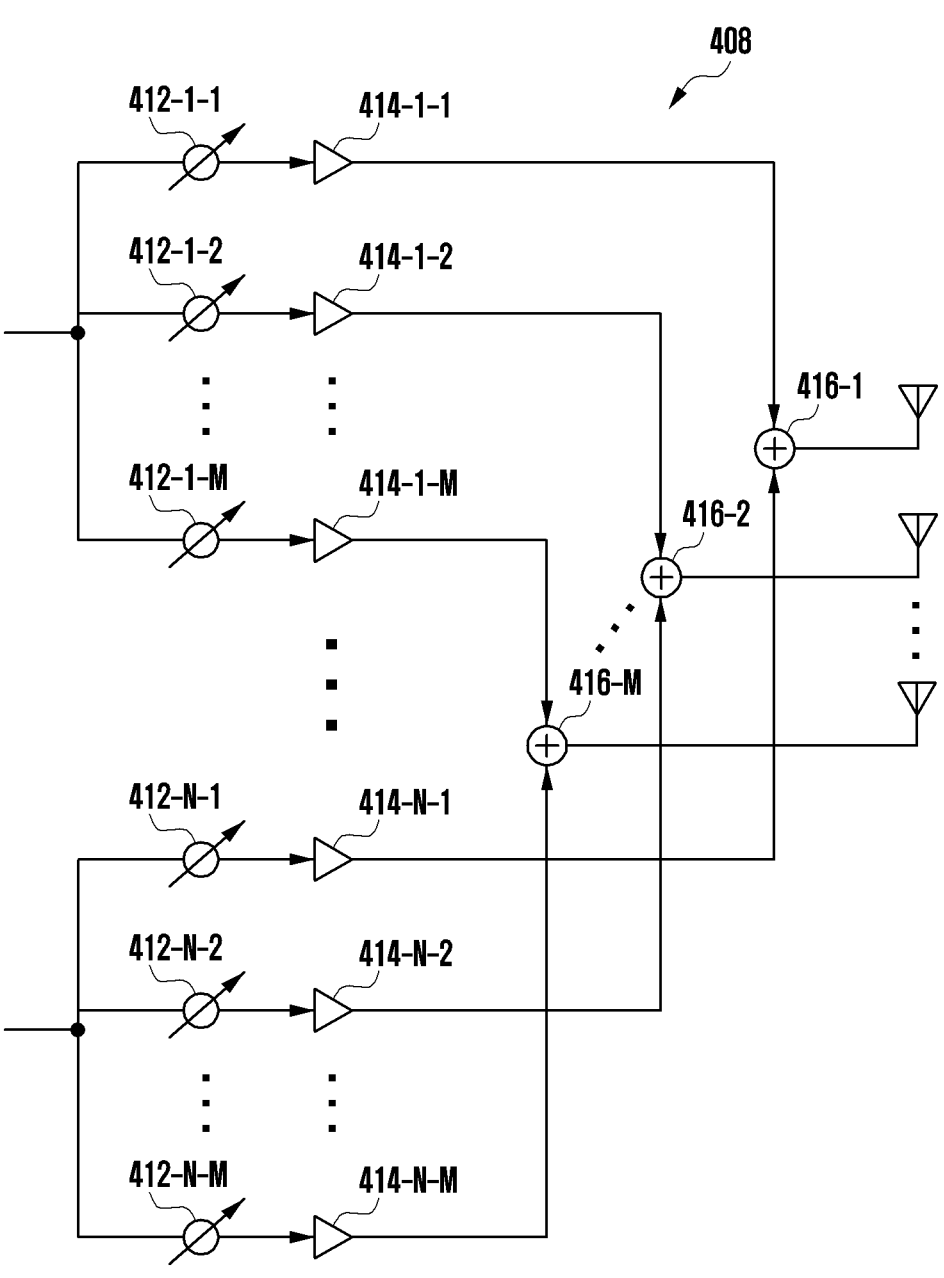
Figure 5:
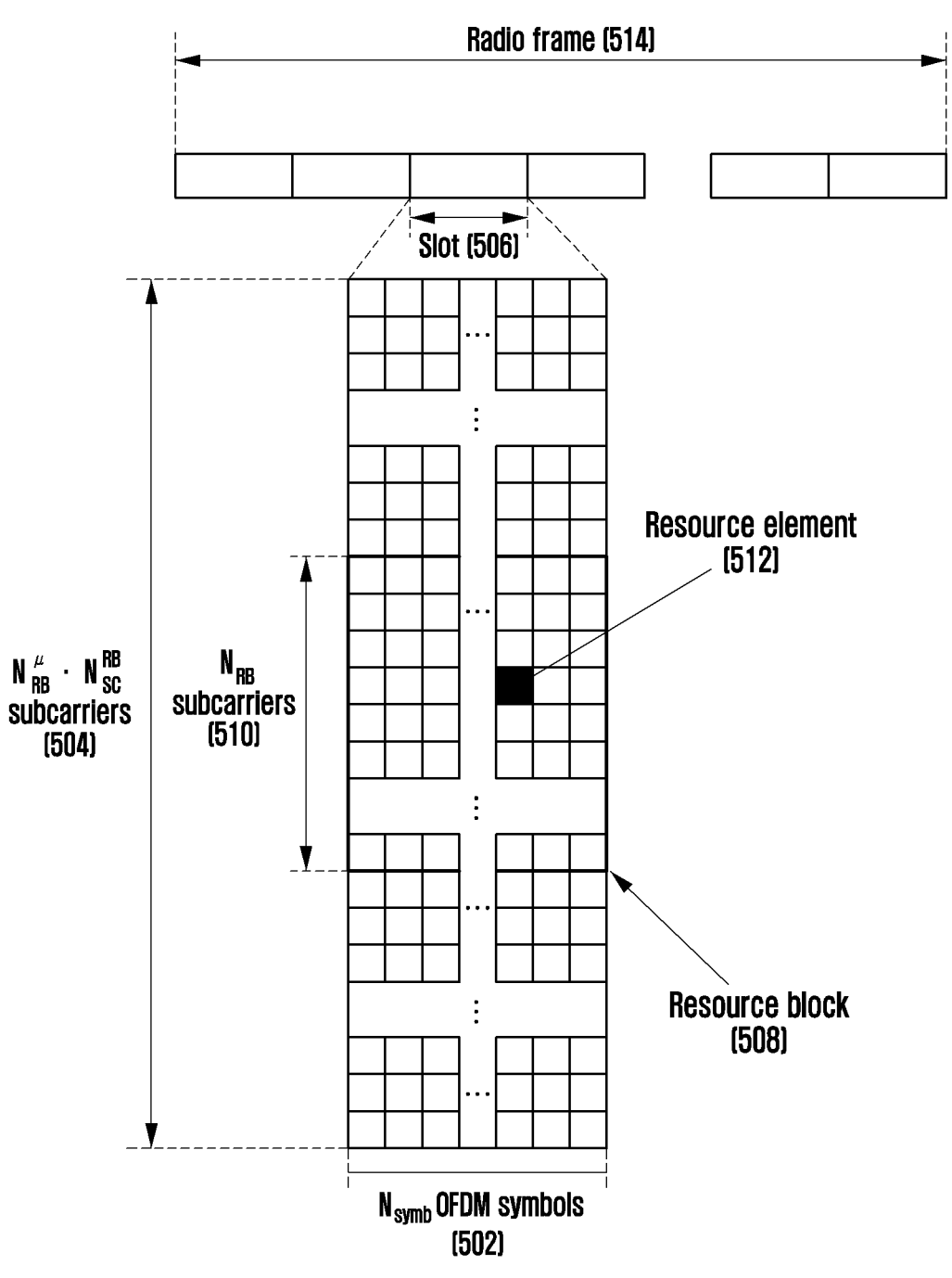
Figure 6A:
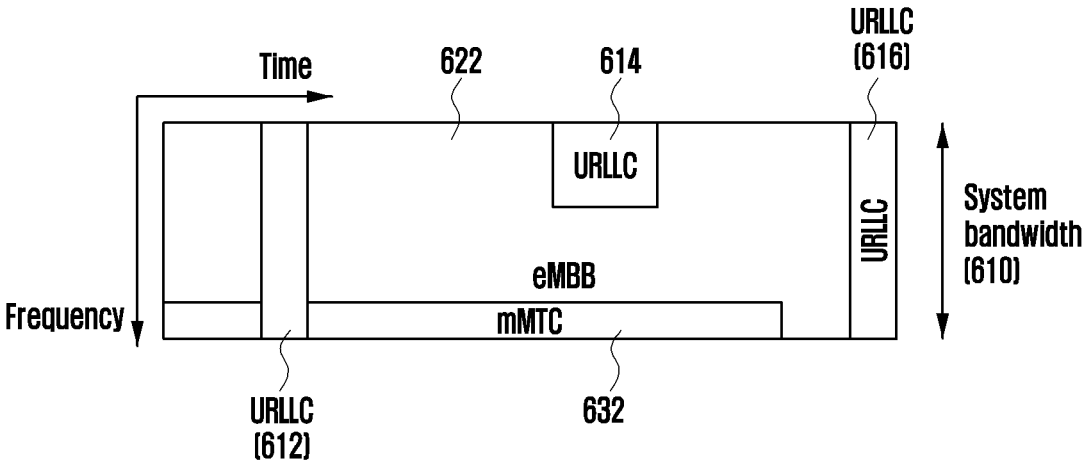
Figure 6B:
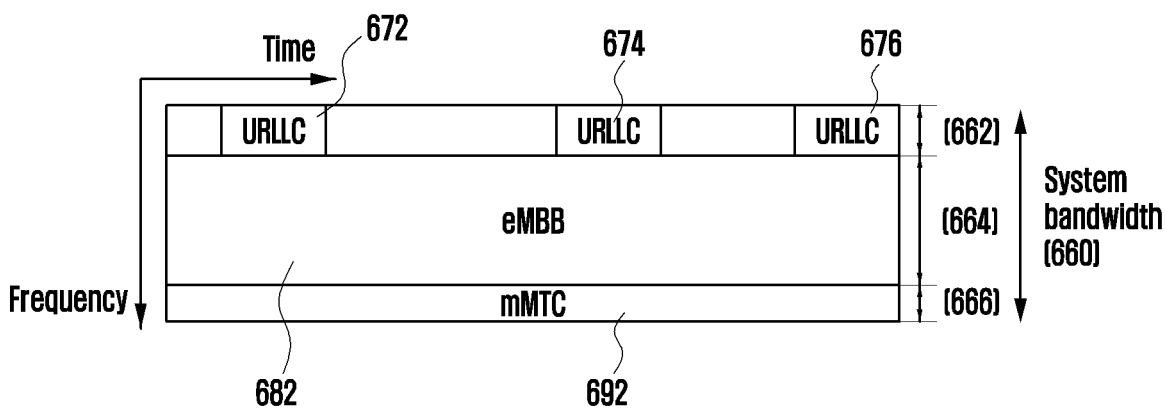
Figure 6C:
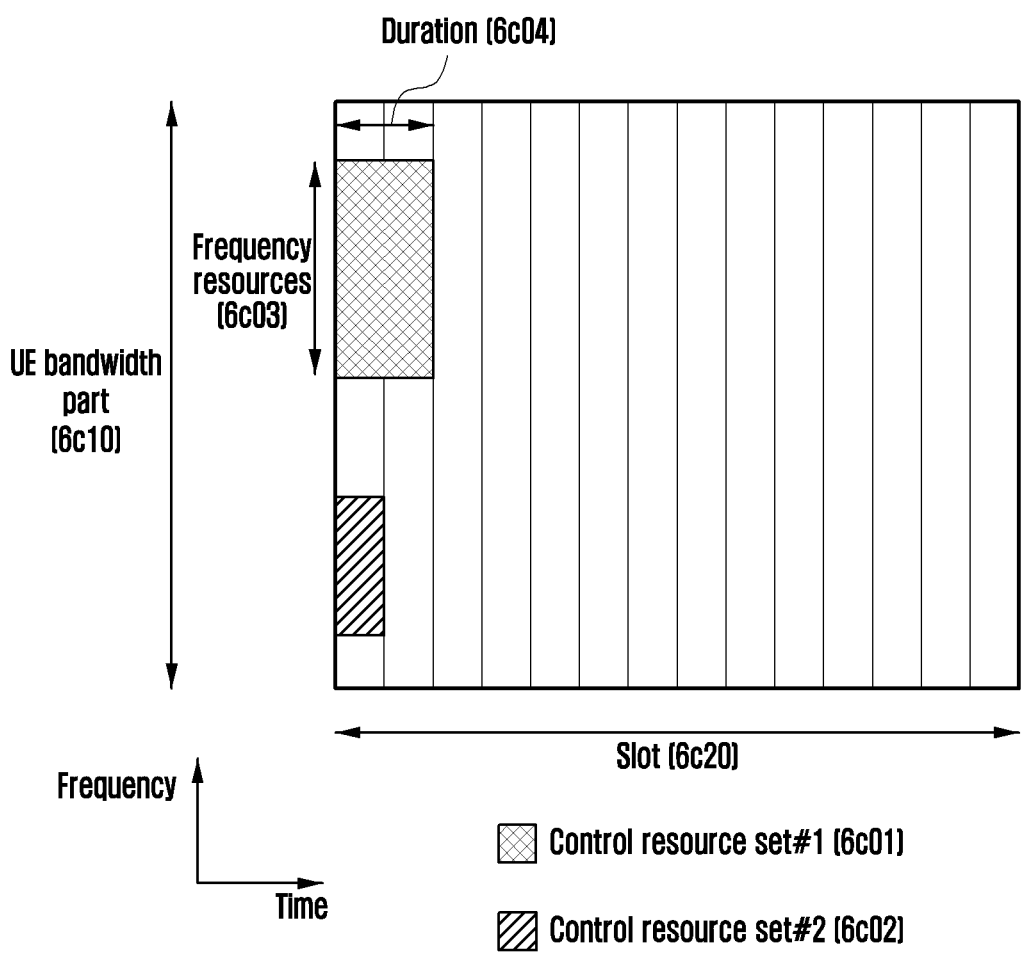
Figure 6D:
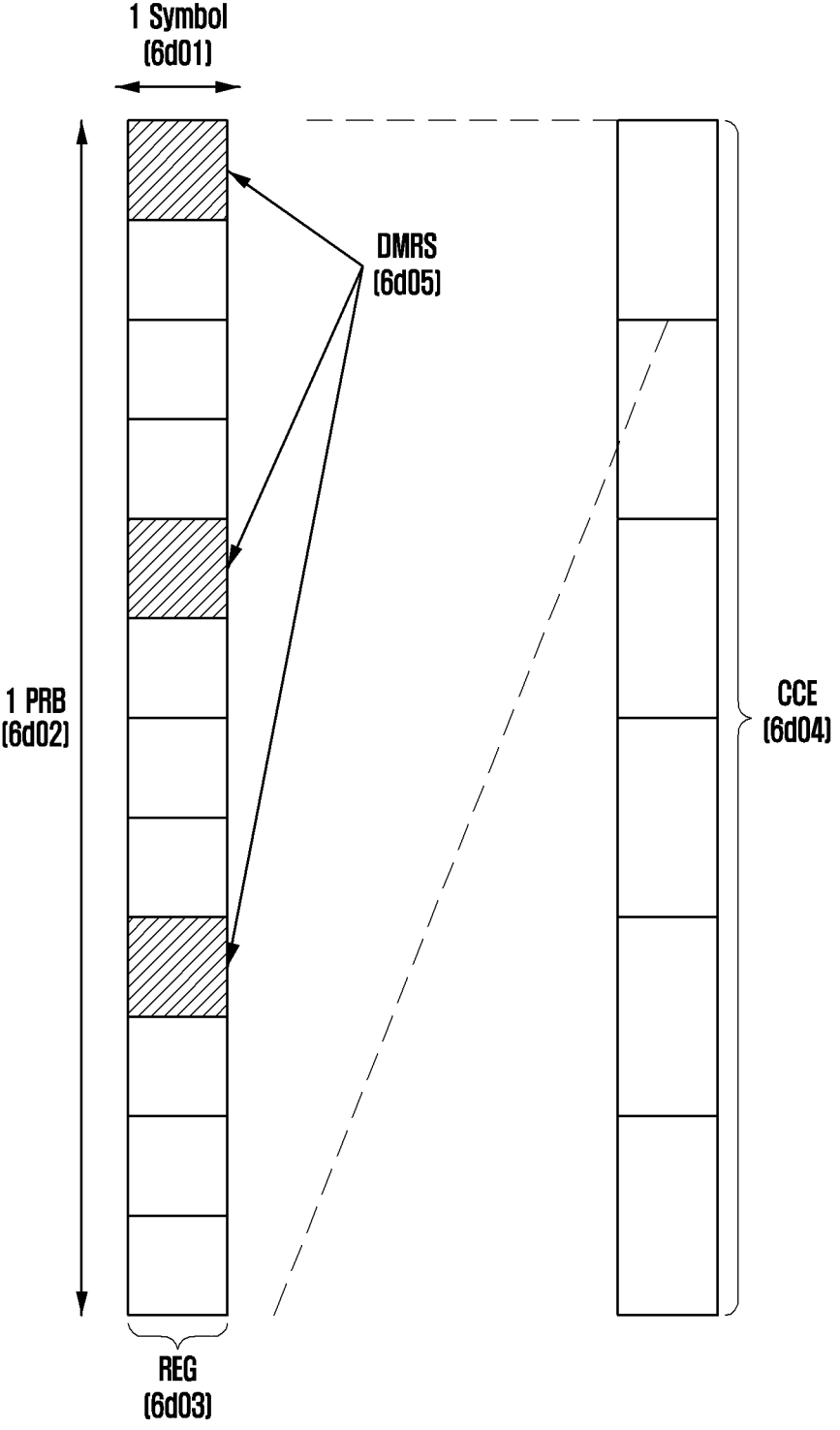
Figure 6E:
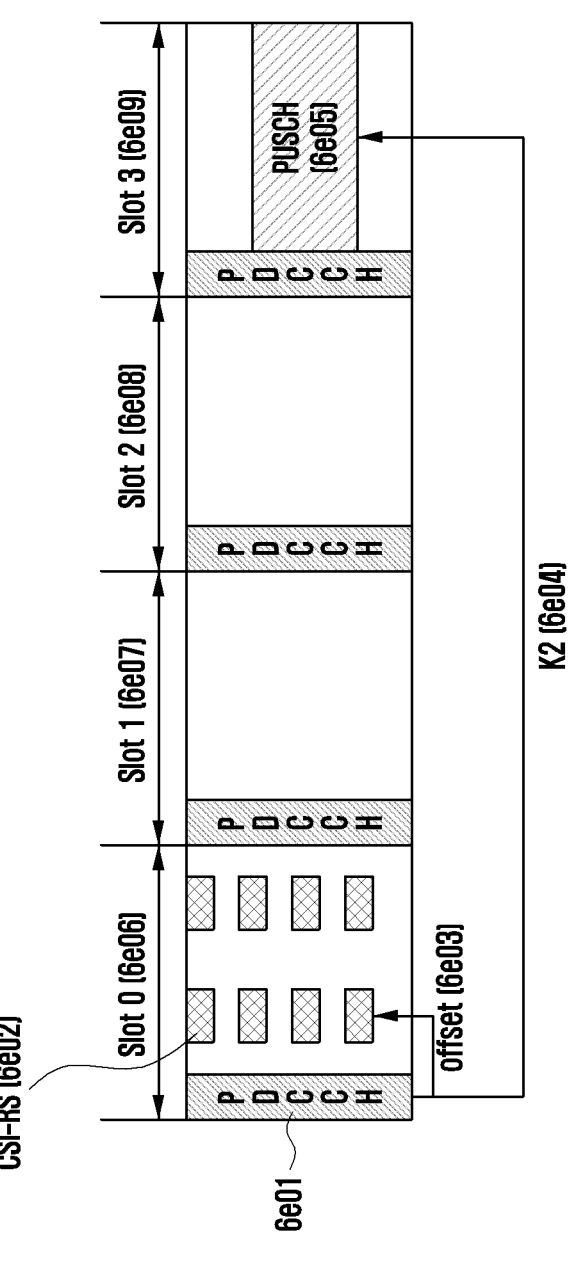
Figure 6F:
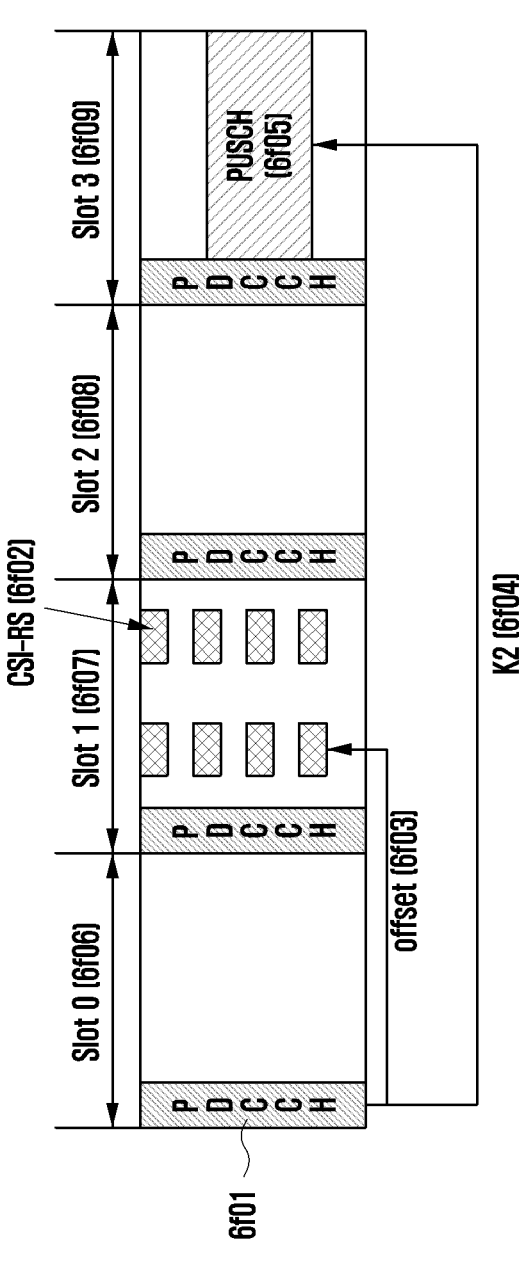
Figure 7:
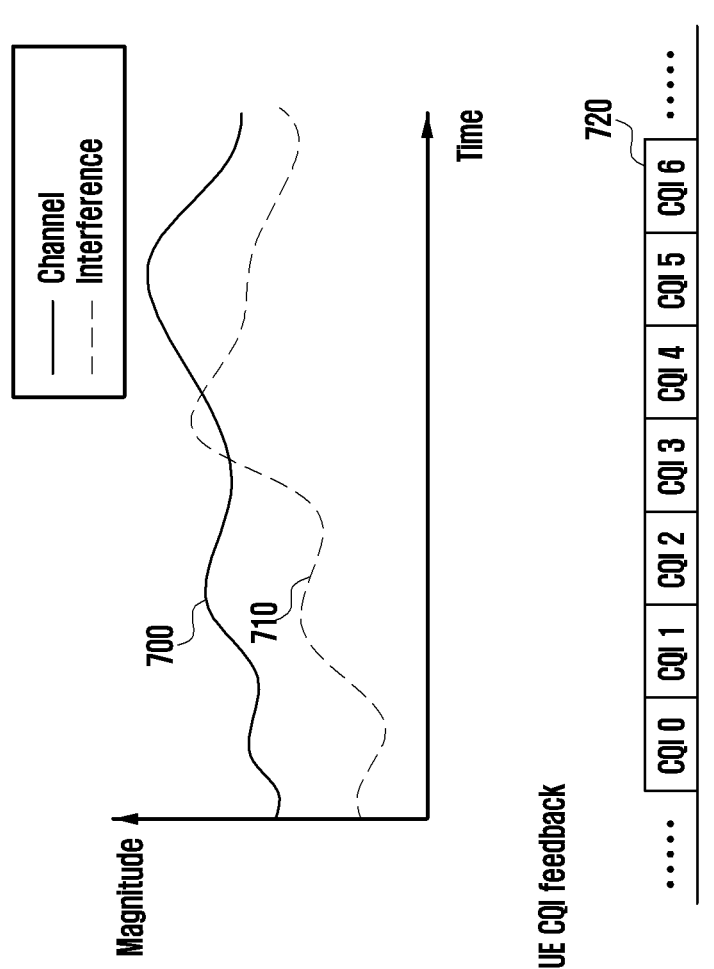
Figure 8:
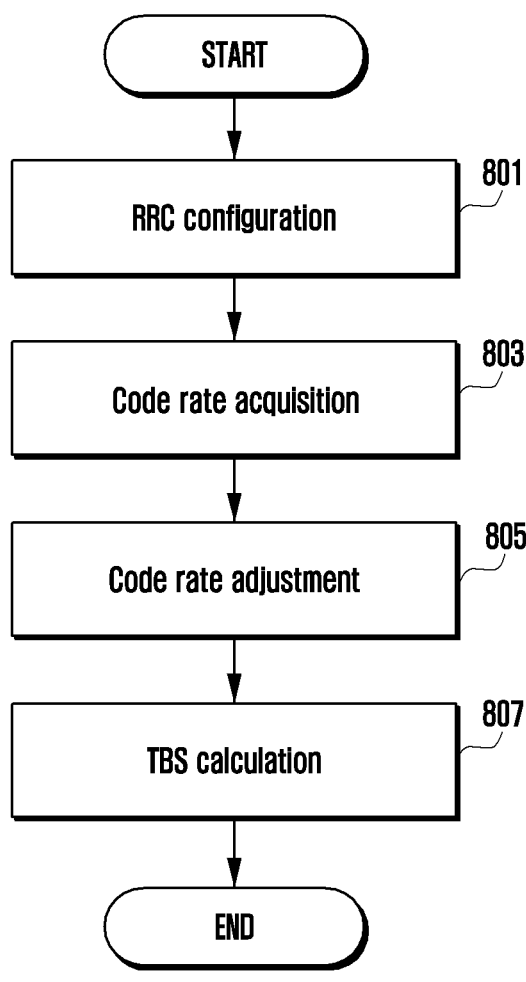
Figure 9:
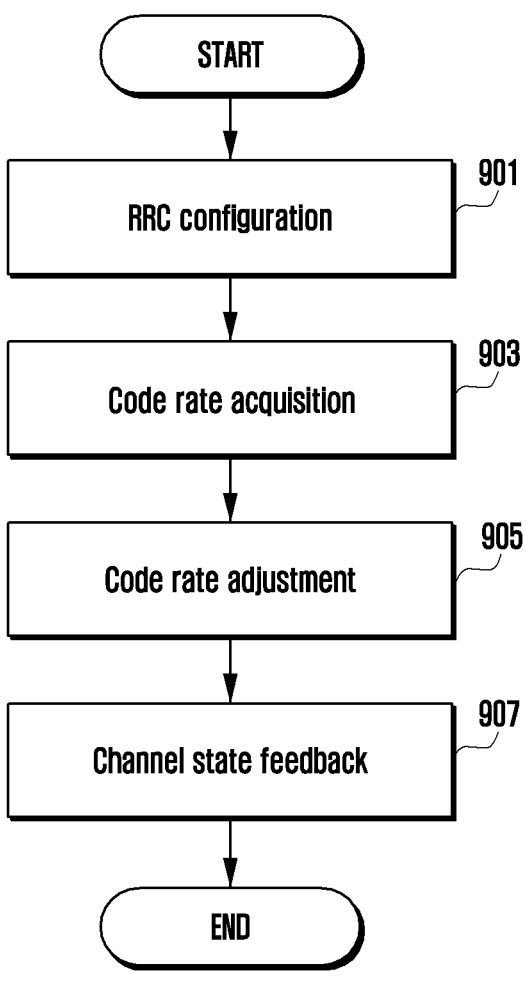
Figure 10:
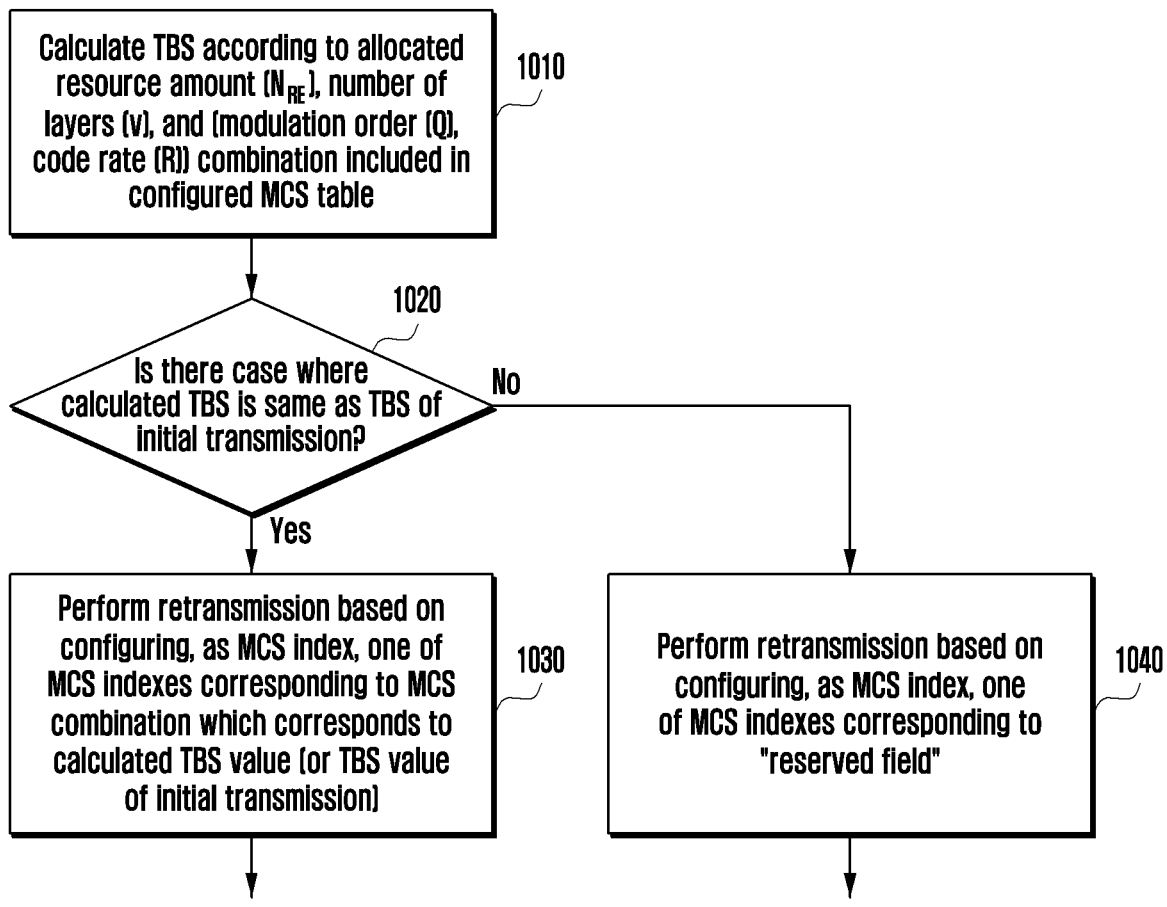

FIG. 3 illustrates a configuration of a terminal in the wireless communication system according to an embodiment of the disclosure;

FIG. 4A illustrates a configuration of a communication unit in the wireless communication system according to an embodiment of the disclosure;

FIG. 4B illustrates an example of a configuration of an analog beamformer of the communication unit in the wireless communication system according to an embodiment of the disclosure;

FIG. 4C illustrates another example of a configuration of the analog beamformer of the communication unit in the wireless communication system according to an embodiment of the disclosure;

FIG. 5 illustrates a resource structure of a time-frequency domain in the wireless communication system according to an embodiment of the disclosure;

FIG. 6A illustrates an example of allocation of data for each service to frequency-time resources in the wireless communication system according to an embodiment of the disclosure;

FIG. 6B illustrates another example of allocation of data for each service to frequency-time resources in the wireless communication system according to an embodiment of the disclosure;

FIG. 6C illustrates an example of a control resource set (CORESET) via which a downlink control channel is transmitted in the wireless communication system according to an embodiment of the disclosure;

FIG. 6D illustrates an example in which, a basic unit resource element group (REG) of a downlink control channel includes both resource elements (REs) to which downlink control information (DCI) is mapped and an area to which a demodulation reference signal (DMRS) that is a reference signal for decoding the REs are mapped, according to an embodiment of the disclosure;

FIG. 6E illustrates an example of an aperiodic CSI reporting method according to an embodiment of the disclosure;

FIG. 6F illustrates another example of an aperiodic CSI reporting method according to an embodiment of the disclosure;

FIG. 7 illustrates an example of transmitting a channel quality indicator (CQI) that is one piece of channel state information of a terminal according to an interference intensity and signal energy measured by the terminal, according to an embodiment of the disclosure;

FIG. 8 illustrates a flowchart of a method for a terminal to calculate a transport block size (TBS) by using a CQI table and an MCS table according to an embodiment of the disclosure;

FIG. 9 illustrates a flowchart of another method for a terminal to calculate a TBS by using a CQI and an MCS table according to an embodiment of the disclosure; and FIG. 10 illustrates a flowchart of a method for a base station to determine an MCS index for retransmission according to an embodiment of the disclosure.

DETAILED DESCRIPTION

Hereinafter, exemplary embodiments of the disclosure will be described in detail with reference to the accompanying drawings. In the following disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Based on determinations by those skilled in the art, major ideas of the disclosure may also be applied to other systems having similar technical backgrounds through some modifications without significantly departing from the scope of the disclosure. For reference, the term "communication system" is a term that also means a broadcast system, but in the disclosure, a communication may be more clearly referred to as a broadcast system in a case where the main service of the communication system is a broadcast service.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. Terms such as "1st," "2nd," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., by wire), wirelessly, or via a third element.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to more clearly set forth the disclosure and inform those skilled in the art of the scope of the disclosure, and the disclosure is defined only by the scope of the appended claims. Throughout the specification, the same or like reference numerals designate the same or like elements.

Hereinafter, various embodiments of the disclosure will be described based on an approach of hardware. However, various embodiments of the disclosure include a technology that uses both hardware and software, and thus the various embodiments of the disclosure may not exclude the perspective of software.

The following description of the disclosure is directed to an apparatus and method for transmitting/receiving control information in a communication system. Specifically, in the disclosure, a technology for transmitting/receiving control information based on a channel quality indicator (CQI) and a modulation coding scheme (MCS) in a wireless communication system will be described.

In the following description, terms referring to signals, terms referring to channels, terms referring to control information, terms referring to network entities, terms referring to device elements, and the like are illustratively used for the sake of descriptive convenience. Therefore, the disclosure is not limited by the terms as used below, and other terms referring to subjects having equivalent technical meanings may be used.

In addition, various embodiments of the disclosure will be described using terms employed in some communication standards (e.g., 3rd generation partnership project (3GPP)), but they are merely for the sake of descriptive convenience. Various embodiments of the disclosure may also be easily applied to other systems through modifications.

Figure 1:
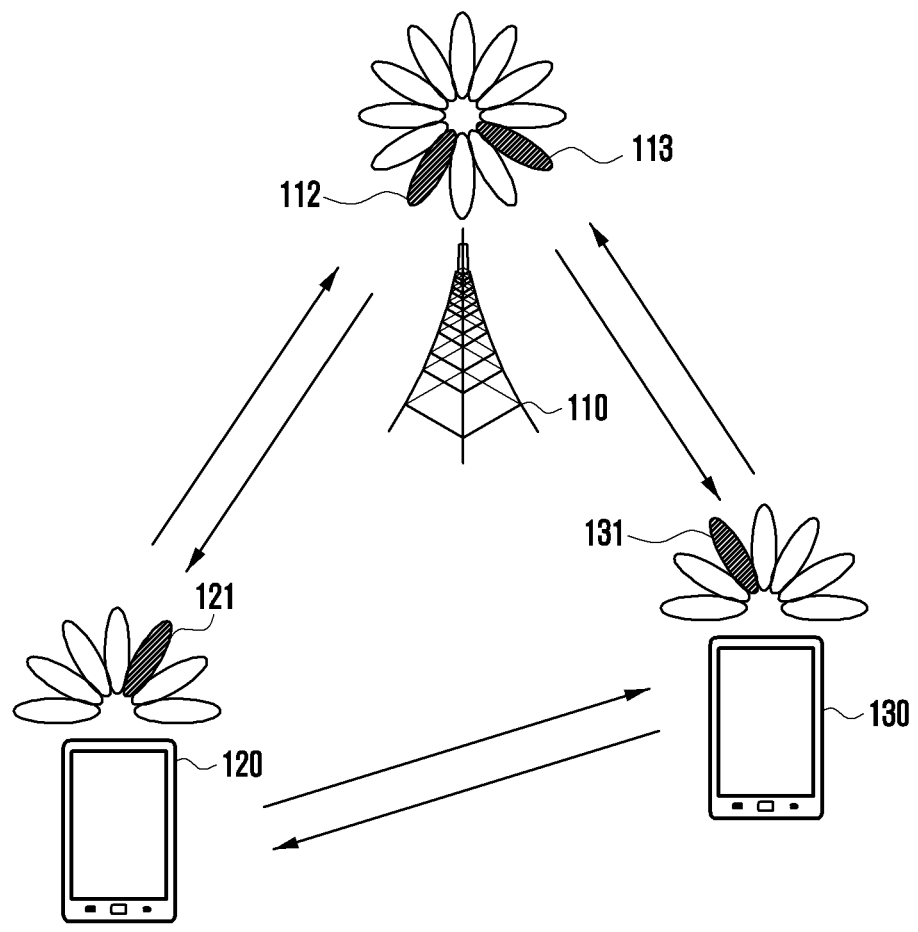
FIG. 1 illustrates a wireless communication system according to an embodiment of the disclosure.

FIG. 1 illustrates a wireless communication system according to an embodiment of the disclosure.

FIG. 1 illustrates a base station 110, a terminal 120, and a terminal 130, as some of nodes using a wireless channel in a wireless communication system. FIG. 1 illustrates only one base station, but may further include another base station that is the same as or similar to the base station 110.

The base station 110 is a network infrastructure which provides radio access to the terminals 120 and 130. The base station 110 has coverage defined as a certain geographic area, based on a distance over which a signal may be transmitted.

In addition to "base station," the base station 110 may be referred to as "access point (AP)," "eNodeB (eNB)," "5th generation node (5G node)," "wireless point," "transmission/reception point (TRP)," or other terms having an equivalent technical meaning.

Each of the terminal 120 and the terminal 130 is a device used by a user, and performs communication with the base station 110 via a wireless channel. In some cases, at least one of the terminal 120 and the terminal 130 may be operated without involvement of a user. That is, when at least one of the terminal 120 and/or the terminal 130 is a device that performs machine type communication (MTC), the terminal may not be carried by a user. In addition to "terminal," each of the terminal 120 and the terminal 130 may be referred to as "user equipment (UE)," "mobile station," "subscriber station," "remote terminal," "wireless terminal," "user device" or other terms having an equivalent technical meaning.

The base station 110, the terminal 120, and the terminal 130 may transmit and receive radio signals in a millimeter wave band (e.g., 28 GHz, 30 GHz, 38 GHz, and 60 GHz). In this case, in order to improve channel gain, the base station 110, the terminal 120, and the terminal 130 may perform beamforming. The beamforming may include transmission beamforming and reception beamforming.

That is, the base station 110, the terminal 120, and the terminal 130 may assign directivity to a transmission signal or a reception signal. To this end, the base station 110 and the terminals 120 and 130 may select serving beams 112, 113, 121, and 131 via a beam search procedure or a beam management procedure. After the serving beams 112, 113, 121, and 131 are selected, communication may then be performed via resources that are in quasi co-located (QCL) relationships with resources via which the serving beams 112, 113, 121, and 131 are transmitted.

If large-scale characteristics of a channel, via which a symbol on a first antenna port has been transferred, can be inferred from a channel via which a symbol on a second antenna port has been transferred, it may be evaluated that the first antenna port and the second antenna port are in a QCL relationship.

For example, the large-scale characteristics may include at least one among a delay spread, a Doppler spread, a Doppler shift, an average gain, an average delay, and a spatial receiver parameter.

Figure 2:
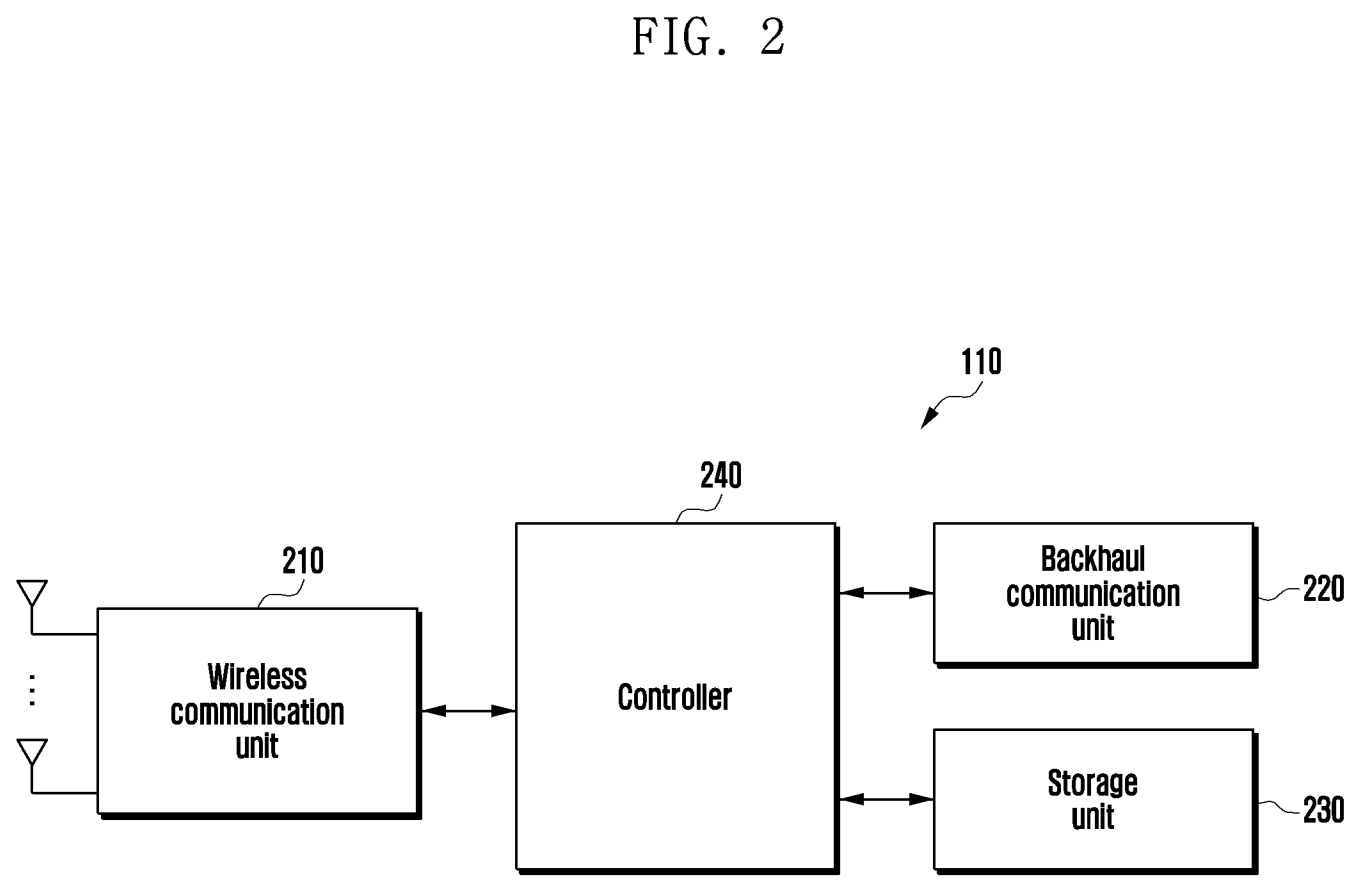

FIG. 2 illustrates a configuration of a base station in the wireless communication system according to an embodiment of the disclosure.

The configuration illustrated in FIG. 2 may be understood as a configuration of the base station 110. The terms "—unit," "—device," etc. used hereinafter may refer to a unit configured to process at least one function or operation, and may be implemented as hardware, software, or a combination of hardware and software.

Referring to FIG. 2, the base station includes a wireless communication unit 210, a backhaul communication unit 220, a storage unit 230, and a controller 240.

The wireless communication unit 210 performs functions to transmit and receive a signal through a wireless channel. For example, the wireless communication unit 210 performs conversion between a baseband signal and a bitstream according to a physical layer specification of the system. For example, when data is transmitted, the wireless communication unit 210 generates complex symbols by encoding and modulating a transmission bitstream. In addition, when data is received, the wireless communication unit 210 restores a reception bitstream via demodulation and decoding of the baseband signal.

In addition, the wireless communication unit 210 up-converts the baseband signal to a radio frequency (RF) band signal, transmits the up-converted RF band signal via an antenna, and then down-converts the RF band signal received via the antenna to a baseband signal. To this end, the wireless communication unit 210 may include a transmission filter, a reception filter, an amplifier, a mixer, an oscillator, a digital-to-analog converter (DAC), an analog-to-digital converter (ADC), and the like. Also, the wireless communication unit 210 may include multiple transmission and reception paths. Furthermore, the wireless communication unit 210 may include at least one antenna array including multiple antenna elements.

In terms of hardware, the wireless communication unit 210 may include a digital unit and an analog unit, and the analog unit may include multiple sub-units according to an operation power, an operation frequency, and the like. The digital unit may be implemented as at least one processor (e.g., a digital signal processor (DSP)).

The wireless communication unit 210 transmits and receives a signal as described above. Accordingly, all or a part of the wireless communication unit 210 may be referred to as "transmitter," "receiver," or "transceiver." In addition, in the following description, transmission and reception performed via a wireless channel are used in a sense including processing performed as described above by the wireless communication unit 210. In some embodiments, the wireless communication unit 210 may perform functions to transmit and receive a signal by using wired communication.

The backhaul communication unit 220 provides an interface to perform communication with other nodes within a network. That is, the backhaul communication unit 220 converts, into a physical signal, a bitstream transmitted from the base station to another node, for example, another access node, another base station, a higher node, a core network, or the like, and converts a physical signal received from another node into a bitstream.

The storage unit 230 stores data, such as a basic program, an application program, and/or configuration information, for operations of the base station. The storage unit 230 may include a volatile memory, a nonvolatile memory, or a combination of a volatile memory and a nonvolatile memory. In addition, the storage unit 230 provides stored data in response to a request of the controller 240.

The controller 240 controls overall operations of the base station. For example, the controller 240 transmits and receives a signal via the wireless communication unit 210 or the backhaul communication unit 220. Also, the controller 240 records and reads data in the storage unit 230. In addition, the controller 240 may perform functions of a protocol stack required in communication specifications. According to another implementation, the protocol stack may be included in the wireless communication unit 210. To this end, the controller 240 may include at least one processor.

According to an embodiment, the controller 240 may transmit and receive control information to and from the terminal 120. For example, the controller 240 may control the base station to perform operations according to embodiments (embodiments 1 to 8) to be described later.

FIG. 3 illustrates a configuration of a terminal in the wireless communication system according to an embodiment of the disclosure. The configuration illustrated in FIG. 3 may be understood similar to the configuration of the terminal 120. The terms " . . . unit," " . . . device," etc. used hereinafter may refer to a unit configured to process at least one function or operation, and may be implemented as hardware, software, or a combination of hardware and software.

Referring to FIG. 3, the terminal may include a communication unit 310, a storage unit 320, and a controller 330.

The communication unit 310 performs functions to transmit and receive a signal via a wireless channel. For example, the communication unit 310 performs conversion between a baseband signal and a bitstream according to a physical layer standard of the system. For example, when data is transmitted, the communication unit 310 generates complex symbols by encoding and modulating a transmission bitstream. In addition, when data is received, the communication unit 310 restores a reception bitstream via demodulation and decoding of a baseband signal. In addition, the communication unit 310 up-converts a baseband signal into an RF band signal, transmits the up-converted RF band signal via an antenna, and then down-converts the RF band signal received via the antenna into a baseband signal. For example, the communication unit 310 may include a transmission filter, a reception filter, an amplifier, a mixer, an oscillator, a DAC, an ADC, and the like.

In addition, the communication unit 310 may include multiple transmission and reception paths. Furthermore, the communication unit 310 may include at least one antenna array including multiple antenna elements. In terms of hardware, the communication unit 310 may include a digital circuit and an analog circuit (e.g., a radio frequency integrated circuit (RFIC)). The digital circuit and the analog circuit may be implemented in a single package or across multiple packages. In addition, the communication unit 310 may include multiple RF chains. Furthermore, the communication unit 310 may perform beamforming.

Also, the communication unit 310 may include different communication modules to process signals of different frequency bands. Furthermore, the communication unit 310 may include multiple communication modules to support multiple different radio access technologies. For example, different wireless access technologies may include one or more of: Bluetooth low energy (BLE), wireless fidelity (Wi-Fi), Wi-Fi gigabyte (WiGig), a cellular network (e.g., long-term evolution (LTE)), and the like. In addition, different frequency bands may include a super-high frequency (SHF) (e.g., 2.5 GHz and 5 GHz) band and a millimeter wave (mm wave) (e.g., 60 GHz) band.

The communication unit 310 transmits and receives a signal as described above. Accordingly, all or a part of the communication unit 310 may be referred to as "transmitter," "receiver," or "transceiver." In addition, in the following description, transmission and reception performed via a wireless channel are used in a sense including processing performed as described above by the communication unit 310. In some embodiments, the communication unit 310 may perform functions to transmit and receive a signal by using wired communication.

The storage unit 320 stores data, such as a basic program, an application program, and/or configuration information, for operations of the terminal. The storage unit 320 may include a volatile memory, a nonvolatile memory, or a combination of a volatile memory and a nonvolatile memory. The storage unit 320 provides stored data in response to a request of the controller 330.

The controller 330 controls overall operations of the terminal. For example, the controller 330 transmits and receives a signal via the communication unit 310. Also, the controller 330 records and reads data in the storage unit 320. In addition, the controller 330 may perform functions of a protocol stack required in communication specifications. To this end, the controller 330 may include at least one processor or micro-processor, or in some embodiments, a part of a processor. In addition, a part of the communication unit 310 and the controller 330 may be referred to as a communication processor (CP).

According to an embodiment, the controller 330 may transmit and receive control information to and from the base station 110. For example, the controller 330 may control the terminal to perform operations according to embodiments (for example, embodiments 1 to 7) to be described later herein.

FIG. 4A to FIG. 4C illustrate configurations of the communication unit in the wireless communication system according to an embodiment of the disclosure.

FIG. 4A to FIG. 4C illustrates examples of detailed configurations of the wireless communication unit 210 of FIG. 2 or the communication unit 310 of FIG. 3. Specifically, FIG. 4A to FIG. 4C illustrate elements configured to perform beamforming, as a part of the wireless communication unit 210 of FIG. 2 or the communication unit 310 of FIG. 3.

Referring to FIG. 4A, the wireless communication unit 210 or the communication unit 310 can include an encoder and modulator 402, a digital beamformer 404, multiple transmission paths 406-1 to 406-N, and an analog beamformer 408.

The encoder and modulator 402 performs channel encoding. For channel encoding, at least one among a low-density parity check (LDPC) code, a convolution code, and a polar code may be used. The encoder and modulator 402 generates modulation symbols by performing constellation mapping.

The digital beamformer 404 performs beamforming on a digital signal (e.g., modulation symbols). To this end, the digital beamformer 404 multiplies modulation symbols by beamforming weights. Here, the beamforming weights are used to change a magnitude and a phase of a signal, and may be referred to as "precoding matrix," "precoder," or the like. The digital beamformer 404 outputs digital-beamformed modulation symbols to the multiple transmission paths 406-1 to 406-N. In this case, according to a multiple input multiple output (MIMO) transmission technique, the modulation symbols may be multiplexed or the same modulation symbols may be provided to the multiple transmission paths 406-1 to 406-N.

The multiple transmission paths 406-1 to 406-N convert digital beamformed-signals into analog-signals. To this end, each of the multiple transmission paths 406-1 to 406-N may include an inverse fast Fourier transform (IFFT) operator, a cyclic prefix (CP) inserter, a DAC, and an up-converter. The CP inserter can be implemented with an orthogonal frequency division multiplexing (OFDM) scheme, and may be excluded when another physical layer scheme (e.g., a filter bank multi-carrier (FBMC)) is applied. That is, the multiple transmission paths 406-1 to 406-N provide independent signal processing processes to multiple streams generated via digital beamforming. However, depending on an implementation scheme, some elements of the multiple transmission paths 406-1 to 406-N may be used in common.

The analog beamformer 408 performs beamforming on an analog signal. To this end, the digital beamformer 404 multiplies analog signals by beamforming weights. In this case, the beamforming weights are used to change a magnitude and a phase of a signal. Specifically, according to a connection structure between the multiple transmission paths 406-1 to 406-N and antennas, the analog beamformer 408 may be configured as shown in FIG. 4B or FIG. 4C.

Referring to FIG. 4B, signals input to the analog beamformer 408 are transmitted through the antennas via phase/magnitude conversion and amplification operations. In this case, signals of the respective paths are transmitted through different antenna sets, i.e., antenna arrays. Referring to processing of signals input through a first path, the signals are converted into signal sequences having different phases/magnitudes or identical phase/magnitude by phase/magnitude converters 412-1-1 to 412-1-M, amplified by amplifiers 414-1-1 to 414-1-M, and then transmitted through the antennas.

Referring to FIG. 4C, signals input to the analog beamformer 408 are transmitted through the antennas via phase/magnitude conversion and amplification operations. In this case, signals of respective paths are transmitted through the same antenna set, i.e., the same antenna array. Referring to processing of the signals input through the first path, the signals are converted into signal sequences having different phases/magnitudes or identical phase/magnitude by the phase/magnitude converters 412-1-1 to 412-1-M, and amplified by the amplifiers 414-1-1 to 414-1-M. In addition, for transmission through a single antenna array, the amplified signals are combined based on antenna elements by combiners 416-1-1 to 416-1-M, and then transmitted through the antennas.

FIG. 4B illustrates an example in which an independent antenna array is used for each transmission path, and FIG. 4C illustrates an example in which transmission paths share one antenna array. However, according to another embodiment, some transmission paths may use an independent antenna array, and the remaining transmission paths may share one antenna array. Furthermore, according to another embodiment, a structure adaptively changeable depending on a situation may be used by applying a structure switchable between transmission paths and antenna arrays.

In a long-term evolution (LTE) system, which is a representative example of a broadband wireless communication system, a downlink adopts an orthogonal frequency division multiplexing (OFDM) scheme, and an uplink adopts a single carrier frequency division multiple access (SC-FDMA)

scheme. In the multiple access scheme described above, data or control information for each user is distinguished by allocating and operating time-frequency resources for transmission of the data or control information to each user so that the time-frequency resources do not overlap, that is, orthogonality is established.

FIG. 5 illustrates a resource structure of a time-frequency domain in the wireless communication system according to an embodiment of the disclosure. FIG. 5 illustrates a basic structure of a time-frequency domain that is a radio resource area in which data or a control channel is transmitted in a downlink or an uplink.

In FIG. 5, a horizontal axis represents a time domain and a vertical axis represents a frequency domain. A minimum transmission unit in the time domain is an OFDM symbol, and $N_{symb}$ OFDM symbols 502 are gathered to constitute one slot 506. A length of a subframe is defined to be 1.0 ms, and a length of a radio frame 514 is defined to be 10 ms. A minimum transmission unit in the frequency domain is a subcarrier, and a bandwidth of the entire system transmission bandwidth may include a total of $N_{BW}$ subcarriers 504. Specific values of $N_{symb}$, $N_{BW}$, etc. may be variably applied depending on the system.

A basic unit of a resource in the time-frequency domain is a resource element (hereinafter, "RE") 512, and may be indicated by an OFDM symbol index and a subcarrier index. A resource block (RB or physical resource block, hereinafter, "PRB") 508 is defined as $N_{symb}$ consecutive OFDM symbols 502 in the time domain and $N_{RB}$ consecutive subcarriers 510 in the frequency domain. Therefore, one RB 508 includes $N_{symb} \times N_{RB}$ REs 512. In general, a minimum transmission unit of data is RB.

In the NR system, in general, $N_{symb}=14$, $N_{RB}=12$, and $N_{BW}$ and $N_{RB}$ are proportional to a bandwidth of a system transmission band. A data rate may increase in proportion to the number of RBs scheduled for a terminal. In the NR system, in a case of a frequency division duplex (FDD) system that performs operation by dividing a downlink and an uplink according to frequency, a downlink transmission bandwidth and an uplink transmission bandwidth may be different. A channel bandwidth indicates a radio frequency (RF) bandwidth corresponding to a system transmission bandwidth.

Table 1 and Table 2 show parts of correspondence relationships between a channel bandwidth, a subcarrier spacing (SCS), and a system transmission bandwidth defined in the NR system in a frequency band lower than 6 GHz and a frequency band higher than 6 GHz. For example, the NR system having a channel bandwidth of 100 MHz with a subcarrier spacing of 30 kHz includes 273 RBs. In Table 1 and Table 2, N/A may be a bandwidth-subcarrier combination that is not supported by the NR system.

TABLE 1

| | | Channel bandwidth [MHz] | | | | | |
|---|---|---|---|---|---|---|---|
| | SCS | 5 | 10 | 20 | 50 | 80 | 100 |
| Transmission | 15 kHz | 25 | 52 | 106 | 207 | N/A | N/A |
| bandwidth | 30 kHz | 11 | 24 | 51 | 133 | 217 | 273 |
| configuration | 60 kHz | N/A | 11 | 24 | 65 | 107 | 135 |
| $(N_{RB})$ | | | | | | | |

TABLE 2

| | | Channel bandwidth [MHz] | | | |
|---|---|---|---|---|---|
| | SCS | 50 | 100 | 200 | 400 |
| Transmission | 60 kHz | 66 | 132 | 264 | N/A |
| bandwidth | 120 kHz | 32 | 66 | 132 | 264 |
| configuration | | | | | |
| $(N_{RB})$ | | | | | |

In the NR system, scheduling information on downlink data or uplink data is transferred from a base station to a terminal via downlink control information ("DCI"). DCI is defined in various formats, and it may be determined according to each format whether the DCI is an uplink grant that is scheduling information for uplink data or a downlink grant that is scheduling information for downlink data, whether the DCI is compact DCI having a small size of control information, whether spatial multiplexing using a multi-antenna is applied, whether the DCI is for power control, and the like.

For example, DCI format 1-1 which is scheduling control information for downlink data may include at least one of the items shown in Table 3 below.

TABLE 3

| Items | Contents |
|---|---|
| Carrier indicator | Indicating a frequency carrier in which transmission is performed |
| DCI format indicator | An indicator for distinguishing whether corresponding DCI is for downlink or uplink |
| Bandwidth part (BWP) indicator | Indicating a BWP in which transmission is performed |
| Frequency domain resource allocation | Indicating an RB in a frequency domain allocated for data transmission. A resource to be represented is determined according to a system bandwidth and a resource allocation scheme. |
| Time domain resource allocation | Indicating an OFDM symbol of a slot, in which a data-related channel is to be transmitted |
| VRB-to-PRB mapping | Indicating a scheme by which a virtual RB (VRB) index and a physical RB (PRB) index are to be mapped |
| Modulation and coding scheme (MCS) | Indicating a modulation scheme and a coding rate used for data transmission. That is, a coding rate value that may inform of TBS and channel coding information along with information on whether the modulation scheme is QPSK, 16 QAM, 64 QAM, or 256 QAM (or 1024QAM or 4096QAM) may be indicated. |
| Codeblock group (CBG) transmission information | When CBG retransmission is configured, indicating information on a CBG to be transmitted |
| HARQ process number | Indicating an HARQ process number |
| New data indicator (NDI) | Indicating whether transmission is HARQ initial transmission or retransmission |
| Redundancy version (RV) | Indicating a redundancy version of HARQ |
| Transmission power control (TPC) command for a physical uplink control channel (PUCCH) | Indicating a transmission power control command for a PUCCH that is an uplink control channel |

In Table 3, for physical downlink shared channel (PDSCH) transmission, time domain resource assignment may be expressed by information on a slot in which a PDSCH is transmitted, a start symbol position S at the slot, and the number L of symbols to which the PDSCH is mapped. In this case, S may be a relative position from the start of the slot, L may be the number of consecutive OFDM symbols, and S and L may be determined based on a start and length indicator value (SLIV) defined as follows.

$$\text{if}$$

$$(L - 1) \le 7$$

$$\text{then}$$

$$SLIV = 14 \cdot (L - 1) + S$$

$$\text{else}$$

$$SLIV = 14 \cdot (14 - L + 1) + (14 - 1 - S)$$

$$\text{where}$$

$$0 < L \le 14 - S$$

In the NR system, generally via a radio resource control (RRC) configuration, information on a correspondence relationship between an SLIV value, a PDSCH or a physical uplink shared channel (PUSCH) mapping type, and information on a slot in which a PDSCH or a PUSCH is transmitted may be configured in one row. Then, by using time domain resource allocation of DCI, an index value defined in the configured correspondence relationship may be indicated, so that the base station may transfer, to the terminal, the SLIV value, the PDSCH or PUSCH mapping type, and information on the slot in which the PDSCH or PUSCH is transmitted.

For the NR system, the PDSCH or PUSCH mapping types are defined to be type A and type B. For PDSCH or PUSCH mapping type A, a demodulation reference signal (DMRS) symbol starts in a second or a third OFDM symbol in a slot. For PDSCH or PUSCH mapping type B, a DMRS symbol starts in a first OFDM symbol of a time domain resource allocated for PUSCH transmission.

DCI may be transmitted in a physical downlink control channel (PDCCH) that is a downlink control channel via channel coding and modulation. A PDCCH may be used to refer to control information itself rather than a channel. In general, DCI is independently scrambled for each terminal by using a specific radio network temporary identifier (RNTI) or terminal identifier, and after adding of a cyclic redundancy check (CRC) and channel coding, the DCI is configured for each independent PDCCH and transmitted. The PDCCH is mapped to a control resource set (CORESET) configured for the terminal.

Downlink data may be transmitted in a PDSCH that is a physical channel for downlink data transmission. The PDSCH may be transmitted after a control channel transmission interval, and scheduling information, such as a specific mapping position and a modulation scheme in the frequency domain, is indicated by DCI transmitted via the PDCCH. Via an MCS in control information constituting the DCI, the base station notifies the terminal of a size (e.g., a transport block size (TBS)) of data to be transmitted or a target coding rate and a modulation scheme applied to the PDSCH to be transmitted. In an embodiment, the MCS may include 5 bits, or more or fewer than 5 bits. The TBS corresponds to a size before channel coding for error correction is applied to a transport block (TB) that is data to be transmitted by the base station.

According to embodiments incorporating features of the present disclosure, a transport block (TB) may include a medium access control (MAC) header, a MAC control element (MAC CE), one or more MAC service data unit (SDU), and padding bits. Alternatively, the TB may indicate a MAC protocol data unit (PDU) or a unit of data to be sent down from a MAC layer to a physical layer.

Modulation schemes supported by the NR system are quadrature phase shift keying (QPSK), 16 quadrature amplitude modulation (QAM), 64 QAM, and 256 QAM, and each modulation order ($Q_m$) may be 2, 4, 6 or 8. That is, 2 bits, 4 bits, 6 bits, and 8 bits may be transmitted in each symbol in cases of QPSK, 16 QAM, 64 QAM, and 256 QAM, respectively, and if 1024 QAM is supported, 10 bits may be mapped to and transmitted in each symbol of 1024 QAM, and a modulation order may thus be 10, and if 4096 QAM is supported, 12 bits may be mapped to and transmitted in each symbol of 4096 QAM, and the modulation order may be thus 12.

In terms of services, the NR system can be designed so that various services are freely multiplexed in time and frequency resources, and accordingly waveform/numerology, a reference signal, etc. may be dynamically or freely adjusted as required. In order to provide an optimal service to a terminal in wireless communication, optimized data transmission via measurement of an interference amount and a channel quality is important, and therefore accurate channel state measurement is essential. However, unlike 4G communication in which channel and interference characteristics do not change significantly according to frequency resources, channel and interference characteristics for a 5G channel vary significantly depending on services, so that it is optimal to support a subset of a frequency resource group (FRG) level, which enables measurement by division. In the NR system, types of supported services may be divided into an enhanced mobile broadband (eMBB), massive machine type communications (mMTCs), and ultra-reliable and low-latency communications (URLLCs). The eMBB is a service aiming for high-speed transmission of high-capacity data, the mMTC is a service aiming for minimizing terminal power and accessing of multiple terminals, and the URLLC is a service aiming for high reliability and low latency. Different requirements may be applied depending on types of services applied to the terminal. Examples of resource distribution for respective services are as shown in FIG. 6A and FIG. 6B below. Referring to FIG. 6A and FIG. 6B below, a scheme by which frequency and time resources are allocated for information transmission in each system is identified.

FIG. 6A illustrates an example of allocation of data for each service to frequency-time resources in the wireless communication system according to an embodiment of the disclosure.

Referring to FIG. 6A, resources are allocated for an eMBB 622, URLLCs 612, 614, and 616, and mMTC 632 in the entire system frequency band 610. When URLLC 612, 614, and 616 data is generated while eMBB 622 data and mMTC 632 data are being allocated and transmitted in a specific frequency band, parts having already been allocated for the eMBB 622 and the mMTC 632 may be emptied, or the URLLC 612, 614, and 616 data may be transmitted without transmission of the eMBB 622 data and mMTC 632 data. Since the URLLC requires reduction of a latency time, resources for transmitting the URLLC 612, 614, and 616 data may be allocated to a part of resources allocated to the eMBB 622. Of course, when the URLLCs 612, 614, and 616 are additionally allocated to and transmitted in the resources to which the eMBB 622 is allocated, the eMBB 622 data may not be transmitted in an overlapping frequency-time resource, and therefore transmission performance of the eMBB 622 data may be degraded. That is, in this case, a transmission failure of the eMBB 622 data may occur due to allocation of resources for the URLLCs 612, 614, and 616. The scheme as shown in FIG. 6A may be referred to as a preemption scheme.

FIG. 6B illustrates another example of allocation of data for each service to frequency-time resources in the wireless communication system according to an embodiment of the disclosure.

FIG. 6B illustrates an example in which respective services are provided in respective sub-bands 662, 664, and 666 obtained by dividing the entire system frequency band 660. Specifically, the sub-band 662 is used for transmission of URLLC 672, 674, and 576 data, the sub-band 664 is used for transmission of eMBB 682 data, and the sub-band 666 is used for transmission of mMTC 692 data. Information on configurations of the sub-bands 662, 664, and 666 may be predetermined, and the information may be transmitted from a base station to a terminal via higher-layer signaling. Alternatively, without separate transmission of sub-band configuration information to the terminal, the information on the sub-bands 662, 664, and 666 may be arbitrarily divided by the base station or a network node to provide services.

According to an embodiment, a length of a transmission time interval (TTI) used for URLLC transmission may be shorter than a length of a TTI used for eMBB or mMTC transmission. In addition, a response to the information related to the URLLC may be transmitted faster than that of eMBB or mMTC, and therefore a terminal using a URLLC service may transmit and receive information with low latency. Structures of physical layer channels used for respective types for transmission of the aforementioned three services or data may be different from each other. For example, at least one of a TTI length, an allocation unit of frequency resources, a structure of a control channel, a data mapping method may be different. Although three services and three data types have been described above, more types of services and corresponding data types may exist. Even in this case, various embodiments to be described later may also be implemented.

FIG. 6C illustrates an example of a control resource set (CORESET) via which a downlink control channel is transmitted in the wireless communication system according to an embodiment of the disclosure. FIG. 6C is a diagram illustrating an example in which a terminal bandwidth part (UE bandwidth part) 605 is configured on the frequency axis, and two control resource sets (control resource set #1 601 and control resource set #2 602) are configured within one slot 6c20 on the time axis. The control resource sets 601 and 602 may be configured in a specific frequency resource 603 within the entire UE bandwidth part 605 on the frequency axis. One or multiple OFDM symbols may be configured on the time axis and may be defined as a control resource set duration 604. Referring to the example illustrated in FIG. 6C, control resource set #1 601 may be configured to be a control resource set duration of 2 symbols, and control resource set #2 602 may be configured to be a control resource set duration of 1 symbol.

The control resource sets in 5G described above may be configured for a terminal by a base station via higher-layer signaling (e.g., system information, a master information block (MIB), and radio resource control (RRC) signaling). Configuring a control resource set for a terminal refers to providing information, such as an identity of the control resource set, a frequency position of the control resource set, and a symbol length of the control resource set. For example, information provided to configure a control resource set is as follows.

```
ControlResourceSet ::=                    SEQUENCE {
-- Corresponds to L1 parameter 'CORESET-ID'
controlResourceSetId                      ControlResourceSetId,
    frequencyDomainResources              BIT STRING (SIZE
(45)),
    duration                              INTEGER
(1..maxCoReSetDuration),
        cce-REG-MappingType                     CHOICE {
        interleaved                       SEQUENCE {
        reg-BundleSize                    ENUMERATED
{n2, n3, n6},
            precoderGranularity
    ENUMERATED {sameAsREG-bundle, allContiguousRBs},
            interleaverSize               ENUMERATED
{n2, n3, n6}
        shiftIndex
    NTEGER(0..maxNrofPhysicalResourceBlocks−1)
        },
        nonInterleaved                    NULL
        },
        tci-StatesPDCCH                   SEQUENCE(SIZE
(1..maxNrofTCI-StatesPDCCH)) OF TCI-StateId
    OPTIONAL,
            tci-PresentInDCI
            ENUMERATED {enabled}
    }
```

In 5G, a control resource set may include $N_{RB}^{CORESET}$ RBs in the frequency domain, and may include $N_{symb}^{CORE\_SET} \in \{1, 2, 3\}$ symbols on the time axis. One control channel element (CCE) may include six resource element groups (REGs), and an REG may be defined to be one RB during one OFDM symbol. In one control resource set, REGs may be indexed in a time-first order starting with REG index 0 from a first OFDM symbol, a lowest RB, of the control resource set.

5G supports an interleaved scheme and a non-interleaved scheme, as a PDCCH transmission method. The base station may configure, for the terminal via higher-layer signaling, whether to perform interleaved or non-interleaved transmission for each control resource set. Interleaving may be performed in units of REG bundles. An REG bundle may be defined to be a set of one or multiple REGs. The terminal may determine a CCE-to-REG mapping scheme in a corresponding control resource set according to the following scheme, on the basis of interleaved or non-interleaved transmission configured from the base station.

The basic unit of the downlink control channel illustrated in FIG. 6D, that is, an REG 608, may include both REs, to which DCI is mapped, and an area to which a DMRS 609, which is a reference signal for decoding the REs, is mapped. As shown in FIG. 6D, 3 DMRSs 609 may be transmitted within 1 REG 608. The number of CCEs required to transmit a PDCCH may be 1, 2, 4, 8, or 16 according to an aggregation level (AL), and different numbers of CCEs may be used to implement link adaptation of the downlink control channel. For example, when AL=L, a single downlink control channel may be transmitted via L CCEs. The terminal needs to detect a signal without having knowledge of information on the downlink control channel, wherein a search space representing a set of CCEs is defined for blind decoding. The search space is a set of downlink control channel candidates including CCEs, for which the terminal needs to attempt decoding on a given aggregation level, and since there are various aggregation levels that make one bundle with 1, 2, 4, 8, or 16 CCEs, the terminal may have multiple search spaces. The search space set may be defined to be a set of search spaces at all configured aggregation levels.

The search space may be classified into a common search space and a terminal-specific (UE-specific) search space. A certain group of terminals or all terminals may monitor a common search space of the PDCCH in order to receive cell-common control information, such as a paging message or dynamic scheduling for system information. For example, PDSCH scheduling assignment information for transmission of an SIB including cell operator information, etc. may be received by monitoring the common search space of the PDCCH. Since a certain group of terminals or all terminals need to receive the PDCCH, the common search space may be defined as a set of predetermined CCEs. Scheduling assignment information for a UE-specific PDSCH or PUSCH may be received by monitoring a UE-specific search space of the PDCCH. The UE-specific search space may be defined UE-specifically, based on a terminal identity and functions of various system parameters.

In 5G, parameters for the search space of the PDCCH may be configured for the terminal by the base station via higher-layer signaling (e.g., SIB, MIB, and RRC signaling). For example, the base station may configure, for the terminal, the number of PDCCH candidates at each aggregation level L, a monitoring periodicity for a search space, a monitoring occasion in units of symbols in a slot for the search space, a search space type (common search space or UE-specific search space), a combination of an RNTI and a DCI format, which is to be monitored in the search space, a control resource set index for monitoring of the search space, etc. For example, the parameters for the PDCCH search space may include the following information.

```
SearchSpace ::=                         SEQUENCE {
  -- Identity of the search space. SearchSpaceId = 0 identifies the
SearchSpace configured via PBCH (MIB) or
ServingCellConfigCommon.
    searchSpaceId                       SearchSpaceId,
    controlResourceSetId                ControlResourceSetId,
    monitoringSlotPeriodicityAndOffset  CHOICE {
      sl1                                   NULL,
      sl2                                   INTEGER (0..1),
      sl4                                   INTEGER (0..3),
      sl5                               INTEGER (0..4),
      sl8                                   INTEGER (0..7),
      sl10                                  INTEGER (0..9),
      sl16                                  INTEGER (0..15),
      sl20                                  INTEGER (0..19)
    }
                                        OPTIONAL,
    duration                         INTEGER (2..2559)
    monitoringSymbolsWithinSlot         BIT STRING
(SIZE (14))
    nrofCandidates                   SEQUENCE {
      aggregationLevel1                     ENUMERATED {n0,
n1, n2, n3, n4, n5, n6, n8},
      aggregationLevel2                     ENUMERATED {n0,
n1, n2, n3, n4, n5, n6, n8},
      aggregationLevel4                     ENUMERATED {n0,
n1, n2, n3, n4, n5, n6, n8},
      aggregationLevel8                     ENUMERATED {n0,
n1, n2, n3, n4, n5, n6, n8},
      aggregationLevel16                    ENUMERATED {n0,
n1, n2, n3, n4, n5, n6, n8}
    },
    searchSpaceType                     CHOICE {
      -- Configures this search space as common search space
(CSS) and DCI formats to monitor.
      common                                SEQUENCE {
    }
      ue-Specific                           SEQUENCE {
      -- Indicates whether the UE monitors in this USS for DCI
formats 0-0 and 1-0 or for formats 0-1 and 1-1.
        formats                             ENUMERATED
{formats0-0-And-1-0, formats0-1-And-1-1},
        ...
}
```

18

According to configuration information, the base station may configure one or multiple search space sets for the terminal. According to some embodiments, the base station may configure search space set 1 and search space set 2 for the terminal. The terminal may be configured to monitor DCI format A, which is scrambled by an X-RNTI, in a common search space in search space set 1, and the terminal may be configured to monitor DCI format B, which is scrambled by a Y-RNTI, in a UE-specific search space in search space set 2.

According to the configuration information, one or multiple search space sets may exist in the common search space or the UE-specific search space. For example, search space set #1 and search space set #2 may be configured to be common search spaces, and search space set #3 and search space set #4 may be configured to be UE-specific search spaces.

In the common search spaces, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI DCI format 2_4 with CRC scrambled by CI-RNTI DCI format 2_5 with CRC scrambled by AI-RNTI DCI format 2_6 with CRC scrambled by PS-RNTI In the UE-specific search spaces, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow definitions and uses below.

Cell RNTI (C-RNTI): For UE-specific PDSCH scheduling

Temporary cell RNTI (TC-RNTI): For UE-specific PDSCH scheduling

Configured scheduling RNTI (CS-RNTI): For semi-statically configured UE-specific PDSCH scheduling Random-access RNTI (RA-RNTI): For PDSCH scheduling during random-access Paging RNTI (P-RNTI): For scheduling PDSCH on which paging is transmitted System information RNTI (SI-RNTI): For scheduling PDSCH on which system information is transmitted Interruption RNTI (INT-RNTI): For indicating whether to puncture PDSCH Transmit power control for PUSCH RNTI (TPC-PUSCH-RNTI): For indicating a power control command for PUSCH Transmit power control for PUCCH RNTI (TPC-PUCCH-RNTI): For indicating a power control command for PUCCH Transmit power control for SRS RNTI (TPC-SRS-RNTI): For indicating a power control command for SRS Cancellation indicator RNTI (CI-RNTI): For indicating PUSCH transmission cancellation Availability indicator RNTI (AI-RNTI): For indicating availability of soft resources Power saving RNTI (PS-RNTI): For indicating a power consumption reduction command in a DRX inactive interval The specified DCI formats described above may conform to the following definition.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |

In 5G, control resource set p and a search space of aggregation level L in search space set s may be expressed as Equation below.

$$L \cdot \left\{ \left( Y_{p,n_{s,f}^{\mu}} + \left\lfloor \frac{m_{s,n_{CI}}^{(L)} \cdot N_{CCE,p}}{L \cdot M_{s,max}^{(L)}} \right\rfloor + n_{CI} \right) \bmod \left\lfloor N_{CCE,p}/L \right\rfloor \right\} + i$$

$L$: aggregation level $n_{CI}$: carrier index $N_{CCE,p}$: the total number of $CCEs$ exsiting in control resource set $p$ $n_{s,f}^{\mu}$: slot index $M_{s,max}^{(L)}$: the number of $PDCCH$ candidates for aggregation level $L$ $m_{s,n_{CI}}$: $PDDCH$ candidate index of aggregation level $M_{p,s,max}^{(L)} - 1$ $i = 0, \dots, L - 1$ $Y_{p,n_{s,f}^{\mu}} = \left( A_p \cdot Y_{p,n_{s,f}^{\mu}-1} \right) \bmod D, \ Y_{p,-1} = n_{RNTI} \neq 0 \ A0 = 39827,$ $A1 = 39829, A2 = 39839, D = 65537$ $n_{RNTI}$: terminal identifier A $Y_{p,n_{s,f}^{\mu}}$ value may correspond to 0 for the common search space.

For the UE-specific search space, the $$Y_{p,n_{s,f}^{\mu}}$$

value may correspond to a value that varies according to a time index and the identity (a C-RNTI or an ID configured for the terminal by the base station) of the terminal.

Hereinafter, a time domain resource allocation method for a data channel in the 5G communication system will be described.

The base station may configure for the terminal, via higher-layer signaling (e.g., RRC signaling), a table for time domain resource allocation information on a downlink data channel (physical downlink shared channel (PDSCH)) and an uplink data channel (physical uplink shared channel (PUSCH)). A table including up to 16 entries (maxNrofDL-Allocations=16) may be configured for the PDSCH, and a table including up to 16 entries (maxNrofUL-Allocations=16) may be configured for the PUSCH. The time domain resource allocation information may include, for example, a PDCCH-to-PDSCH slot timing (denoted as K0, and corresponding to a time interval in units of slots between a time point at which a PDCCH is received and a time point at which a PDSCH scheduled by the received PDCCH is transmitted), a PDCCH-to-PUSCH slot timing (denoted as K2, and corresponding to a time interval in units of slots between a time point at which a PDCCH is received and a time point at which a PUSCH scheduled by the received PDCCH is transmitted), information on a position and length of a start symbol in which the PDSCH or PUSCH is scheduled within a slot, a mapping type of the PDSCH or PUSCH, or the like. For example, information described below may be notified from the base station to the terminal.

| PDSCH-TimeDomainResourceAllocationList information element |
| --- |
| PDSCH-TimeDomainResourceAllocationList ::= SEQUENCE (SIZE(1..maxNrofDL-Allocations)) OF PDSCH-TimeDomainResourceAllocation PDSCH-TimeDomainResourceAllocation ::= SEQUENCE { k0  INTEGER(0..32) OPTIONAL, -- Need S mappingType  ENUMERATED {typeA, typeB}, startSymbolAndLength  INTEGER (0..127) } |

| PUSCH-TimeDomainResourceAllocation information element |
| --- |
| PUSCH-TimeDomainResourceAllocationList ::= SEQUENCE (SIZE(1..maxNrofUL-Allocations)) OF PUSCH-TimeDomainResourceAllocation PUSCH-TimeDomainResourceAllocation ::= SEQUENCE { k2  INTEGER(0..32)  OPTIONAL, -- Need S mappingType  ENUMERATED {typeA, typeB}, startSymbolAndLength  INTEGER (0..127) } |

The base station may provide the terminal with a notification of one of entries in the table for time domain resource allocation information via L1 signaling (e.g., DCI) (e.g., the entry may be indicated by the "time domain resource allocation" field in the DCI). The terminal may acquire the time domain resource allocation information for the PDSCH or PUSCH, based on the DCI received from the base station.

Hereinafter, a frequency domain resource allocation method for a data channel in the 5G communication system will be described.

In 5G, as a method of indicating frequency domain resource allocation information for a downlink data channel (physical downlink shared channel (PDSCH)) and an uplink data channel (physical uplink shared channel (PUSCH)), two types, which are resource allocation type 0 and resource allocation type 1, are supported.

Resource Allocation Type 0

A notification of RB allocation information may be provided in the form of a bitmap for a resource block group (RBG) to the terminal by the base station. In this case, the RBG may include a set of consecutive virtual RBs (VRBs), and size P of the RBG may be determined based on a value configured as a higher-layer parameter (rbg-Size) and a size value of a bandwidth part defined in Table 5 below (nominal RBG size P).

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

A total number ($N_{RBG}$) of RBGs of bandwidth part i having a size of $N_{BWP,i}{}^{size}$ may be defined as follows.

$$N_{RBG} = \left\lceil \left( N_{BWP,i}^{size} + \left( N_{BWP,i}^{start} \bmod P \right) \right) / P \right\rceil,$$

where the size of the first $RBG$ is $RBG_0^{size} = P - N_{BWP,i}^{start} \bmod P$, the size of last $RBG$ is $RBG_{last}^{size} =$ $\left( N_{BWP,i}^{start} + N_{BWP,i}^{size} \right) \bmod P$ if $\left( N_{BWP,i}^{start} + N_{BWP,i}^{size} \right) \bmod P > 0$ and $P$ otherwise, the size of all other $RBGs$ is $P$.

Each bit of a bitmap having a size of $N_{RBG}$ bits may correspond to each RBG. RBGs may be indexed in an ascending order of frequency starting from a lowest frequency position of the bandwidth part. With respect to $N_{RBG}$ RBGs in the bandwidth part, RBG #0 to RBG #($N_{RBG}$-1) may be mapped to an MSB to an LSB of the RBG bitmap. When a specific bit value in the bitmap is 1, the terminal may determine that an RBG corresponding to the bit value has been assigned, and when the specific bit value in the bitmap is 0, the terminal may determine that an RBG corresponding to the bit value has not been assigned.

Resource Allocation Type 1

A notification of RB allocation information may be provided as information on start positions and lengths of consecutively allocated VRBs to the terminal by the base station. In this case, interleaving or non-interleaving may be additionally applied to the consecutively allocated VRBs. A resource allocation field of resource allocation type 1 may include a resource indication value (RIV), and the RIV may include a start point ($RB_{start}$) of a VRB and a length of consecutively allocated RBs (LRBs). More specifically, an RIV in a bandwidth part having a size of $N_{BWP}{}^{size}$ may be defined as follows.

if $$(L_{RBs} - 1) \leq \left\lfloor N_{BWP}^{size} / 2 \right\rfloor$$

then $$RIV = N_{BWP}^{size}(L_{RBs} - 1) + RB_{start}$$

else

-continued $$RIV = N_{BWP}^{size} \left( N_{BWP}^{size} - L_{RBs} + 1 \right) + \left( N_{BWP}^{size} - 1 - RB_{start} \right)$$

where $L_{RBs} \geq 1$ and shall not exceed $N_{BWP}^{size} - RB_{start}$.

Hereinafter, a method of measuring and reporting a channel state in the 5G communication system will be described in detail.

Channel state information (CSI) may include a channel quality indicator (channel quality information (CQI)), a precoding matrix indicator (PMI), a CSI-RS resource indicator (CRI), a synchronization signal/physical broadcast channel (SS/PBCH) block resource indicator (SSBRI), a layer indicator (LI), a rank indicator (RI), a reference signal received power (L1-RSRP), and/or the like. The base station may control time and frequency resources for the aforementioned CSI measurement and report of the terminal.

For the aforementioned CSI measurement and report, the terminal may be configured, for example, via higher-layer signaling, with setting information for N (N≥1) CSI reports (CSI-ReportConfig), setting information for M (M≥1) RS transmission resources (CSI-ResourceConfig), and list information of one or two trigger states (CSI-AperiodicTrigger-StateList, CSI-SemiPersistentOnPUSCH-TriggerStateList).

With respect to the aforementioned CSI report settings (CSI-ReportConfig), each report setting of CSI-ReportConfig may be associated with, for example, one downlink (DL) bandwidth part identified by a higher-layer parameter bandwidth part identifier (bwp-id) given by a CSI resource setting of CSI-ResourceConfig associated with the corresponding report setting. As a time domain report operation for each report setting of CSI-ReportConfig, an aperiodic, semi-persistent, or periodic scheme may be supported, and the scheme may be configured for the terminal by the base station via parameter reportConfigType configured from a higher layer. The semi-persistent CSI report method may support, for example, a "PUCCH-based semi-persistent (semi-PersistentOnPUCCH)" method and a "PUSCH-based semi-persistent (semi-PersistentOnPUSCH)" method. For the periodic or semi-persistent CSI report method, a PUCCH or PUSCH resource in which CSI is to be transmitted may be configured for the terminal by the base station via higher-layer signaling. A periodicity and a slot offset of the PUCCH or PUSCH resource in which CSI is to be transmitted may be given based on numerology of an uplink (UL) bandwidth part configured for CSI report transmission. For the aperiodic CSI report method, a PUSCH resource in which CSI is to be transmitted may be scheduled for the terminal by the base station via L1 signaling (e.g., aforementioned DCI format 0_1).

With respect to the aforementioned CSI resource setting (CSI-ResourceConfig), each CSI resource setting of CSI-ReportConfig may include, for example, S (S≥1) CSI resource sets (given via higher-layer parameter csi-RS-ResourceSetList). A CSI resource set list may include, for example, a non-zero power (NZP) CSI-RS resource set and/or an SS/PBCH block set and/or may include a CSI-interference measurement (CSI-IM) resource set. Each CSI resource setting may be positioned at a downlink (DL) bandwidth part identified by higher-layer parameter bwp-id, and the CSI resource setting may be connected to, for example, a CSI report setting in the same downlink bandwidth part. A time domain operation of CSI-RS resources in the CSI resource setting may be configured to be one of aperiodic, periodic, or semi-persistent scheme from higher-layer parameter resourceType. With respect to the periodic or semi-persistent CSI resource setting, the number of CSI-RS resource sets may be limited to S (S=1), and the configured periodicity and slot offset may be given based on numerology of the downlink bandwidth part identified by bwp-id. One or more CSI resource settings for channel or interference measurement may be configured for the terminal by the base station via higher-layer signaling, and may include, for example, the following CSI resources.

CSI-IM resource for interference measurement

NZP CSI-RS resource for interference measurement

NZP CSI-RS resource for channel measurement

With respect to CSI-RS resource sets associated with the resource setting in which higher-layer parameter resourceType is configured to be "aperiodic," "periodic," or "semi-persistent," a trigger state of the CSI report setting in which reportType is configured to be "aperiodic" and a resource setting for channel or interference measurement on one or multiple component cells (CCs) may be configured via higher-layer parameter CSI-AperiodicTriggerStateList.

Aperiodic CSI reporting of the terminal may be performed using a PUSCH, periodic CSI reporting may be performed using a PUCCH, and semi-persistent CSI reporting may be performed using a PUSCH when triggered or activated via DCI, and may be performed using a PUCCH after activated via a MAC control element (MAC CE). As described above, the CSI resource setting may also be configured to be aperiodic, periodic, or semi-persistent. Combinations between CSI report settings and CSI resource configurations may be supported based on Table 6 below (Triggering/activation of CSI reporting for the possible CSI-RS configurations).

TABLE 6

| CSI-RS Configuration | Periodic CSI Reporting | Semi-Persistent CSI Reporting | Aperiodic CSI Reporting |
|---|---|---|---|
| Periodic CSI-RS | No dynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

Aperiodic CSI reporting may be triggered by a "CSI request" field in DCI format 0_1 described above, which corresponds to scheduling DCI for a PUSCH. The terminal may monitor a PDCCH, acquire DCI format 0_1, and acquire a CSI request indicator and scheduling information for a PUSCH. The CSI request indicator may be configured to have NTS (=0, 1, 2, 3, 4, 5, or 6) bits, and may be determined by higher-layer signaling (reportTriggerSize). One trigger state among one or multiple aperiodic CSI report trigger states which may be configured via higher-layer signaling (CSI-AperiodicTriggerStateList) may be triggered by the CSI request indicator.

When all bits in the CSI request field are 0, this may indicate that CSI reporting is not requested.

If the number M of configured CSI trigger states in CSI-AperiodicTriggerStateLite is greater than $2^{NTs}-1$, M CSI trigger states may be mapped to $2^{NTs}-1$ trigger states according to a predefined mapping relation, and one trigger state among the $2^{NTs}-1$ trigger states may be indicated via the CSI request field.

If the number M of the configured CSI trigger states in CSI-AperiodicTriggerStateLite is less than or equal to $2^{NTs}-1$, one of the M CSI trigger states may be indicated via the CSI request field.

Table 7 below shows examples of relationships between CSI request indicators and CSI trigger states that may be indicated by the indicators.

TABLE 7

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 | CSI resource#1 |
|  |  | CSI report#2 | CSI resource#2 |
| 10 | CSI trigger state#2 | CSI report#3 | CSI resource#3 |
| 11 | CSI trigger state#3 | CSI report#4 | CSI resource#4 |

The terminal may measure a CSI resource in a CSI trigger state triggered via the CSI request field, and then generate CSI (including at least one of the CQI, PMI, CRI, SSBRI, LI, RI, or L1-RSRP described above) based on the measurement. The terminal may transmit the acquired CSI by using a PUSCH scheduled based on corresponding DCI format 0_1. When one bit corresponding to an uplink data indicator (UL-SCH indicator) in DCI format 0_1 indicates "1," the terminal may multiplex the acquired CSI and uplink data (UL-SCH) on a PUSCH resource scheduled by DCI format 0_1 so as to transmit the same. When one bit corresponding to the uplink data indicator (UL-SCH indicator) in DCI format 0_1 indicates "0," the terminal may map only the CSI, without uplink data (UL-SCH), to the PUSCH resource scheduled by DCI format 0_1 so as to transmit the same.

FIG. 6E and FIG. 6F illustrate examples of an aperiodic CSI reporting method, respectively, according to an embodiment of the disclosure.

In the example of FIG. 6E, a terminal may acquire DCI format 0_1 by monitoring a PDCCH 651, and may acquire scheduling information and CSI request information for a PUSCH 655 therefrom. The terminal may acquire resource information of a CSI-RS 652 to be measured, from a received CSI request indicator. The terminal may determine a time point at which the terminal needs to measure a resource of the CSI-RS 652, based on a time point at which DCI format 0_1 is received, and a parameter for an offset (e.g., aforementioned aperiodicTriggeringOffset) in a CSI resource set configuration (e.g., an NZP CSI-RS resource set configuration (NZP-CSI-RS-ResourceSet)). More specifically, the terminal may be configured with offset value X of parameter aperiodicTriggeringOffset in the NZP-CSI-RS resource set configuration from a base station via higher-layer signaling, and the configured offset value X may refer to an offset between a slot in which DCI triggering aperiodic CSI reporting is received, and a slot in which the CSI-RS resource is transmitted. For example, parameter values of aperiodicTriggeringOffset and offset values X may have mapping relationships therebetween as shown in Table 8 below.

TABLE 8

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

FIG. 6E shows an example in which the aforementioned offset value 653 is configured so that X=0. In this case, the terminal may receive the CSI-RS 652 in a slot (corresponding to slot 0 656 in FIG. 6E) in which DCI format 0_1 triggering aperiodic CSI reporting is received, and may report CSI information measured based on the received CSI-RS 652 to the base station via the PUSCH 655. The terminal may acquire, from DCI format 0_1, scheduling information (information corresponding to each field of DCI format 0_1 described above) on the PUSCH 655 for CSI reporting. For example, in DCI format 01, the terminal may acquire information on a slot, in which the PUSCH 655 is to be transmitted, from time domain resource allocation information of the PUSCH 655 described above. In the example of FIG. 6, the terminal has acquired a K2 value 654 of 3 which corresponds to a slot offset value for PDCCH-to-PUSCH, and accordingly, the PUSCH 655 may be transmitted in slot 3 659, which is spaced 3 slots apart from slot 0 656, i.e., a time point at which the PDCCH 651 has been received.

In the example of FIG. 6F, the terminal may acquire DCI format 0_1 by monitoring a PDCCH 675, and may acquire scheduling information and CSI request information for a PUSCH 679 therefrom. The terminal may acquire resource information of a CSI-RS 676 to be measured, from a received CSI request indicator. The example of FIG. 6F shows an example in which offset value X 677 for the CSI-RS described above is configured to be 1 (X=1). In this case, the terminal may receive the CSI-RS 676 in a slot (corresponding to slot 0 685 of FIG. 6F) in which DCI format 0_1 triggering aperiodic CSI reporting is received, and may report CSI information measured based on the received CSI-RS to the base station via the PUSCH 6/05 in slot 3 659, which is spaced 3 slots apart from slot 0 685, according to a K2 value 678 corresponding to a slot offset value for PDCCH-to-PUSCH.

Control information is transmitted within first N OFDM symbols in a subframe. Control channel transmission interval N is generally N={1, 2, 3}. Therefore, the N value varies for each subframe according to the amount of control information to be transmitted in a current subframe. For example, the control information may include an indicator configured to indicate the number of OFDM symbols over which the control information is transmitted, scheduling information of uplink or downlink data, hybrid automatic repeat request (HARQ) acknowledgment (ACK)/negative ACK (NACK) signal, and so on.

The wireless communication system adopts an HARQ scheme of retransmitting corresponding data in a physical layer when a decoding failure occurs in initial transmission. In the HARQ scheme, when a receiver fails to correctly decode data, the receiver transmits information (e.g., NACK) notifying of the decoding failure to a transmitter so as to enable the transmitter to retransmit the data in a physical layer. The receiver improves data reception performance, by combining data, which is retransmitted by the transmitter, with the existing data for which decoding has failed. In addition, when the receiver correctly decodes data, the receiver may transmit information (e.g., ACK) notifying of a success of decoding to the transmitter so as to enable the transmitter to transmit new data.

One of important things to provide a high-speed data service in the communication system is to support a scalable bandwidth. In some embodiments, system transmission bands of an LTE system may have various bandwidths, such as 20/15/10/5/3/1.4 MHz. Therefore, service providers may provide services by selecting a specific bandwidth from among the various bandwidths. A terminal (e.g., the terminal 120) may be of various types for supporting a bandwidth of 20 MHz at maximum and supporting only a bandwidth of 1.4 MHz at minimum.

In the wireless communication system, a base station (e.g., the base station 110) informs the terminal of scheduling information for downlink data or uplink data via downlink control information (DCI). An uplink refers to a radio link for a terminal to transmit data or a control signal to a base station, and a downlink refers to a radio link for a base station to transmit data or a control signal to a terminal. By defining various formats, DCI is operated by applying a determined DCI format according to whether scheduling information is for uplink data (e.g., uplink (UL) grant) or scheduling information is for downlink data (downlink (DL) grant), whether the DCI is compact DCI having a small size of control information, whether spatial multiplexing using multiple antennas is applied, whether the DCI is for power control, and the like. For example, DCI format 1 which is scheduling control information (e.g., DL grant) for downlink data may be configured to include the following control information.

Resource allocation type 0/1 flag: Resource allocation type 0/1 flag is for notification of whether a resource allocation scheme is type 0 or type 1. Type 0 flag is for allocation of resources on a resource block group (RBG) basis by applying a bitmap scheme. In the LTE system, a basic scheduling unit is an RB expressed as time and frequency domain resources, and an RBG includes multiple RBs and serves as a basic scheduling unit in the scheme of type 0. Type 1 flag is for allocation of a specific RB in an RBG.

Resource block assignment: Resource block assignment is for notification of an RB assigned for data transmission. An expressed resource is determined according to a system bandwidth and a resource allocation scheme.

MCS: An MCS is for notification of a size of a transport block to be transmitted or a target code rate and a modulation scheme used for data transmission.

HARQ process number: An HARQ process number notifies of a process number of HARQ.

New data indicator: A new data indicator notifies whether transmission is HARQ initial transmission or retransmission.

Redundancy version: A redundancy version notifies of a redundancy version (RV) of HARQ.

TPC command for PUCCH: A TPC command for a physical uplink control channel (PUCCH) notifies of a power control command for the PUCCH which is an uplink control channel.

DCI is channel-coded, modulated, and then transmitted via a physical downlink control channel (PDCCH) which is a downlink physical control channel.

In general, DCI is channel-coded independently for each terminal, and then configured as an independent PDCCH to be transmitted. In the time domain, the PDCCH is mapped and transmitted during the control channel transmission interval. A mapping position of the PDCCH in the frequency domain may be determined by an identifier (ID) of each terminal and dispersed across the entire system transmission bandwidth.

Downlink data is transmitted via a physical downlink shared channel (PDSCH) which is a physical channel for downlink data transmission. The PDSCH is transmitted after the control channel transmission interval, and scheduling information, such as a specific mapping position in the frequency domain and a modulation scheme, is notified by the DCI transmitted via the PDCCH.

The base station notifies the terminal of the modulation scheme applied to the PDSCH to be transmitted and a size (e.g., a transport block size (TBS)) of data to be transmitted, via a 5-bit MCS in the control information constituting the DCI. The TBS corresponds to a size of data to be transmitted by the base station before channel coding for error correction is applied.

In a cellular system, such as a 5G NR or LTE/LTE-A system, a base station (e.g., the base station 110) needs to transmit a reference signal in order to measure a downlink channel state. For example, for an LTE-advanced (LTE-A) system of 3GPP, a terminal (e.g., the terminal 120) measures a channel state between a base station and the terminal itself by using a channel status information reference signal (CSI-RS) transmitted by the base station. For the channel state, several factors should be basically considered, where an interference amount in a downlink is included. The interference amount in the downlink includes an interference signal, thermal noise, etc. generated by an antenna belonging to an adjacent base station, and may be used for the terminal to determine a channel situation of the downlink. For example, when a base station having one transmission antenna transmits a reference signal to a terminal having one reception antenna, the terminal determines an energy per symbol to interference density ratio (Es/Io) by determining energy per symbol receivable via the downlink, which is based on the reference signal received from the base station, and the amount of interference to be concurrently received in an interval in which a corresponding symbol is received. The determined Es/Io is notified to the base station so as to enable the base station to determine a data transmission rate for transmission to the terminal via the downlink.

FIG. 7 illustrates an example of transmitting a channel quality indicator (CQI) that is one piece of channel state information of a terminal according to an interference intensity and signal energy measured by the terminal, according to an embodiment of the disclosure.

Referring to FIG. 7, a terminal (e.g., the terminal 120 of FIG. 1) may perform channel estimation by measuring a downlink reference signal, such as a CSI-RS, and may calculate Es (reception signal energy) by using a channel estimation result according to a wireless channel indicated by a solid line 700.

In addition, the terminal may calculate the intensity of noise and interference, indicated by a dotted line 710, by using the downlink reference signal or separate resources for interference and noise measurement.

In the LTE, in order to measure interference and noise, the base station uses a CRS that is a downlink reference signal, or configures an interference measurement resource for the terminal so as to assume that a signal measured in the corresponding radio resource is interference and the noise. By using the reception signal energy and the intensity of noise and interference, which are acquired by the method described above, the terminal determines a maximum data transmission rate receivable with a constant success rate, based on a corresponding signal-to-interference and noise ratio calculated by the terminal itself, and notifies the maximum data transmission rate to the base station.

The base station, which has been notified of the maximum data transmission rate supportable by the terminal at the corresponding signal-to-interference and noise ratio, determines, using the maximum data transmission rate, an actual data transmission rate of the downlink signal to be transmitted to the terminal. In the LTE/NR standard, a maximum data transmission rate at which a terminal is able to receive data from a base station at a constant success rate may be referred to as CQI.

In general, since a wireless channel varies over time, the terminal may periodically notify the base station of a CQI or may notify the base station of a CQI whenever the base station requests the CQI from the terminal. The scheme by which the base station requests the CQI from the terminal may be performed via one or more of periodic and aperiodic methods.

When the terminal or the base station accurately measures CQI information, and accurately transmits or receives the CQI information, an MCS suitable for a channel environment is configured, and thus efficient transmission or reception is possible while complying with a target error probability configured in the wireless communication system, so that, for a more advanced wireless communication system, it is required to define a method of generating and applying CQI and MCS tables suitable for services supporting various reliability levels.

Hereinafter, the disclosure proposes a method of designing new CQI and modulation and coding (MCS) tables in order to determine a combination of modulation and coding techniques or to accurately report a channel quality according to a target transmission or reception error probability required for efficient communication in a 4G or 5G communication system. Each element of the CQI table and MCS table may be expressed by a combination of a modulation order and a code rate, spectral efficiency, or the like. For reference, the spectral efficiency may be expressed as a modulation order product rate (MPR).

In addition, the disclosure proposes a method and a device for determining an efficient combination of modulation and coding techniques based on multiple MCS tables, or reporting an accurate channel quality based on multiple CQI tables according to a target transmission or reception error probability required for efficient communication in the 4G or 5G communication system. Different CQI tables and MCS tables are applicable according to a maximum modulation order or a target block error rate (BLER) configured in the system. Here, a BLER value may indicate an error occurrence probability after decoding of a received transport block is completed.

In some embodiments, the terminal may decode multiple transport blocks and then determine a BLER value via calculation. However, the terminal may determine the BLER value that is approximately expected via a reception signalto-noise ratio (SNR). When the terminal determines the BLER value that is approximately expected via the reception SNR, etc., even if actual decoding is not performed, the terminal may measure the reception SNR, predict a decoding success probability based on the SNR, and report a CQI index to the base station.

Description of CSI Reference Resource

In order to report a CQI index to the base station, the terminal reports the CQI index based on a CSI reference resource, the following items are some example elements constituting the CSI reference resource, and further items that are not described below may also be elements constituting the CSI reference resource.

First 2 OFDM symbols are used as control signals

The number of PDSCH and DMRS symbols is 12 symbols

Subcarrier spacing, such as bandwidth part (BWP) configured for PDSCH reception, and CP length Bandwidth size configured for CQI reporting Redundancy version (RV) 0

No REs allocated for NZP CSI-RS and ZP CSI-RS

PDSCH symbol includes no DMRS

PRB bundling size in units of 2 PRBs

PDSCH transmission can be performed with up to 8 transmission layers

Table 9 or Table 10 is a CQI table that may be used for CQI reporting for a case in which up to 64 QAM is available, Table 11 is a CQI table that may be used when CQI reporting is required for a case in which up to 256 QAM is available, and Table 12 is an example of a CQI table that may be used when CQI reporting is required for a case in which up to 1024 QAM is available.

In addition, Table 13 or Table 14 is an MCS table that may be used for MCS determination or configuration for a case in which up to 64 QAM is available for PDSCH or PUSCH, Table 15 is an MCS table that may be used for MCS determination or configuration for a case in which up to 256 QAM is available for PDSCH or PUSCH, and Table 16 is an MCS table that may be used for MCS determination or configuration for a case in which up to 1024 QAM is available for PDSCH or PUSCH.

The CQI tables of Table 9 to Table 12 may have values thereof configured via a 4-bit indicator, such as higher-layer signaling or DCI, and the MCS tables of Table 13 to Table 16 may have values thereof configured via a 5-bit indicator, such as higher-layer signaling or DCI.

TABLE 9

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

TABLE 10

| CQI index | modulation | code rate × 1024 | efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16 QAM | 378 | 1.4766 |
| 10 | 16 QAM | 490 | 1.9141 |
| 11 | 16 QAM | 616 | 2.4063 |
| 12 | 64 QAM | 466 | 2.7305 |
| 13 | 64 QAM | 567 | 3.3223 |
| 14 | 64 QAM | 666 | 3.9023 |
| 15 | 64 QAM | 772 | 4.5234 |

TABLE 11

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9141 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 256 QAM | 711 | 5.5547 |
| 13 | 256 QAM | 797 | 6.2266 |
| 14 | 256 QAM | 885 | 6.9141 |
| 15 | 256 QAM | 948 | 7.4063 |

TABLE 12

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 616 | 2.4063 |
| 6 | 64 QAM | 567 | 3.3223 |
| 7 | 64 QAM | 666 | 3.9023 |
| 8 | 64 QAM | 772 | 4.5234 |
| 9 | 64 QAM | 873 | 5.1152 |
| 10 | 256 QAM | 711 | 5.5547 |
| 11 | 256 QAM | 797 | 6.2266 |
| 12 | 256 QAM | 885 | 6.9141 |
| 13 | 256 QAM | 948 | 7.4063 |
| 14 | 1024 QAM | 853 | 8.3301 |
| 15 | 1024 QAM | 948 | 9.2578 |

TABLE 13

| MCS Index $I_{MCS}$ | Modulation Order $Q_m$ | Target code Rate [R × 1024] | Spectral efficiency |
|---|---|---|---|
| 0 | 2 | 120 | 0.2344 |
| 1 | 2 | 157 | 0.3066 |
| 2 | 2 | 193 | 0.3770 |

TABLE 13-continued

| MCS Index $I_{MCS}$ | Modulation Order $Q_m$ | Target code Rate [R × 1024] | Spectral efficiency |
|---|---|---|---|
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | reserved |
| 30 | 4 | | reserved |
| 31 | 6 | | reserved |

TABLE 14

| MCS Index $I_{MCS}$ | Modulation Order $Q_m$ | Target code Rate [R × 1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | | reserved |
| 30 | 4 | | reserved |
| 31 | 6 | | reserved |

TABLE 15

| MCS Index $I_{MCS}$ | Modulation Order $Q_m$ | Target code Rate [R × 1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | reserved |
| 29 | 4 | | reserved |
| 30 | 6 | | reserved |
| 31 | 8 | | reserved |

TABLE 16

| MCS Index $I_{MCS}$ | Modulation Order $Q_m$ | Target code Rate [R × 1024] | Spectral efficiency |
|---|---|---|---|
| 0 | 2 | 120 | 0.2344 |
| 1 | 2 | 193 | 0.3770 |
| 2 | 2 | 449 | 0.8770 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 517 | 3.0293 |
| 8 | 6 | 567 | 3.3223 |
| 9 | 6 | 616 | 3.6094 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.3320 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 8 | 948 | 7.4063 |
| 23 | 10 | 805.5 | 7.8662 |
| 24 | 10 | 853 | 8.3301 |
| 25 | 10 | 900.5 | 8.7939 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

Table 17 and Table 18 are MCS tables that may be used for MCS determination or configuration with respect to a PUSCH to which transform precoding and 64 QAM are applied. (q values in Table 17 and Table 18 are values determined depending on whether pi/2-BPSK is indicated, wherein q=1 if tp-pi2BPSK is configured in higher-layer signaling, otherwise q=2.)

TABLE 17

| MCS Index $I_{MCS}$ | Modulation Order $Q_m$ | Target code Rate [R × 1024] | Spectral efficiency |
|---|---|---|---|
| 0 | q | 240/q | 0.2344 |
| 1 | q | 314/q | 0.3770 |
| 2 | 2 | 193 | 0.6016 |
| 3 | 2 | 251 | 0.8770 |
| 4 | 2 | 308 | 1.1758 |
| 5 | 2 | 379 | 1.4766 |
| 6 | 2 | 449 | 1.6953 |
| 7 | 2 | 526 | 1.9141 |
| 8 | 2 | 602 | 2.1602 |
| 9 | 2 | 679 | 2.4063 |
| 10 | 4 | 340 | 2.5703 |
| 11 | 4 | 378 | 2.7305 |
| 12 | 4 | 434 | 3.0293 |
| 13 | 4 | 490 | 3.3223 |
| 14 | 4 | 553 | 3.6094 |
| 15 | 4 | 616 | 3.9023 |
| 16 | 4 | 658 | 4.2129 |
| 17 | 6 | 466 | 4.5234 |
| 18 | 6 | 517 | 4.8164 |
| 19 | 6 | 567 | 5.1152 |
| 20 | 6 | 616 | 5.3320 |
| 21 | 6 | 666 | 5.5547 |
| 22 | 6 | 719 | 5.8906 |
| 23 | 6 | 772 | 6.2266 |
| 24 | 6 | 822 | 6.5703 |
| 25 | 6 | 873 | 6.9141 |
| 26 | 6 | 910 | 7.1602 |
| 27 | 6 | 948 | 7.4063 |
| 28 | q | reserved | |
| 29 | 2 | reserved | |
| 30 | 4 | reserved | |
| 31 | 6 | reserved | |

TABLE 18

| MCS Index $I_{MCS}$ | Modulation Order $Q_m$ | Target code Rate [R × 1024] | Spectral efficiency |
|---|---|---|---|
| 0 | q | 60/q | 0.2344 |
| 1 | q | 80/q | 0.3770 |
| 2 | q | 100/q | 0.6016 |
| 3 | q | 128/q | 0.8770 |
| 4 | q | 156/q | 1.1758 |
| 5 | q | 198/q | 1.4766 |
| 6 | 2 | 120 | 1.6953 |
| 7 | 2 | 157 | 1.9141 |
| 8 | 2 | 193 | 2.1602 |
| 9 | 2 | 251 | 2.4063 |
| 10 | 2 | 308 | 2.5703 |
| 11 | 2 | 379 | 2.7305 |
| 12 | 2 | 449 | 3.0293 |
| 13 | 2 | 526 | 3.3223 |
| 14 | 2 | 602 | 3.6094 |
| 15 | 2 | 679 | 3.9023 |
| 16 | 4 | 378 | 4.2129 |
| 17 | 4 | 434 | 4.5234 |
| 18 | 4 | 490 | 4.8164 |
| 19 | 4 | 553 | 5.1152 |
| 20 | 4 | 616 | 5.3320 |
| 21 | 4 | 658 | 5.5547 |
| 22 | 4 | 699 | 5.8906 |
| 23 | 4 | 772 | 6.2266 |
| 24 | 6 | 567 | 6.5703 |
| 25 | 6 | 616 | 6.9141 |
| 26 | 6 | 666 | 7.1602 |

TABLE 18-continued

| MCS Index $I_{MCS}$ | Modulation Order $Q_m$ | Target code Rate [R × 1024] | Spectral efficiency |
|---|---|---|---|
| 27 | 6 | 772 | 7.4063 |
| 28 | q | reserved | |
| 29 | 2 | reserved | |
| 30 | 4 | reserved | |
| 31 | 6 | reserved | |

In more detailed descriptions of a procedure of determining the CQI index, the terminal derives or determines a highest CQI index that satisfies the following conditions with respect to a CQI value reported in uplink slot n:

COI Determination-1

A single PDSCH transport block having a combination of a modulation order (or technique), a target code rate, and a TBS, which corresponds to the CQI index, should be received such that the following transport block error probability is not exceeded:

(a) If CSI-higher-layer parameter cqi-Table (which is a parameter corresponding to the CQI table, and the name may be changed according to a standard version) included in CSI-ReportConfig configures (or indicates) Table 9 or Table 11 (or Table 12), a target transport block error probability is 0.1.

(b) If CSI-higher-layer parameter cqi-Table included in CSI-ReportConfig configures (or indicates) Table 10, the target transport block error probability is 0.00001.

CQI determination-1 refers to a relationship of a target BLER of a single PDSCH transport block and the configured CQI table and CQI index, for a case in which two target BLERs, such as 0.1 and 0.00001, exist in the system. Therefore, when the target BLER of the system is more subdivided, higher-layer parameters may also be configured in a more subdivided manner. As a specific example, when the CQI table for the case where target BLER=0.001 is given as shown in Table 19 or Table 20, configurations, such as the following CQI determination-2, are also possible.

TABLE 19

| CQI Index | modulation | code rate × 1024 | efficiency |
|---|---|---|---|
| 0 | | out of range | |
| 1 | QPSK | 50 | 0.0977 |
| 2 | QPSK | 78 | 0.1623 |
| 3 | QPSK | 120 | 0.2344 |
| 4 | QPSK | 193 | 0.3770 |
| 5 | QPSK | 308 | 0.6016 |
| 6 | QPSK | 449 | 0.8770 |
| 7 | QPSK | 602 | 1.1758 |
| 8 | 16QAM | 378 | 1.4766 |
| 9 | 16QAM | 490 | 1.9141 |
| 10 | 16QAM | 616 | 2.4063 |
| 11 | 64QAM | 466 | 2.7305 |
| 12 | 64QAM | 667 | 3.3223 |
| 13 | 64QAM | 666 | 3.0023 |
| 14 | 64QAM | 772 | 4.5234 |
| 15 | 64QAM | 873 | 5.1152 |

TABLE 20

| CQI index | modulation | code rate × 1024 | efficiency |
|---|---|---|---|
| 0 | | out of range | |
| 1 | QPSK | 50 | 0.0977 |
| 2 | QPSK | 78 | 0.1523 |

TABLE 20-continued

| CQI index | modulation | code rate × 1024 | efficiency |
|---|---|---|---|
| 3 | QPSK | 198 | 0.3770 |
| 4 | QPSK | 449 | 0.8770 |
| 5 | 16QAM | 378 | 1.4766 |
| 6 | 16QAM | 490 | 1.9141 |
| 7 | 16QAM | 616 | 2.4063 |
| 8 | 64QAM | 466 | 2.7305 |
| 9 | 64QAM | 667 | 3.3223 |
| 10 | 64QAM | 66 | 3.9023 |
| 11 | 64QAM | 772 | 4.8234 |
| 12 | 64QAM | 873 | 6.1162 |
| 13 | 256QAM | 711 | 5.6547 |
| 14 | 256QAM | 797 | 6.2266 |
| 15 | 256QAM | 885 | 6.9141 |

CQI Determination-2

A single PDSCH transport block having a combination of a modulation order (or technique), a target code rate, and a TBS, which corresponds to the CQI index, should be received such that the following transport block error probability is not exceeded:

(a) If CSI-higher-layer parameter cqi-Table included in CSI-ReportConfig configures (or indicates) Table 9 or Table 10, the target transport block error probability is 0.1.

(b) If CSI-higher-layer parameter cqi-Table included in CSI-ReportConfig configures (or indicates) Table 19 (or Table 20), the target transport block error probability is 0.001.

(C) If CSI-higher-layer parameter cqi-Table included in CSI-ReportConfig configures (or indicates) Table 11, the target transport block error probability is 0.00001.

Since the condition for the transport block error probability may indicate an approximate or substantial value, an actual BLER value that is satisfied in the communication system may at least temporarily have a value in a range slightly smaller or larger than the values of 0.1 and 0.00001 defined in the specification. However, the system is operated so that an average transport block error probability is close or approximate to the values of 0.1 and 0.00001 defined above. Here, the close value may refer to a value within 10% to 50% of the configured target BLER value, or may refer to a value in another range configured in the system.

According to an embodiment, in order to derive an appropriate target BLER value determined for CQI index reporting, a resource use rate, such as the number of RE resources, terminal implementation capability for accurate CQI index estimation, a level of an SNR difference for each target BLER when multiple target BLERs exist and whether different CQI index reporting is possible, which is cause by the SNR difference, for each target BLER in various wireless communication environments, a terminal implementation complexity when the number of multiple target BLER types increases, and the like should be considered.

When multiple target BLERs exist, the terminal reports a CQI index estimated based on at least one target BLER, and the target BLER value may be configured by a higher signal or signal L1.

In the current 5G NR system, 0.1 and 0.00001 are considered as target BLER values, wherein the latter case may be configured in consideration of a service requiring high reliability or low latency, for example, a service scenario such as URLLC. However, as LTE or 5G NR systems spread, more diverse services for different purposes are required. These various services may require various system conditions in consideration of not only reliability or low-latency characteristics, but also a location where a service is supported, average data traffic, and a terminal type according to each service. Accordingly, a target BLER may be different according to requirements of each service, and a CQI table or an MCS table to be used by a terminal or a base station may be differently configured according to the target BLER or a maximum modulation order required in the system.

Hereinafter, an embodiment proposes a method of designing a CQI table or configuring or using the designed CQI table in order to transmit channel state information (CSI) by a device (i.e., a communication device of a base station, a terminal, or the like) including a transceiver and at least one processor coupled with the transceiver in the wireless communication system according to the disclosure.

In particular, an embodiment proposes a method of designing a CQI table or configuring or using the designed CQI table when supported services or maximum modulation orders are different from each other. In addition, an embodiment proposes a method of determining, configuring, or using an appropriate MCS by using a designed MCS table or an appropriate MCS table corresponding to the CQI table.

For reference, for convenience of description, in order to maintain signaling overhead at an LTE level, the disclosure proposes various embodiments for a case where the CQI and MCS indicators are maintained to be 4 bits and 5 bits, respectively, as before, and CQI index 0 is also defined as "out of range." However, configuration of the CQI indicator to be 5 bits or configuration of the MCS indicator to be 6 bits is not excluded.

Embodiment 1 of the disclosure proposes a method of designing (or determining or configuring) a CQI table for a case where a maximum modulation order is 12, that is, a maximum modulation scheme is 4096 QAM, and proposes a method of using the designed (or determined or configured) CQI table in a terminal or a base station. The CQI table is applicable not only to the 5G NR system but also to various wireless communication systems using 4096 QAM.

Embodiment 2 of the disclosure proposes a method of designing (or determining or configuring) an MCS table for a case where a maximum modulation order is 12, that is, a maximum modulation scheme is 4096 QAM, and proposes a method of using the designed (or determined or configured) MCS table in a terminal or a base station. The MCS table is applicable not only to the 5G NR system but also to various wireless communication systems using 4096 QAM.

Embodiment 3 of the disclosure proposes an operation method and a method (used for MCS index determination) of using the CQI or MCS table, which is designed in embodiment 1 and embodiment 2, in a terminal or a base station when support of 4096 QAM is allowed in the 5G NR system.

Embodiment 4 of the disclosure proposes a limited buffer rate matching (LBRM) processing method when support of 4096 QAM is allowed in the 5G NR system.

Embodiment 5 of the disclosure proposes a phase tracking reference signal (PT-RS) reception method when support of 4096 QAM is allowed in the 5G NR system.

Embodiment 6 of the disclosure proposes a method of defining and using RRC signaling and a method of defining and using a physical layer parameter for reporting or configuring UE capability, when support of 4096 QAM is allowed in the 5G NR system.

Embodiment 7 of the disclosure proposes a TBS determination method and a method of determining a supported maximum data rate of the system when 1024 QAM or 4096 QAM is applied in the 5G NR system.

Embodiment 8 of the disclosure proposes an efficient MCS determination method for retransmission in the 5G NR system.

Each of the above embodiments is divided for convenience to describe implementation according to the disclosure, and all or some of the respective embodiments, or all or some of other additional embodiments set forth in the present disclosure, may be selectively combined and configured to achieve various implementations via the disclosure.

Hereinafter, detailed descriptions of respective embodiments are as follows.

Embodiment 1

In general, SNR-based channel capacity may be expressed by: 1) the number of bits (unit: bits/sec) transmittable in 1 second; 2) bandwidth efficiency in a form normalized to bandwidth, that is, the number of bits (unit: bits/sec/Hz) transmittable when a bandwidth of 1 Hz per second is used; or 3) the number of bits (unit: bits/channel use) transmittable when a channel is used once regardless of bandwidth or time constraints. In general, the channel capacity may vary depending on an available bandwidth. However, typically, when considering a bandwidth-limited waveform. having a bandwidth of W [Hz] according to Nyquist-Shannon's Sampling Theory, a corresponding signal is restorable by a fixed sampling operation of 2 W per second (=2 W [channel use/sec]), so that the three values may be considered to have a substantially 1:1 correspondence relationship. In some cases, since a minimum average SNR value for successful transmission of a specific number of bits is referred to as SNR limit or SNR-based channel capacity, it may be seen that, depending on an application situation, the channel capacity may be expressed based on the number of transmittable bits or may be expressed as a minimum SNR value required to transmit the number of bits, and both cases have similar concepts.

It may be expected that the channel capacity is influenced by an error probability (or BLER) of a reception bit allowed by the system. For example, when channel coding having code rate R is applied, if an SNR-based channel capacity, for which error free has been assumed, is $C_{SNR}(R)$, channel capacity $C_{SNR,b}(R)$ of a case where a target bit error rate is $P_b$ may have a relationship in which $C_{SNR,b}(R) < C_{SNR}(R)$. This is because, for example, in a system for a strong condition where the system is error free, an SNR level required under a condition allowing a certain degree of a bit error rate or BLER is low.

Accordingly, since an operation SNR is also variable according to the allowable system target bit error rate or BLER, an optimized modulation order and code rate combination or a target spectral efficiency value may be changed according to the target bit error rate. In addition, a bit error rate against an SNR increase decreases exponentially, and therefore when designing or configuring an optimal CQI table or MCS table, it is desirable to design the same in consideration of a log-scale for the target BLER or bit error rate. For this reason, typically, indexes included in the CQI table or the MCS table may be determined uniformly so as to have an operation signal-to-noise ratio (SNR) interval supporting the target BLER of the system.

As another method of determining indexes included in the CQI table or MCS table uniformly so as to have the operation SNR interval supporting the target BLER of the system, there is a method of determining theoretical spectral efficiency to be as uniform as possible. Depending on a channel coding scheme, actual spectral efficiency according to the operation SNR may be slightly different from the theoretical spectral efficiency, but when an excellent channel coding scheme, such as LDPC coding, Turbo coding, or Polar coding, is applied, the difference is insignificant, so that when it is not easy to accurately predict the operation SNR of the system, the CQI or MCS table may be designed or determined based on theoretical spectral efficiency.

Typical channel capacity increases along a log-scale as an SNR increases. However, this corresponds to only a case where there is no limitation in a modulation scheme, and in reality, depending on a modulation scheme, channel capacity may have a very clear upper limit value. As a specific example, if a system uses a 1024 QAM modulation scheme, the system is assumed to operate on an error-free channel, and even if channel coding is not applied (i.e., coding rate=1), only up to 10 bits are transmittable when the channel is used once, so that 10 cannot be exceeded based on [bits/channel use] no matter how high an SNR is. In a case where a modulation scheme, such as QAM, is determined, when channel capacity increases in a log-scale according to an SNR, and a value becomes close to a modulation order value, convergence occurs very rapidly and the channel capacity increases very slowly.

In order to configure the CQI table or the MCS table as described above, a channel coding type, a target BLER, a modulation scheme, etc. should be taken into consideration in a complex manner to determine a combination of a modulation scheme and a code rate, which is suitable for the system.

As an embodiment of the disclosure, examples of the CQI table for the system using 4096 QAM are shown in Table 21 and Table 22.

TABLE 21

| CQI index | modulation | code rate × 1024 | efficiency |
|---|---|---|---|
| 0 | | out of range | |
| 1 | QPSK | 449 | 0.8770 |
| 2 | 16 QAM | 378 | 1.4766 |
| 3 | 16 QAM | 616 | 2.4063 |
| 4 | 64 QAM | 567 | 3.3223 |
| 5 | 64 QAM | 666 | 3.9023 |
| 6 | 64 QAM | 772 | 4.5234 |
| 7 | 64 QAM | 873 | 5.1152 |
| 8 | 256 QAM | 711 | 5.5547 |
| 9 | 256 QAM | 797 | 6.2266 |
| 10 | 256 QAM | 885 | 6.9141 |
| 11 | 256 QAM | 948 | 7.4063 |
| 12 | 1024 QAM | 853 | 8.3301 |
| 13 | 1024 QAM | 948 | 9.2578 |
| 14 | 4096 QAM | 869 | 10.1836 |
| 15 | 4096 QAM | 948 | 11.1094 |

TABLE 22

| CQI index | modulation | code rate × 1024 | efficiency |
|---|---|---|---|
| 0 | | out of range | |
| 1 | 16 QAM | 378 | 1.4766 |
| 2 | 16 QAM | 490 (or 497) | 1.9141 (or 1.9414) |
| 3 | 16 QAM | 616 | 2.4063 |
| 4 | 64 QAM | 567 | 3.3223 |
| 5 | 64 QAM | 666 | 3.9023 |
| 6 | 64 QAM | 772 | 4.5234 |
| 7 | 64 QAM | 873 | 5.1152 |
| 8 | 256 QAM | 711 | 5.5547 |
| 9 | 256 QAM | 797 | 6.2266 |

TABLE 22-continued

| CQI index | modulation | code rate × 1024 | efficiency |
|---|---|---|---|
| 10 | 256 QAM | 885 | 6.9141 |
| 11 | 256 QAM | 948 | 7.4063 |
| 12 | 1024 QAM | 853 | 8.3301 |
| 13 | 1024 QAM | 948 | 9.2578 |
| 14 | 4096 QAM | 869 | 10.1836 |
| 15 | 4096 QAM | 948 | 11.1094 |

The system capable of using 4096 QAM refers to an environment in which a very large SNR value is obtainable in communication between a terminal and a base station, and it may be thus expected that using a low-order modulation scheme can be an inefficient environment from an average perspective. Therefore, since it may be desirable not to use a possible QPSK modulation scheme, it is configured to include one or fewer QPSK modulation schemes in the CQI table. For example, for CQI index 1, it may be seen that a combination having low spectral efficiency in Table 9 to Table 12, such as (modulation scheme, code rate)=(QPSK, 30/1024), (QPSK, 50/1024), or (QPSK, 78/1024), is an undesirable combination. That is, the CQI table corresponding to 4096 QAM preferably has a value equal to or greater than 0.2344 corresponding to a case where the spectral efficiency is at least (modulation scheme, code rate)= (QPSK, 120/1024). For example, Table 21 is a CQI table designed based on Table 12, a 1024 QAM CQI table, and is an example in which, among QPSK-related combinations in Table 12, combinations of (modulation scheme, code rate)= (QPSK, 78/1024) and (QPSK, 193/1024) corresponding to respective CQI indexes 1 and 2 are removed, and two combinations corresponding to 4096 QAM are added. When only one QPSK modulation scheme is included, combinations corresponding to CQI indexes 1 and 3 among the QPSK-related combinations in Table 12 may be removed, and (QPSK, 193/1024) instead of (QPSK, 449/1024) may be added to index 1 of a new CQI table. In addition, for CQI index 1, a combination included in another CQI table, for example, a combination such as (QPSK, 308/1024) or (QPSK, 602/1024), is also possible.

Since Table 21 is configured by, in a 1024 QAM CQI table such as Table 12, removing two (modulation scheme, code rate) combinations corresponding to QPSK and adding two (modulation scheme, code rate) combinations corresponding to 4096 QAM, the number of (modulation scheme, code rate) (or spectral efficiency) combinations included in the CQI table corresponds to 1, 2, 4, 4, 2, and 2 according to respective modulation schemes with respect to cases of the QPSK modulation scheme (or modulation order 2), the 16 QAM modulation scheme (or modulation order 4), the 64 QAM modulation scheme (or modulation order 6), the 256 QAM modulation scheme (or modulation order 8), the 1024 QAM modulation scheme (or modulation order 10), and the 4096 QAM modulation scheme (or modulation order 12), respectively.

On the other hand, Table 22 corresponds to an embodiment in which a minimum modulation order is configured to be 4 by not considering the QPSK modulation scheme from the beginning. Since Table 22 is configured by, in a 1024 QAM CQI table such as Table 12, removing all three (modulation scheme, code rate) combinations corresponding to QPSK and adding one (modulation scheme, code rate) combination corresponding to 16 QAM and two (modulation scheme, code rate) combinations corresponding to 4096 QAM, the number of (modulation scheme, code rate) combinations included in the CQI table corresponds to 3, 4, 4, 2, and 2 according to respective modulation schemes with respect to cases of the 16 QAM modulation scheme (or modulation order 4), the 64 QAM modulation scheme (or modulation order 6), the 256 QAM modulation scheme (or modulation order 8), the 1024 QAM modulation scheme (or modulation order 10), and the 4096 QAM modulation scheme (or modulation order 12), respectively.

In Table 22, (16 QAM, 490/1024) (spectral efficiency=1.9141) has been added as a (modulation method, code rate) combination, and this is an example in which a value corresponding to spectral efficiency between (16 QAM, 378/1024) and (16 QAM, 616/1024) is applied in Table 9 to Table 16. Of course, in a newly designed CQI table, 497/1024, which is an average value of 378/1024 and 616/1024, may be applied as a code rate.

If the system is to support large-scale spectrum efficiency for QPSK to 4096 QAM, a CQI table including two QPSK combinations may be considered as shown in Table 23.

TABLE 23

| CQI index | modulation | code rate × 1024 | efficiency |
|---|---|---|---|
| 0 | | out of range | |
| 1 | QPSK | 193 | 0.3770 |
| 2 | QPSK | 449 | 0.8770 |
| 3 | 16 QAM | 378 | 1.4766 |
| 4 | 16 QAM | 616 | 2.4063 |
| 5 | 64 QAM | 567 | 3.3223 |
| 6 | 64 QAM | 666 | 3.9023 |
| 7 | 64 QAM | 772 | 4.5234 |
| 8 | 256 QAM | 711 | 5.5547 |
| 9 | 256 QAM | 797 | 6.2266 |
| 10 | 256 QAM | 885 | 6.9141 |
| 11 | 256 QAM | 948 | 7.4063 |
| 12 | 1024 QAM | 853 | 8.3301 |
| 13 | 1024 QAM | 948 | 9.2578 |
| 14 | 4096 QAM | 869 | 10.1836 |
| 15 | 4096 QAM | 948 | 11.1094 |

Since Table 23 is configured by, in a 1024 QAM CQI table such as Table 12, removing one (modulation scheme, code rate) combination corresponding to QPSK and one (modulation scheme, code rate) combination corresponding to 64 QAM and adding two (modulation scheme, code rate) combinations corresponding to 4096 QAM, the number of (modulation scheme, code rate) combinations included in the CQI table corresponds to 2, 2, 3, 4, 2, and 2 according to respective modulation schemes with respect to cases of the QPSK modulation scheme (or modulation order 2), the 16 QAM modulation scheme (or modulation order 4), the 64 QAM modulation scheme (or modulation order 6), the 256 QAM modulation scheme (or modulation order 8), the 1024 QAM modulation scheme (or modulation order 10), and the 4096 QAM modulation scheme (or modulation order 12), respectively. A characteristic of a CQI table such as Table 23 corresponds to an embodiment of including two or more combinations for each modulation scheme for flexible support of large-scale spectrum efficiency, wherein a combination corresponding to 64 QAM is excluded to maximally include a combination included in existing CQI tables (particularly, 1024 QAM). Of course, it is possible to exclude a combination corresponding to 256 QAM. However, as described above, since a situation in which 4096 QAM is applicable is likely to be a very good channel environment in general, it may be desirable to maintain a combination corresponding to high spectral efficiency or a high-order modulation scheme.

Table 21 to Table 23 and various modified embodiments all include two (modulation scheme, code rate) combinations corresponding to 4096 QAM. As described above for the channel capacity, if a code rate is configured too high and thus spectral efficiency has a value too close to 12, a very high SNR needs to be obtained to satisfy the spectral efficiency while satisfying a target BLER, so that a very high transmission power may be required for a terminal or a base station. Therefore, in several embodiments incorporating features of the present disclosure, a maximum code rate is limited to 948/1024 so as to have a sufficient difference from theoretically transmittable spectral efficiency 12. That is, the limitation indicates that maximum spectral efficiency corresponding to CQI index 15 on the CQI table corresponding to 4096 QAM is 11.1094.

A spectral efficiency value corresponding to CQI index 14 may be determined based on (modulation scheme, code rate) combinations of index 13 and index 15, wherein, for example, the value may be configured using the following average value:

$$\frac{1}{2} \times \left( \frac{948}{1024} \times 10 + \frac{948}{1024} \times 12 \right).$$

In addition, a code rate enabling to support the spectral efficiency for 4096 QAM may be determined as 869/1024. The spectral efficiency value may also be determined using an approximate value within −3% to +3% of an exact average value, in which case, an approximate value, such as 868, 868.5, 869.5, or 870, may be determined as a [code rate (R)×1024] value. (The spectral efficiency in each case is 10.1719 or 10.1953) Accordingly, the CQI table corresponding to 4096 QAM proposed in the disclosure includes (4096 QAM, 869/1024) for index 14 and (4096 QAM, 948/1024) for index 15 as shown in Table 24.

TABLE 24

| CQI index | modulation | code rate × 1024 | efficiency |
|---|---|---|---|
| 0 | | out of range | |
| 1 | — | — | — |
| . . . | . . . | . . . | . . . |
| 13 | — | — | — |
| 14 | 4096 QAM | 869 | 10.1836 |
| 15 | 4096 QAM | 948 | 11.1094 |

Table 21 to Table 24 and CQI tables corresponding to various modified embodiments may also be configured and used as parameter cqi_Table in CQI determination-1 or CQI determination-2 by a terminal or a base station.

Embodiment 2

Embodiment 2 in the disclosure describes a method of designing an appropriate MCS table when a 4096 QAM modulation scheme, having a maximum modulation order of 12, is allowed in the wireless communication system, such as 5G NR, as well as a method of data transmission and reception based on the MCS table.

A newly defined MCS table can be designed based on one of a 5G NR system, a newly designed CQI table, or an MCS table, for example, as shown in Table 9 to Table 24. For convenience, descriptions are provided for a case where MCS indexes 22 to 25 or MCS indexes 23 to 26 correspond to the 4096 QAM modulation scheme, i.e., modulation order 12.

In Table 12, Table 16 or Table 21 to Table 23, a value with a highest code rate corresponding to 1024 QAM is 948/1024, which may be expressed as a (modulation order, code rate) combination such as (10, 948/1024), and spectral efficiency in this case may be rounded up and then displayed only up to 4 decimal points for convenience and regarded as 9.2578. In this embodiment, it is assumed that a newly designed MCS table having a maximum modulation order of 12 includes a (10, 948/1024) combination, and this combination corresponds to a largest value among MCS index values corresponding to 1024 QAM. That is, in the embodiment, only a case where the (10, 948/1024) combination corresponds to MCS index 21 or 22 is described for convenience of description, but the disclosure is not necessarily limited thereto.

When a largest value among the MCS index values corresponding to 1024 QAM is 21, and a (modulation order, code rate) combination corresponding thereto is (10, 948/1024), it is preferable to configure MCS index 22 to be a spectral efficiency average value or a value close to the average corresponding to each of CQI indexes 13 and 14 in the CQI tables Table 21 to Table 23. For example, the average value of spectral efficiency of CQI index 13 and spectral efficiency of CQI index 14 in Table 21 to Table 23 may be obtained as follows:

$$\frac{1}{2} \times \left( \frac{948}{1024} \times 10 + \frac{869}{1024} \times 12 \right) (\cong 9.7202).$$

For spectral efficiency corresponding to index 22 of the newly defined MCS table, the spectral efficiency may be defined (or determined) by an approximate value of the average value instead of the exact average value, wherein the approximate value may refer to a value within +3% or −3% of the exact average value.

In the MCS table, when a modulation order corresponding to index 22 is 12, and spectral efficiency is $$\frac{1}{2} \times \left( \frac{948}{1024} \times 10 + \frac{869}{1024} \times 12 \right),$$

code rate (R)×1024 has a value of 829.5. In this case, the spectral efficiency may be an approximate value that is 9.7207. If the approximate value of 829.5, such as 829 or 830, is selected as the code rate (R)×1024 value, spectral efficiency may be determined to be each of 9.7148 and 9.7266.

For spectral efficiency and a [code rate (R)×1024] value which corresponds to MCS index 23 of the newly defined MCS table, values corresponding to CQI table index 14 of Table 21 to Table 24 may be used as they are. Similarly, for spectral efficiency and a [code rate (R)×1024] value which corresponds to MCS index 25, values corresponding to CQI table index 15 of Table 21 to Table 24 may be used as they are.

Spectral efficiency corresponding to MCS index 24 of the newly defined MCS table may be determined to be an average value of values corresponding to CQI index 14 and CQI index 15 in Table 21 to Table 24 or an approximate value of the average value. Alternatively, the spectral efficiency may also be determined to be an average value of values corresponding to MCS index 23 and MCS index 25 or an approximate value of the average value.

For MCS index 24, it is preferable to configure spectral efficiency to be an average value of spectral efficiency corresponding to each of CQI indexes 14 and 15 in the CQI tables of Table 21 to Table 23 or an approximate value of the average value. For example, the average value of spectral efficiency of CQI index 13 and spectral efficiency of CQI index 14 of Table 21 to Table 23 may be obtained as follows:

$$\frac{1}{2} \times \left( \frac{869}{1024} \times 12 + \frac{948}{1024} \times 12 \right) (\cong 10.6465).$$

In the MCS table, as an example, when a modulation order corresponding to index 24 is 12, and spectral efficiency is $$\frac{1}{2} \times \left( \frac{869}{1024} \times 12 + \frac{948}{1024} \times 12 \right),$$

[code rate (R)×1024] has a value of 908.5. In this case, the spectral efficiency may be an approximate value that is 10.6465. If the approximate value of 908.5, such as 908 or 909, is selected as the [code rate (R)×1024] value, spectral efficiency may be determined to be each of 10.6406 and 10.6523.

Table 25 shows an example of the MCS table designed via the methods described above. If a last MCS index corresponding to 1024 QAM is I, and (MCS index, modulation order, code rate) corresponds to (I, 10, 948/1024) so that (MCS index, modulation order, code rate)=(I, 10, 948/1024), (MCS index, modulation order, code rate) may correspond to (I+1, 12, 829.5/1024) (or (I+1, 12, 829/1024) or (I+1, 12, 830)/1024)), and (I+2, 12, 869/1024) (or a combination corresponding to index 14 of the CQI table corresponding to 4096 QAM), (I+3, 12, 908.5/1024) (or (I+3, 12, 908/1024) or (I+3, 12, 909)/1024)), and (I+4, 12, 948/1024) (or a combination corresponding to index 15 of the CQI table corresponding to 4096 QAM may be determined in subsequent indexes.

TABLE 25

| MCS index $I_{MCS}$ | Modulation Order $Q_m$ | Target Code Rate [R × 1024] | Spectral Efficiency |
|---|---|---|---|
| 0 | — | — | — |
| 1 | — | — | — |
| . . . | . . . | . . . | . . . |
| | 12 | 829.5 | 9.7207 |
| | 12 | 869 | 10.1836 |
| | 12 | 908.5 | 10.6465 |
| | 12 | 948 | 11.1094 |
| . . . | . . . | . . . | . . . |
| 31 | 12 | | reserved |

For example, for I=21, (21, 10, 948/1024), (22, 12, 829.5/1024), (23, 12, 869/1024), (24, 12, 908.5/1024), and (25, 12, 948/1024) may be expressed, and I=22 may indicate that (22, 10, 948/1024), (23, 12, 829.5/1024), (24, 12, 869/1024), (25, 12, 908.5/1024), and (26, 12, 948/1024) may be expressed. The example shows that each [code rate (R)×1024] value is allowed up to a unit of 0.5. However, if an integer value is applied as much as possible, combinations such as (10, 948/1024), (12, 829/1024), (12, 868/1024), (12, 908/1024), and (12, 948/1024) or (10, 948/1024), (12, 830/1024), (12, 870/1024), (12, 909/1024), and (12, 948/1024) may also be expressed. In addition, when the MCS table using 4096 QAM is configured, a reserved field corresponding to retransmission or HARQ operation may be assigned for last MCS index 31. The reserved field may be used for various purposes depending on the system. In particular, the reserved field may be used during retransmission or HARQ operation, may indicate transmission of the same transport block as a previously transmitted transport block, and may indicate that application has been made in the same way as that for a previously applied MCS (that is, indicating that the same modulation scheme and the same code rate are used for the same transport block).

Table 26 to Table 28 show a simple embodiment of an MCS table that may be used for MCS determination or configuration with respect to a case where up to 4096 QAM is available for a PDSCH or a PUSCH, based on Table 25 and various modifications thereof and Table 16.

TABLE 26

| MCS Index $I_{MCS}$ | Modulation Order $Q_m$ | Target code Rate [R × 1024] | Spectral efficiency |
|---|---|---|---|
| 0 | 2 | 449 | 0.8770 |
| 1 | 4 | 378 | 1.4766 |
| 2 | 4 | 616 | 2.4063 |
| 3 | 6 | 517 | 3.0293 |
| 4 | 6 | 567 | 3.3223 |
| 5 | 6 | 616 | 3.6094 |
| 6 | 6 | 666 | 3.9023 |
| 7 | 6 | 719 | 4.2129 |
| 8 | 6 | 772 | 4.5234 |
| 9 | 6 | 822 | 4.8164 |
| 10 | 6 | 873 | 5.1152 |
| 11 | 8 | 711 | 5.5547 |
| 12 | 8 | 754 | 5.8906 |
| 13 | 8 | 797 | 6.2266 |
| 14 | 8 | 841 | 6.5703 |
| 15 | 8 | 885 | 6.9141 |
| 16 | 8 | 916.5 | 7.1602 |
| 17 | 8 | 948 | 7.4063 |
| 18 | 10 | 805.5 | 7.8662 |
| 19 | 10 | 853 | 8.3301 |
| 20 | 10 | 900.5 | 8.7939 |
| 21 | 10 | 948 | 9.2578 |
| 22 | 12 | 829.5 | 9.7207 |
| 23 | 12 | 869 | 10.1836 |
| 24 | 12 | 908.5 | 10.6465 |
| 25 | 12 | 948 | 11.1094 |
| 26 | 2 | reserved | |
| 27 | 4 | reserved | |
| 28 | 6 | reserved | |
| 29 | 8 | reserved | |
| 30 | 10 | reserved | |
| 31 | 12 | reserved | |

TABLE 27

| MCS Index $I_{MCS}$ | Modulation Order $Q_m$ | Target code Rate [R × 1024] | Spectral efficiency |
|---|---|---|---|
| 0 | 2 | 193 | 0.3770 |
| 1 | 2 | 449 | 0.8770 |
| 2 | 4 | 378 | 1.4766 |
| 3 | 4 | 616 | 2.4063 |
| 4 | 6 | 517 | 3.0293 |
| 5 | 6 | 567 | 3.3223 |
| 6 | 6 | 616 | 3.6094 |
| 7 | 6 | 666 | 3.9023 |
| 8 | 6 | 719 | 4.2129 |
| 9 | 6 | 772 | 4.5234 |
| 10 | 6 | 822 | 4.8164 |
| 11 | 8 | 711 | 5.5547 |
| 12 | 8 | 754 | 5.8906 |

45

TABLE 27-continued

| MCS Index $I_{MCS}$ | Modulation Order $Q_m$ | Target code Rate [R × 1024] | Spectral efficiency |
|---|---|---|---|
| 13 | 8 | 797 | 6.2266 |
| 14 | 8 | 841 | 6.5703 |
| 15 | 8 | 885 | 6.9141 |
| 16 | 8 | 916.5 | 7.1602 |
| 17 | 8 | 948 | 7.4063 |
| 18 | 10 | 805.5 | 7.8662 |
| 19 | 10 | 853 | 8.3301 |
| 20 | 10 | 900.5 | 8.7939 |
| 21 | 10 | 948 | 9.2578 |
| 22 | 12 | 829.5 | 9.7207 |
| 23 | 12 | 869 | 10.1836 |
| 24 | 12 | 908.5 | 10.6465 |
| 25 | 12 | 948 | 11.1094 |
| 26 | 2 | reserved | |
| 27 | 4 | reserved | |
| 28 | 6 | reserved | |
| 29 | 8 | reserved | |
| 30 | 10 | reserved | |
| 31 | 12 | reserved | |

TABLE 28

| MCS Index $I_{MCS}$ | Modulation Order $Q_m$ | Target code Rate [R × 1024] | Spectral efficiency |
|---|---|---|---|
| 0 | 2 | 193 | 0.3770 |
| 1 | 2 | 449 | 0.8770 |
| 2 | 4 | 378 | 1.4766 |
| 3 | 4 | 616 | 2.4063 |
| 4 | 6 | 517 | 3.0293 |
| 5 | 6 | 567 | 3.3223 |
| 6 | 6 | 616 | 3.6094 |
| 7 | 6 | 666 | 3.9023 |
| 8 | 6 | 719 | 4.2129 |
| 9 | 6 | 772 | 4.5234 |
| 10 | 6 | 822 | 4.8164 |
| 11 | 6 | 873 | 5.1152 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 948 | 7.4063 |
| 18 | 10 | 805.5 | 7.8662 |
| 19 | 10 | 853 | 8.3301 |
| 20 | 10 | 900.5 | 8.7939 |
| 21 | 10 | 948 | 9.2578 |
| 22 | 12 | 829.5 | 9.7207 |
| 23 | 12 | 869 | 10.1836 |
| 24 | 12 | 908.5 | 10.6465 |
| 25 | 12 | 948 | 11.1094 |
| 26 | 2 | reserved | |
| 27 | 4 | reserved | |
| 28 | 6 | reserved | |
| 29 | 8 | reserved | |
| 30 | 10 | reserved | |
| 31 | 12 | reserved | |

Table 26 is an example in which, in an MCS table for 1024 QAM such as Table 16, two (modulation order, code rate) combinations corresponding to QPSK are removed, one (modulation order, code rate) combination corresponding to each 16 QAM/64 QAM/256 QAM is removed, and four (modulation order, code rate) combinations corresponding to 4096 QAM and a reserved field are added. Table 27 is an example in which, in an MCS table for 1024 QAM such as Table 16, one (modulation order, code rate) combination corresponding to each QPSK/16 QAM/256 QAM is removed, two (modulation order, code rate) combinations corresponding to 64 QAM are removed, and four (modulation order, code rate) combinations corresponding to 4096 QAM and a reserved field are added. Table 28 is an example in which, in an MCS table for 1024 QAM such as Table 16, one (modulation order, code rate) combination corresponding to each QPSK/16 QAM/64 QAM is removed, one (modulation order, code rate) combination corresponding to 256 QAM is removed, and four (modulation order, code rate) combinations corresponding to 4096 QAM and a reserved field are added.

If an MCS table does not support the QPSK modulation scheme, a modulation order of a lowest index may be configured to be 4 as shown in Table 29. Table 29 is an example in which, in an MCS table for 1024 QAM such as Table 16, all three (modulation order, code rate) combinations corresponding to QPSK are removed, one (modulation order, code rate) combination corresponding to 64 QAM is removed, and four (modulation order, code rate) combinations corresponding to 4096 QAM and a reserved field are added. For an MCS table, from which a case of modulation order 2 has been excluded, as shown in Table 29, a reserved field for modulation order 2 may not be included.

TABLE 29

| MCS Index $I_{MCS}$ | Modulation Order $Q_m$ | Target code Rate [R × 1024] | Spectral efficiency |
|---|---|---|---|
| 0 | 4 | 378 | 1.4766 |
| 1 | 4 | 490 | 1.9141 |
| 2 | 4 | 616 | 2.4063 |
| 3 | 6 | 517 | 3.0293 |
| 4 | 6 | 567 | 3.3223 |
| 5 | 6 | 616 | 3.6094 |
| 6 | 6 | 666 | 3.9023 |
| 7 | 6 | 719 | 4.2129 |
| 8 | 6 | 772 | 4.5234 |
| 9 | 6 | 822 | 4.8164 |
| 10 | 6 | 873 | 5.1152 |
| 11 | 8 | 682.5 | 5.3320 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |
| 18 | 8 | 948 | 7.4063 |
| 19 | 10 | 805.5 | 7.8662 |
| 20 | 10 | 853 | 8.3301 |
| 21 | 10 | 900.5 | 8.7939 |
| 22 | 10 | 948 | 9.2578 |
| 23 | 12 | 829.5 | 9.7207 |
| 24 | 12 | 869 | 10.1836 |
| 25 | 12 | 908.5 | 10.6465 |
| 26 | 12 | 948 | 11.1094 |
| 27 | 4 | reserved | |
| 28 | 6 | reserved | |
| 29 | 8 | reserved | |
| 30 | 10 | reserved | |
| 31 | 12 | reserved | |

The MCS tables of Table 26 to Table 29 are examples including (modulation order, code rate) combinations for modulation order 12 shown in Table 25, and (modulation order, code) combinations for other modulation orders may be defined differently according to system requirements. For example, in each MCS table, combinations of a modulation order and a code rate, which correspond to some MCS levels, may be excluded or changed. In addition, a new MCS table may be generated by appropriately combining combinations of a modulation order and a code rate of each MCS table. Typically, a combination of MCS index 0 indicates a most robust modulation order and code rate combination that the system can tolerate, and therefore MCS index 0 may be defined to be a (modulation order, code rate) combination having the same or lower spectral efficiency compared to a (modulation order, code rate) combination having lowest spectral efficiency in the CQI table.

In addition, each of spectral efficiency values in the CQI or MCS table may be replaced with an approximate value within −3% to +3%, and accordingly, a [code rate (R)×1024] value may also be slightly changed. For example, when a spectral efficiency value for index i is SE(i), a [coding rate (R)×1024] value may be generally configured to have one of [SE(i)/10×1024], [SE(i)/10×1024], [SE(i)/10×1024]±0.5, or [SE(i)/10×1024]±0.5 values. (Here, [·] refers to a flooring operation and [·] refers to a ceiling operation.)

Embodiment 3

In embodiments 1 and 2, a method of designing or determining a CQI table or an MCS table has been described. CQI or MCS tables designed in this way may be stored in a base station or a terminal so as to be used to determine CQI or MCS indexes.

In the current 5G NR system, different CQI tables and different MCS tables may be used depending on a maximum modulation scheme order that a terminal supports.

In this case, by applying different CQI tables according to a target BLER and a maximum modulation order required by the system, a terminal may determine or indicate an appropriate CQI index and transmit a value thereof to a base station. Accordingly, based on a corresponding CQI index or a CQI value corresponding thereto, the base station may configure or indicate an MCS index, i.e., a combination of a modulation scheme and a target code rate, based on an appropriate MCS table.

As an example of one specific example method, in the 5G NR system, an MCS index for a PDSCH, that is, modulation order (or scheme) $Q_m$ and target code rate R, is determined via the following procedures.

With respect to a PDSCH scheduled via a PDCCH including DCI format 1_0 or format 1_1 with a CRC scrambled by C-RNTI, MCS-C-RNTI, TC-RNTI, CS-RNTI, SI-RNTI, RA-RNTI, or P-RNTI, or with respect to a PDSCH scheduled using PDSCH configuration SPS-Config provided by a higher layer without corresponding PDCCH transmission, (a) If higher-layer parameter mcs-Table given by PDSCH-Config has been configured to be "qam256," and the PDSCH has been scheduled by the PDCCH of DCI format 1_1 with the CRC scrambled by C-RNTI, then a UE uses an MCS index $I_{MCS}$ value of Table 13 to determine modulation order $Q_m$ and target code rate R.

(b) If the conditions of (a) are not satisfied, the UE has not been configured by MCS-C-RNTI (UE is not configured with MCS-C-RNTI), higher-layer parameter mcs-Table given by PDSCH-Config has been configured to be "qam64LowSE," and the PDSCH has been scheduled by the PDCCH in a UE-specific search space with the CRC scrambled by C-RNTI, then the UE uses an MCS index $I_{MCS}$ value of Table 14 to determine modulation order $Q_m$ and target code rate R.

(c) If the conditions of (a) and (b) are not satisfied, the UE has been configured by MCS-C-RNTI, and the PDSCH has been scheduled by the PDCCH to which the CRC scrambled by MCS-C-RNTI is applied, then the UE uses an MCS index $I_{MCS}$ value of Table 14 to determine modulation order $Q_m$ and target code rate R.

(d) If the conditions of (a), (b), and (c) are not satisfied, the UE has not been configured by higher-layer parameter mcs-Table given by SPC-Config, higher-layer parameter mcs-Table given by PDSCH-Config has been set to "qam256," and (d-1) the PDSCH has been scheduled by the PDCCH of DCI format 1_1 to which the CRC scrambled by CS-RNTI is applied, or (d-2) the PDSCH has been scheduled without corresponding PDCCH transmission using SPS-Config, then the UE uses an MCS index $I_{MCS}$ value of Table 13 to determine modulation order $Q_m$ and target code rate R.

(e) If the conditions of (a) to (d) are not satisfied, and higher-layer parameter mcs-Table given by SPS-Config has been set to qam64LowSE and the UE is thus configured, (e-1) if the PDSCH has been scheduled by the PDCCH to which the CRC scrambled by CS-RNTI is applied, or (e-2) the PDSCH has been scheduled without corresponding PDCCH transmission using SPS-Config, then the UE uses an MCS index $I_{MCS}$ value of Table 14 to determine modulation order $Q_m$ and target code rate R.

(f) If the conditions of (a) to (e) are not satisfied, then the UE uses an MCS index $I_{MCS}$ value of Table 12 to determine modulation order $Q_m$ and target code rate R.

Contents of determining the MCS index for the PDSCH, i.e., modulation order (or scheme) $Q_m$ and target code rate R, correspond to the following contents of standard specifications.

For the PDSCH scheduled by a PDCCH with DCI format 1_0 or format 1_1 with CRC scrambled by C-RNTI, MCS-C-RNTI, TC-RNTI, CS-RNTI, SI-RNTI, RA-RNTI, or P-RNTI, or for the PDSCH scheduled without corresponding PDCCH transmissions using the higher-layer-provided PDSCH configuration SPS-Config, (a) if the higher layer parameter mcs-Table given by PDSCH-Config is set to "qam256," and the PDSCH is scheduled by a PDCCH with DCI format 1_1 with CRC scrambled by C-RNTI the UE shall use $I_{MCS}$ and Table 15 to determine the modulation order $(Q_m)$ and Target code rate (R) used in the physical downlink shared channel.

(b) else if the UE is not configured with MCS-C-RNTI, the higher layer parameter mcs-Table given by PDSCH-Config is set to "qam64LowSE," and the PDSCH is scheduled by a PDCCH in a UE-specific search space with CRC scrambled by C-RNTI the UE shall use $I_{MCS}$ and Table 14 to determine the modulation order $(Q_m)$ and Target code rate (R) used in the physical downlink shared channel.

(c) else if the UE is configured with MCS-C-RNTI, and the PDSCH is scheduled by a PDCCH with CRC scrambled by MCS-C-RNTI the UE shall use $I_{MCS}$ and Table 14 to determine the modulation order $(Q_m)$ and Target code rate (R) used in the physical downlink shared channel.

(d) else if the UE is not configured with the higher layer parameter mcs-Table given by SPS-Config, the higher layer parameter mcs-Table given by PDSCH-Config is set to "qam256,"

if the PDSCH is scheduled by a PDCCH with DCI format 1_1 with CRC scrambled by CS-RNTI or if the PDSCH is scheduled without corresponding PDCCH transmission using SPS-Config, the UE shall use $I_{MCS}$ and Table 15 to determine the modulation order $(Q_m)$ and Target code rate (R) used in the physical downlink shared channel.

(e) else if the UE is configured with the higher layer parameter mcs-Table given by SPS-Config set to "qam64LowSE"

if the PDSCH is scheduled by a PDCCH with CRC scrambled by CS-RNTI or if the PDSCH is scheduled without corresponding PDCCH transmission using SPS-Config, the UE shall use $I_{MCS}$ and Table 14 to determine the modulation order $(Q_m)$ and Target code rate (R) used in the physical downlink shared channel.

(f) else the UE shall use $I_{MCS}$ and Table 13 to determine the modulation order $(Q_m)$ and Target code rate (R) used in the physical downlink shared channel. end If a modulation scheme, such as 1024 QAM or 4096 QAM, is used for a specific service scenario, a specific condition may be added and used between or before/after conditions, for example, the above conditions (a), (b), (c), (d), (e), and (f). For example, according to configured values of mcs-Table of higher-layer signaling PDSCH-Config and mcs-Table of SPS-Config, or whether the PDSCH has been scheduled based on the PDCCH, to which a CRC scrambled by a specific RNTI (e.g., C-RNTI, MCS-C-RNTI, TC-RNTI, CS-RNTI, SI-RNTI, RA-RNTI, or P-RNTI, etc.) is applied, conditions may be added or subdivided, and at least one MCS table among the MCS tables included in the specification may be used according to a modulation order. In addition, the parameter mcs-Table value may be set to a value other than "qam256" or "qam64LowSE." For example, when the value is configured to a parameter with a different name, such as "qam64MidSE," it may be configured to use an MCS table in which a target BLER is lower than 0.1 and is higher than 0.00001 (e.g., the target BLER is close to 0.001), and 64 QAM is defined as a maximum modulation scheme. In addition, the mcs-Table value may be configured to use one of the MCS tables corresponding to 1024 QAM as in Table 16 or the MCS tables corresponding to 4096 QAM as in Table 25 to Table 29, such as qam1024 and qam4096. In general, when maximum modulation orders or target BLER values supportable by a system or a terminal are more diverse, and more various service scenarios are considered, more MCS tables may be additionally used.

As an example of another specific method, in the 5G NR system, with respect to a PUSCH scheduled by an RAR UL grant, a PUSCH scheduled by DCI format 0_0 CRC-scrambled by C-RNTI, MCS-C-RNTI, TC-RNTI, or CS-RNTI, a PUSCH scheduled by DCI format 0_1 CRC-scrambled by C-RNTI, MCS-C-RNTI, CS-RNTI, or SP-CSI-RNTI, or a PUSCH having a grant configured using CS-RNTI (a PUSCH with configured grant using CS-RNTI), the MCS index for the PUSCH, that is, modulation order (or scheme) $Q_m$ and target code rate R, is determined according to:

a type in which a PUSCH is scheduled, whether "transform precoding" is disabled or enabled (disable or not), parameter mcs-Table of higher-layer signaling pusch-Config or mcs-Table TransformPrecoder set value (e.g., "qam256" or "qam64LowSE"), parameter mcs-Table of higher-layer signaling config-uredGrantConfig or mcs-Table TransformPrecoder set value (e.g., "qam256" or "qam64LowSE"), whether scheduling is performed based on a PDCCH, to which a CRC scrambled by a specific RNTI, is applied, and the like. In this case, the conditions may be added or subdivided according to services, so that MCS tables, such as Table 24 to Table 26, may be additionally used. In this case, the parameter mcs-Table value may be set to a value other than "qam256" or "qam64LowSE," for example, when the value is configured to a parameter with a different name, such as "qam4096," "qam1024," and "qam64MidSE," "qam4096" may indicate to use one of MCS tables, such as Table 25 to Table 29, corresponding to 4096 QAM, "qam1024" may indicate to use an MCS table, such as Table 16, corresponding to 1024 QAM, and "qam64MidSE" may indicate to use an MCS table in which a target BLER is lower than 0.1 and is higher than 0.00001 (e.g., the target BLER is close to 0.001) and 64 QAM is defined as a maximum modulation scheme. In the above, for convenience, the value qam1024 or qam4096 related to the configuration of the MCS table is expressed as being configured by higher-layer parameter mcs-Table. However, for distinguishment from version information of a previous system, mcs-Table may be changed into a format of mcs-Table-(version number), such as mcs-Table-r17 (for Release 17), mcs-Table-r18 (for Release 18), mcs-Table-r19 (for Release 19) or the like, so as to be used. Alternatively, DL/UL may be expressed differently, such as mcs-Table-DL-r for downlink and mcs-Table-UL-r for uplink.

As a specific example, a procedure of determining an MCS index for PDSCH, that is, modulation order (or scheme) $Q_m$ and target code rate R, may be modified and indicated as follows.

With respect to a PDSCH scheduled via a PDCCH including DCI format 1_0, format 11, or format 1_2 with a CRC scrambled by C-RNTI, MCS-C-RNTI, TC-RNTI, CS-RNTI, SI-RNTI, RA-RNTI, MSGB-RNTI, or P-RNTI, or with respect to a PDSCH scheduled using PDSCH configuration SPS-Config provided by a higher layer without corresponding PDCCH transmission, (A) If higher-layer parameter mcs-Table-r18 (or 19) given by PDSCH-Config has been set to "qam4096," and the PDSCH has been scheduled by the PDCCH of DCI format 1_1 with the CRC scrambled by C-RNTI, then a UE uses an MCS index $I_{MCS}$ value of the MCS table corresponding to 4096 QAM, such as Table 25 to Table 29, to determine modulation order $Q_m$ and target code rate R.

(B) If the conditions of (A) are not satisfied, higher-layer parameter mcs-Table-r17 given by PDSCH-Config has been configured to "qam1024," and the PDSCH has been scheduled by the PDCCH including DCI format 1_1 with the CRC scrambled by the C-RNTI, then the UE uses an MCS index $I_{MCS}$ value of the MCS table corresponding to 1024 QAM, such as Table 16, to determine modulation order $Q_m$ and target code rate R (C) If the conditions of (A) and (B) are not satisfied, and the UE has not been configured by higher-layer parameter mcs-Table given by SPC-Config, higher-layer parameter mcs-Table-r18 (or 19) given by PDSCH-Config has been set to "qam4096," and the PDSCH has been scheduled by the PDCCH of DCI format 1_1 to which the CRC scrambled by CS-RNTI is applied, or the PDSCH with activated SPS has been scheduled by DCI format 1_1 without corresponding PDCCH transmission using SPS-Config, then the UE uses an MCS index $I_{MCS}$ value of the MCS table corresponding to 1024 QAM, such as Table 16, to determine modulation order $Q_m$ and target code rate R.

(D) If the conditions of (A) to (C) are not satisfied, and the UE has not been configured by higher-layer parameter mcs-Table given by SPC-Config, higher-layer parameter mcs-Table-r17 given by PDSCH-Config has been set to "qam1024," and the PDSCH has been scheduled by the PDCCH of DCI format 1_1 to which the CRC scrambled by CS-RNTI is applied, or the PDSCH with activated SPS has been scheduled by DCI format 1_1 without corresponding PDCCH transmission using SPS-Config, then the UE uses an MCS index $I_{MCS}$ value of the MCS table corresponding to 1024 QAM, such as Table 16, to determine modulation order $Q_m$ and target code rate R.

The descriptions above may be expressed as follows.

For the PDSCH scheduled by a PDCCH with DCI format 10, format 1_1 or format 1_2 with CRC scrambled by C-RNTI, MCS-C-RNTI, TC-RNTI, CS-RNTI, SI-RNTI, RA-RNTI, MSGB-RNTI, or P-RNTI, or for the PDSCH scheduled without corresponding PDCCH transmissions using the higher-layer-provided PDSCH configuration SPS-Config, (A) if the higher layer parameter mcs-Table-r18 (or 19) given by PDSCH-Config is set to "qam4096," and the PDSCH is scheduled by a PDCCH with DCI format 1_1 with CRC scrambled by C-RNTI the UE shall use $I_{MCS}$ and "MCS table corresponding to 4096QAM as shown in Table 25 to 29" to determine the modulation order $(Q_m)$ and Target code rate (R) used in the physical downlink shared channel.)

(B) else if the higher layer parameter mcs-Table-r17 given by PDSCH-Config is set to "qam1024," and the PDSCH is scheduled by a PDCCH with DCI format 1_1 with CRC scrambled by C-RNTI the UE shall use $I_{MCS}$ and "MCS table corresponding to 10024QAM as shown in Table 16" to determine the modulation order $(Q_m)$ and Target code rate (R) used in the physical downlink shared channel.

(C) else if the UE is not configured with the higher layer parameter mcs-Table given by SPS-Config, and the higher layer parameter mcs-Table-r18 (or 19) given by PDSCH-Config is set to "qam4096,"

if the PDSCH is scheduled by a PDCCH with DCI format 1_1 with CRC scrambled by CS-RNTI or if the PDSCH with SPS activated by DCI format 1_1 scheduled without corresponding PDCCH transmission using SPS-Config, the UE shall use $I_{MCS}$ and "MCS table corresponding to 10024QAM as shown in Table 16" to determine the modulation order $(Q_m)$ and Target code rate (R) used in the physical downlink shared channel.

(D) else if the UE is not configured with the higher layer parameter mcs-Table given by SPS-Config, and the higher layer parameter mcs-Table-r17 given by PDSCH-Config is set to "qam1024,"

if the PDSCH is scheduled by a PDCCH with DCI format 1_1 with CRC scrambled by CS-RNTI or if the PDSCH with SPS activated by DCI format 1_1 is scheduled without corresponding PDCCH transmission using SPS-Config, the UE shall use $I_{MCS}$ and "MCS table corresponding to 10024QAM as shown in Table 16" to determine the modulation order $(Q_m)$ and Target code rate (R) used in the physical downlink shared channel.

In a system or a terminal, CQI tables or MCS tables optimized according to a maximum supportable modulation order and target BLER may all be configured differently, but as in embodiments of the disclosure, a number of modulation schemes (or orders) and code rate combinations are shared and used. When a configuration using at least one of a first CQI table or a first MCS table to determine CQI or MCS is referred to as a first table configuration, and a configuration using at least one of a second CQI table or a second MCS table is referred to as a second table configuration, characteristics between operations of a base station or a terminal and respective table configurations may be summarized as follows.

The terminal (UE being operable to apply a first table configuration in a radio communication with a radio node of a cellular network) capable of performing the first table configuration (e.g., Table 21 to Table 23 or Table 25 to Table 29) for wireless communication with the base station (or radio node, etc.) of the cellular network receives, from the base station, an instruction for applying or performing of the second table configuration (e.g., Table 12 or Table 16). Based on the instruction, the terminal applies the second table configuration for wireless communication with the base station (or radio node). Based on the second table configuration, the terminal transmits control information (e.g., CQI information, etc.) or data to the base station.

The second MCS table or the second CQI table for the second table configuration supports spectral efficiency lower than minimum spectrum efficiency of a first MCS table configuration.

When the second table configuration has been applied, and it is desirable to use (as a fallback) at least one of modulation order and code rate combinations for spectral efficiency included in at least one of the first MCS table or the first CQI table, at least one of the combinations is maintained in at least one of the second MCS table or the second CQI table.

The "modulation order and code rate combinations for spectral efficiency included in at least one of the first MCS table or the first CQI table" maintained in at least one of the second MCS table or the second CQI table may include a modulation order and code rate combination for lowest spectral efficiency of the first table configuration.

The terminal may transmit an appropriate CQI index to the base station, based on a CQI table determined according to a table configuration, or determine a modulation scheme and a code rate, based on a determined MCS table, and subsequently the terminal may determine a TBS for transmitting data, and then encode the data to transmit encoded bits to the base station.

In some embodiments, the terminal may determine the modulation scheme and the code rate (For example, based on the determined MCS table), determine the TBS for data corresponding to encoded bits transmitted from the base station, and then perform decoding on the received encoded bits to restore the data.

When summarizing the operations from the perspective of the base station, the operations may be, for example, as follows.

In order to perform wireless communication with a terminal of the cellular network, the base station capable of performing the first table configuration transmits, to the terminal, an instruction for applying or performing the second table configuration.

Control information (e.g., CQI information, etc.) or data transmitted based on the second table configuration is received from the terminal.

The base station may determine an appropriate MCS based on the CQI index transmitted from the terminal, based on the CQI table determined according to the table configuration, or may determine the TBS of data corresponding to the encoded bits received from the terminal, based on the modulation scheme and code rate determined based on the determined MCS table, and then may restore the data by appropriately decoding the received encoded bits.

In some embodiments, the base station may determine the modulation scheme and the code rate, for example, based on the determined MCS table, and then may subsequently determine the TBS for data transmission, and then may encode the data to transmit encoded bits to the terminal. The TBS may be determined using a code rate indicated by an index included in the MCS table. In 5G NR, the TBS may be determined by the number of allocated REs, the number of layers to be used, a modulation order, a code rate, and the like. Among various factors for determination of the TBS, the modulation order and the code rate may be determined via an MCS in signaling information.

In some embodiments, the modulation order determined via the MCS may be used as it is, and the code rate determined via the MCS may be used as it is, wherein additional adjustment may be performed according to RRC configuration information.

In some embodiments, when only an MCS table for a service having a specific target BLER is defined, and it is configured, for example, via RRC signaling, that a service having an identical maximum modulation order but having a different BLER from the specific target BLER is supported, a transceiver may determine a modulation order and a code rate from the defined MCS table, and adjust only the code rate for use. As an example, a method of subtracting or adding a predetermined constant value from or to the code rate, or multiplying the code rate by a specific ratio may be used, wherein, for the constant value for subtraction or addition, the specific ratio for multiplication, etc. with respect to the code rate, the same value may be used for all CQI indexes, or a value varying according to the modulation order may be used.

Embodiment 4

Embodiment 4 proposes a method of configuring an MCS table suitable for a base station and a terminal to use when a CQI table, in which 4096 QAM is a maximum modulation scheme, is configured as shown in Table 25 to Table 29. When support for 4096 QAM is allowed in the 5G NR system, additional operations may be required in the base station and the terminal.

As an example, an additional operation for a limited buffer rate matching (LBRM) technique of the 5G NR system is proposed.

In the 5G NR system, when the terminal/base station determines a TBS, $N'_{RE}$ which is the number of REs allocated to PDSCH mapping in one PRB in allocated resources is first calculated as in $N'_{RE} = N_{SC}^{RB} \cdot N_{symb}^{sh} - N_{DMRS}^{PRB} - N_{oh}^{PRB}$, a total number $N_{RE}$ of REs allocated to a PDSCH is calculated as in $N_{RE} = \min(156, N'_{RE}) \cdot n_{PRB}$, and then $N_{info} = N_{RE} \cdot R \cdot Q_m \cdot v$ is calculated to determine the TBS based on a value thereof. Depending on the system, $N_{info}$ may be defined as a quantized integer value, such as $\lfloor N_{RE} \cdot R \cdot Q_m \cdot v \rfloor$ or $\lceil N_{RE} \cdot R \cdot Q_m \cdot v \rceil$, so as to be used. Here, $N_{SC}^{RB}$ is the number (e.g., 12) of subcarriers included in one RB, $N_{sh}^{symb}$ is the number of OFDM symbols allocated to the PDSCH, $N_{DMRS}^{PRB}$ denotes the number of REs in one PRB, which are occupied by a demodulation reference signal (DMRS) of the same code division multiplexing (CDM) group, and $N_{oh}^{RB}$ denotes the number (e.g., configured to be one of 0, 6, 12, and 18) of REs occupied by overhead in one PRB configured by higher signaling. In addition, R and $Q_m$ denote a code rate and a modulation order indicated by an MCS, and v denotes the number of supported layers.

In the 5G NR system, when one TB or code block (CB) is input to an LDPC encoder, parity bits may be determined or generated so as to be output. In this case, codes used in the LDPC encoder are determined according to an LDPC base graph. In particular, in 5N NR, a base graph (or base matrix) is determined according to a TBS length and a code rate as follows, and LDPC encoding and decoding are performed according to the determined base graph during initial transmission and retransmission.

Method of Selecting a Base Graph (or Base Matrix)

When a code rate indicated by an MCS is R,

TBS≤292 or TBS≤3824 and R≤0.67

Alternatively, when R≤0.25, LDPC encoding may be performed based on BG(2) (base graph 2 or base matrix 2).

In other cases, LDPC encoding may be performed based on BG(1) (base graph 1 or base matrix 1).

A parity check matrix may also be determined based on a code block size (CBS) and these LDPC base graphs BG(1) and BG(2), and an LDPC code may generate a parity bit, based on the parity check matrix.

In this case, a method of transmitting all parity bits generated by LDPC coding with respect to a specific input may be referred to as full buffer rate matching (FBRM), and a method of limiting the number of transmittable parity bits may be referred to as limited buffer rate matching (LBRM).

When resources are allocated for data transmission, an LDPC encoder output may be made as a circular buffer, and bits of the buffer may be repeatedly transmitted as many as the allocated resources, in which case, a length of the circular buffer may be referred to as $N_{cb}$. When the number of all LDPC codeword bits generated by LDPC coding is N, $N_{cb} = N$ in the FBRM method. For reference, in 5G NR, in LDPC codeword bits for initial transmission, some of information word bits are always excluded and are not transmitted.

In the LBRM method, $N_{cb}$ may be min $(N, N_{ref})$, where min $(N, N_{ref})$ is given as $$\left\lfloor \frac{TBS_{LBRM}}{C \cdot R_{LBRM}} \right\rfloor,$$

and $R_{LBRM}$ is determined to be $\frac{2}{3}$. In the TBS determination procedure described above, $TBS_{LBRM}$ may be determined by regarding the number v of layers as the maximum number of layers supported by the terminal in a corresponding cell, regarding $Q_m$ as a maximum modulation order configured for the terminal in the corresponding cell or regarding $Q_m$ as 64 QAM when not configured, assuming code rate R to be 948/1024 that is a maximum code rate, assuming $N_{RE}$ to be $156 \cdot n_{PRB}$, and assuming $n_{PRB}$ to be $n_{PRB,LBRM}$. Here, $n_{PRB,LBRM}$ may be given, for example, as shown in Table 30 below.

TABLE 30

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

In the NR system, an (approximated) maximum data rate supported by the terminal for a given number of aggregated carriers in a band or a band combination may be determined via Equation 1 below.

$$\text{data rate (in } Mbps) = \qquad\qquad\qquad\qquad \text{Equation 1}$$

$$10^{-6} \cdot \sum_{j=1}^{J} \left( v_{Layers}^{(j)} \cdot Q_{m}^{(j)} \cdot f^{(j)} \cdot R_{max} \cdot \frac{N_{PRB}^{BW(j),\mu} \cdot 12}{T_s^{\mu}} \cdot \left( 1 - OH^{(j)} \right) \right)$$

In Equation 1, J may denote the number of carriers bound by frequency carrier aggregation, Rmax=948/1024, $v_{Layers}^{(j)}$ may denote the maximum number of layers, $Q_m^{(j)}$ may denote a maximum modulation order, $f^{(j)}$ may denote a scaling index, and $\mu$ may denote a subcarrier spacing. The terminal may report, as $f^{(j)}$, one value among 1, 0.8, 0.75, and 0.4, and $\mu$ may be given as in Table 31 below. (j) is an index indicating a j-th component carrier (CC).

TABLE 31

| $\mu$ | $\Delta f = 2^{\mu} \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In addition, $T_s^{\mu}$ is an average OFDM symbol length, $T_s^{\mu}$ may be calculated as $$\frac{10^{-3}}{14 \cdot 2^{\mu}},$$

and $N_{PRB}^{BW(j)\mu}$ is the maximum number of RBs in BW(j). $OH^{(j)}$ is an overhead value, and may be given as 0.14 in a downlink of FR1 (a band equal to or lower than 6 GHz, also referred to as B6G (below 6 GHz)) and given as 0.18 in an uplink thereof, and may be given as 0.08 in a downlink of FR2 (a band over 6 GHz, also referred to as A6G (above 6 GHz)) and given as 0.10 in an uplink thereof.

Of course, the overhead values may be defined to be different values according to a service or a modulation order. For example, a case where an MCS table supporting 4096 QAM as in Table 25 to Table 29 is configured in the wireless communication system indicates a special situation where a channel environment is very good, and therefore the $OH^{(j)}$ value may also be configured differently. When use in an environment with a very good channel environment is assumed, the overhead value may be configured to be small values, but since the 4096 QAM modulation scheme is vulnerable to a phase error, a peak-to-average power-ratio (PAPR) problem of the OFDM system, or the like, a value larger than a current reference may be configured. In addition, data transmission and reception via a physical sidelink shared channel (PSSCH) when a vehicle-to-infra or vehicle-to-vehicle (V2X) service is supported may have a different symbol allocation scheme for data transmission and reception via a PDSCH, so that the $OH^{(j)}$ value may be configured differently.

As a more specific example for the V2X service, in the case of PSSCH data transmission and reception, at least a first symbol is allocated for automatic gain control (AGC) and a last symbol is allocated as a gap symbol for gap measurement, so that the maximum number of OFDM symbols for data transmission and reception may actually be 12 (or fewer). In this case, the $OH^{(j)}$ value may have a specific value or greater regardless of a configuration of a physical sidelink feedback channel (PSFCH), for example, the value may be equal to or greater than 2/12. As a specific example, regardless of FR1/B6G and FR2/A6G, the $OH^{(j)}$ value may be configured to be values that are greater than 2/12 and include a specific value such as 0.21. Alternatively, in a resource pool configuration of a corresponding carrier, the $OH^{(j)}$ value may be determined according to a ratio of slots in which a PSFCH resource is configured, or a periodicity of the PSFCH resource. In this case, as the ratio at which the PSFCH resource is configured increases, the $OH^{(j)}$ value may become high. For example, when a value of a case where the PSFCH is configured for every slot is A, a value of a case where the PSFCH is configured for one slot in every two slots is B, and a value of a case where the PSFCH is configured for one slot in every four slots is C, a relationship of A>B>C may be configured (e.g., A=0.42, B=0.32, and C=0.26). For reference, the ratio of slots in which the PSFCH resource is configured or the periodicity of the PSFCH resource may be determined based on parameter sl-PSFCH-Period in the PSFCH-related configuration.

One or more sidelink resource pools may be configured for the terminal for PSSCH transmission and reception, wherein the $OH^{(j)}$ value may be determined based on a parameter of a resource pool having a greatest bandwidth from among the configured sidelink resource pools according to a higher layer configuration.

A maximum value of the modulation order was 8 or 10 previously, but since a maximum value of the modulation order is 12 in the system to which 4096 QAM is applied, a maximum data rate supportable by the terminal via Equation 1 may also be determined differently from the 5G NR system of Release-17 and earlier versions. In the wireless communication system, particularly, in the 5G NR system, a data rate supportable by a terminal may be mutually agreed between a base station and the terminal. This may be calculated using a maximum number of layers, a maximum modulation order, a maximum frequency band supported by the terminal, etc. However, the calculated data rate may be different from a value calculated based on a transmission time interval (TTI) length and a size TBS of a transport block (TB) used for actual data transmission.

There may be a case where the terminal is allocated with a TBS greater than a value corresponding to a data rate supported by the terminal. It may be optimal or necessary to minimize such a case, and define operations of the terminal for the case. In addition, in the current communication system defined in NR, when LBRM is applied, $TBS_{LBRM}$ is determined based on a modulation order supported by the terminal, wherein it is optimal or necessary to present a clear configuration method so as to prevent the determination from being inefficient or prevent a parameter configuration, etc. from being ambiguous. The following embodiments provide a method and a device for achieving such tasks.

First, when PDSCH-LBRM needs to be applied, a maximum modulation order configured for a serving cell is configured as follows.

Modulation Order Configuration for PDSCH-LBRM $Q_m=12$ is assumed for a maximum modulation order for a DL-SCH when MCS table configuration-related parameter mcs-Table included in higher-layer signaling pdsch-Config for one or more BWPs of a serving cell is configured to be qam4096 (or an indicator indicating 4096 QAM), $Q_m=10$ is assumed for the maximum modulation order for the DL-SCH when parameter mcs-Table included in higher-layer signaling pdsch-Config for one or more BWPs of the serving cell is configured to qam1024 (or an indicator indicating 1024 QAM), $Q_m=8$ is assumed for the maximum modulation order for the DL-SCH when parameter mcs-Table included in higher-layer signaling pdsch-Config for one or more BWPs of the serving cell is configured to be qam256 (or an indicator indicating 256 QAM), and $Q_m=6=6$ is assumed in other cases. This may also be expressed as follows:

"if the higher layer parameter mcs-Table-r18 [or mcs-TableDCI-1-2-r18] given by a pdsch-Config for at least one DL BWP of the serving cell is set to "qam4096," maximum modulation order $Q_m=12$ is assumed for DL-SCH; else if the higher layer parameter mcs-Table-r17 given by a pdsch-Config for at least one DL BWP of the serving cell is set to "qam1024," maximum modulation order $Q_m=10$ is assumed for DL-SCH; else if the higher layer parameter mcs-Table given by a pdsch-Config for at least one DL BWP of the serving cell is set to "qam256," maximum modulation order $Q_m=8$ is assumed for DL-SCH; else a maximum modulation order $Q_m=6$ is assumed for DL-SCH;"

Therefore, modified PDSCH-LBRM may be summarized as follows:

$$N_{ref} = \left\lfloor \frac{TBS_{LBRM}}{C \cdot R_{LBRM}} \right\rfloor$$

and $R_{LBRM}=2/3$, wherein a $TBS_{LBRM}$ value for the DL-SCH/PCH may be determined according to section 5.1.3.2 of 3GPP 5G NR standard specification document TS 38.214 by assuming the following parameters:

The maximum number of layers for 1 TB corresponding to the DL-SCH/PCH is given as the smaller of X and 4. Here, when parameter maxMIMO-Layers of higher-layer signaling PDSCH-ServingCellConfig for the serving cell is configured, a value of the parameter is configured to be X, and in other cases, the maximum number of layers for a PDSCH, which is supported by a UE, is configured to be X.

When parameter mcs-Table-r* given by higher-layer signaling pdsch-Config for at least one DL BWP in the serving cell is configured to be qam4096, the maximum modulation order for the DL-SCH is regarded as $Q_m=12$. If mcs-Table-r* is not configured to be qam4096, and parameter mcs-Table-r* given by higher-layer signaling pdsch-Config for at least one DL BWP is configured to be qam1024, the maximum modulation order for the DL-SCH is regarded as $Q_m=10$. If mcs-Table-r* is not configured to be qam4096, qam1024, or the like and parameter mcs-Table given by higher-layer signaling pdsch-Config for at least one DL BWP is configured to be qam256, the maximum modulation order for the DL-SCH is regarded as $Q_m=8$. In other cases, the maximum modulation order for the DL-SCH is regarded as $Q_m=6$. (r*=r17, r18, r19, . . . )

The descriptions above may also be expressed as follows.

---

The bit sequence after encoding $d_0$, $d_1$, . . . , $d_{N-1}$ from Clause 5.3.2 is written into a circular buffer of length $N_{cb}$ for the r-th coded block, where N is defined in Clause 5.3.2. For the r-th code block, let $N_{cb} = N$ if $I_{LBRM} = 0$ and $N_{cb} = \min(N, N_{ref})$ otherwise, where $N_{ref} = \left\lfloor \frac{TBS_{LBRM}}{C \cdot R_{LBRM}} \right\rfloor$, $R_{LBRM} = \frac{2}{3}$, $TBS_{LBRM}$ is determined according to Clause 5.1.3.2 in [TS 38.214] for DL-SCH/PCH, assuming the following:
   maximum number of layers for one TB for DL-SCH/PCH is given by the minimum of X and 4, where
      if the higher layer parameter maxMIMO-Layers of PDSCH-ServingCellConfig of the serving cell is configured, X is given by that parameter
      otherwise, X is given by the maximum number of layers for PDSCH supported by the UE for the serving cell
   if the higher layer parameter mcs-Table-r18 [or mcs-TableDCI-1-2-r18] given by a pdsch-Config for at least one DL BWP of the serving cell is set to 'qam4096', maximum modulation order $Q_m = 12$ is assumed for DL-SCH; else if the higher layer parameter mcs-Table-r17 given by a pdsch-Config for at least one DL BWP of the serving cell is set to 'qam1024', maximum modulation order $Q_m = 10$ is assumed for DL-SCH; else if the higher layer parameter mcs-Table given by a pdsch-Config for at least one DL BWP of the serving cell is set to 'qam256', maximum modulation order $Q_m = 8$ is assumed for DL-SCH; else a maximum modulation order $Q_m = 6$ is assumed for DL-SCH;

---

For an r-th code block, bit sequence $d_0$, $d_1$, $d_2$, . . . , $d_{N-1}$ after encoding may be stored in a circular buffer with a length of Ncb. (Where N is a value defined in section 5.3.2 of 3GPP 5G NR standard specification document TS 38.212.)

For the r-th code block, when $I_{LBRM}=0$, Ncb=N is configured, and $N_{cb}=\min(N,N_{ref})$ is configured in other cases. Here, If 1024QAM or 4096 QAM is also allowed in uplink of the wireless communication system, a maximum modulation order configured for a serving cell for applying of PUSCH-LBRM is configured as follows.

Modulation Order Configuration for PUSCH-LBRM $Q_m=12$ is assumed for a maximum modulation order for a UL-SCH when MCS configuration-related parameter mcs-Table or mcs-TableTransformPrecoder included in higher-layer signaling pusch-Config or configuredGrantConfig for one or more BWPs of a serving cell is configured to be qam4096, $Q_m$, =10 is assumed for the maximum modulation order for the UL-SCH when parameter mcs-Table or mcs-Table TransformPrecoder included in higher-layer signaling pusch-Config or configuredGrantConfig for one or more BWPs of the serving cell is configured to be qam1024, $Q_m$, =8 is assumed for the maximum modulation order for the UL-SCH when parameter mcs-Table or mcs-Table TransformPrecoder included in higher-layer signaling pusch-Config or configuredGrantConfig for one or more BWPs of the serving cell is configured to be qam256, and $Q_m$=6 is assumed in other cases.

This may also be expressed as follows:

"if the higher layer parameter mcs-Table-r18 or mcs-TableTransformPrecoder-r18 [or mcs-TableDCI-0-2-r18 or mcs-TableTransformPrecoderDCI-0-2-r18] given by a pusch-Config or the higher layer parameter mcs-Table-r18 or mcs-TableTransformPrecoder-r18 given by configuredGrantConfig for at least one UL BWP of the serving cell is set to "qam1024," maximum modulation order $Q_m$=10 is assumed for UL-SCH; else if the higher layer parameter mcs-Table or mcs-Table-TransformPrecoder or mcs-TableDCI-0-2 or mcs-TableTransformPrecoderDCI-0-2 given by a pusch-Config or the higher layer parameter mcs-Table or mcs-TableTransformPrecoder given by configuredGrantConfig for at least one UL BWP of the serving cell is set to "qam256," maximum modulation order $Q_m$=8 is assumed for UL-SCH; else a maximum modulation order $Q_m$=6 is assumed for UL-SCH."

Therefore, modified PUSCH-LBRM may be summarized as follows:

For an r-th code block, bit sequence $d_0, d_1, d_2, \ldots, d_{N-1}$ after encoding may be stored in a circular buffer with a length of do, $d_1, d_2, \ldots, d_{N-1}$. (Where N is a value defined in section 5.3.2 of 3GPP 5G NR standard specification document TS 38.212.)

For the r-th code block, when $I_{LBRM}$=0, $N_{cb}$=N is configured, and $N_{cb}$=min $(N,N_{ref})$ is configured in other cases. Here, $$N_{ref} = \left\lfloor \frac{TBS_{LBRM}}{C \cdot R_{LBRM}} \right\rfloor$$

and $R_{LBRM}$=2/3, wherein a $TBS_{LBRM}$ value for the UL-SCH may be determined according to section 6.1.4.2 of 3GPP 5G NR standard specification document TS 38.214 by assuming the following parameters:

The maximum number of layers for 1 TB corresponding to the DL-SCH/PCH is given as X. Here, when parameter maxMIMO-Layers of higher-layer signaling PUSCH-ServingCellConfig for the serving cell is configured, a value of the parameter is configured to be X. If parameter maxMIMO-Layers of PUSCH-Serving-CellConfig is not configured, and parameter maxRank of higher-layer signaling pusch-Config of the serving cell is configured, X is configured to be a maximum value among maxRank values for all BWPs in the serving cell. In other cases, the maximum number of layers for the PUSCH supported by the UE is configured to be X.

(a case where $Q_m$=10 is the maximum modulation order) When parameter mcs-Table-r* or mcs-TableTransform-Precoder-r* (or mcs-TableDCI-0-2-r* or mcs-TableTransformPrecoderDCI-0-2-r*) given by higher-layer signaling pusch-Config for at least one UL BWP in the serving cell is configured to be qam1024, or parameter mcs-Table-r* or mcs-TableTransformPrecoder-r* given by configuredGrantConfig is configured to be qam1024, the maximum modulation order for a UL-SCH is regarded as $Q_m$=10.—If the parameters are not configured to be qam1024, and parameter mcs-Table, mcs-TableTransformPrecoder, mcs-TableDCI-0-2, or mcs-Table TransformPrecoderDCI-0-2 given by higher-layer signaling pusch-Config is configured to be qam256, or parameter mcs-Table or mcs-TableTrans-formPrecoder given by configuredGrantConfig is configured to be qam256, the maximum modulation order for the UL-SCH is regarded as $Q_m$=8. In other cases, the maximum modulation order for the UL-SCH is regarded as $Q_m$=6. (r*=r18, r19, . . . )

(a case where $Q_m$=12 is the maximum modulation order) When parameter mcs-Table-r* or mcs-TableTransform-Precoder-r* (or mcs-TableDCI-0-2-r* or mcs-Table-TransformPrecoderDCI-0-2-r*) given by higher-layer signaling pusch-Config for at least one UL BWP in the serving cell is configured to be qam4096, or parameter mcs-Table-r* or mcs-TableTransformPrecoder-r* given by configuredGrantConfig is configured to be qam4096, the maximum modulation order for the UL-SCH is regarded as $Q_m$=12.—If the parameters are not configured to be qam4096, and parameter mcs-Table-r* or mcs-TableTransformPrecoder-r* (or mcs-TableDCI-0-2-r* or mcs-TableTransformPrecoderDCI-0-2-r*) given by higher-layer signaling pusch-Config for at least one UL BWP in the serving cell is configured to be qam1024, or parameter mcs-Table-r* or mcs-Table-TransformPrecoder-r* given by configuredGrantConfig is configured to be qam1024, the maximum modulation order for the UL-SCH is regarded as $Q_m$=10.—If the parameters are not configured to be qam4096 or qam1024, and parameter mcs-Table, mcs-TableTrans-formPrecoder, mcs-TableDCI-0-2, or mcs-TableTrans-formPrecoderDCI-0-2 given by higher-layer signaling pusch-Config is configured to be qam256, or parameter mcs-Table or mcs-TableTransformPrecoder given by configuredGrantConfig is configured to be qam256, the maximum modulation order for the UL-SCH is regarded as $Q_m$=8. In other cases, the maximum modulation order for the UL-SCH is regarded as $Q_m$=6. (r*=r18, r19, . . . )

This may be further expressed as follows.

---

The bit sequence after encoding $d_0, d_1, \ldots, d_{N-1}$ from Clause 5.3.2 is written into a circular buffer of length $N_{cb}$ for the r-th coded block, where N is defined in Clause 5.3.2.

For the r-th code block, let $N_{cb}$ = N if $I_{LBRM}$ = 0 and $N_{cb}$ = min(N, $N_{ref}$) otherwise, where $N_{ref} = \left\lfloor \frac{TBS_{LBRM}}{C \cdot R_{LBRM}} \right\rfloor$, $R_{LBRM} = \frac{2}{3}$, $TBS_{LBRM}$ is determined according to Clause 6.1.4.2 in -continued

---

[TS 38.214] for UL-SCH, assuming the following:
  maximum number of layers for one TB for UL-SCH is given X, where
    if the higher layer parameter maxMIMO-Layers of PUSCH-ServingCellConfig of the
    serving cell is configured, X is given by that parameter
    elseif the higher layer parameter maxRank of pusch-Config of the serving cell is configured,
    X is given by the maximum value of maxRank across all BWPs of the serving cell
      otherwise, X is given by the maximum number of layers for PDSCH supported by
      the UE for the serving cell
    Case where $Q_m = 10$ is the maximum modulation order
  if the higher layer parameter mcs-Table-r* or mcs-TableTransformPrecoder-r* [or mcs-
TableDCI-0-2-r* or mcs-TableTransformPrecoderDCI-0-2-r*] given by a pusch-Config or
the higher layer parameter mcs-Table-r* or mcs-TableTransformPrecoder-r* given by
configuredGrantConfig for at least one UL BWP of the serving cell is set to 'qam1024',
maximum modulation order $Q_m = 10$ is assumed for UL-SCH; else if the higher layer
parameter mcs-Table or mcs-TableTransformPrecoder or mcs-TableDCI-0-2 or mcs-
TableTransformPrecoderDCI-0-2 given by a pusch-Config or the higher layer parameter
mcs-Table or mcs-TableTransformPrecoder given by configuredGrantConfig for at least one
UL BWP of the serving cell is set to 'qam256', maximum modulation order $Q_m = 8$ is
assumed for UL-SCH; otherwise a maximum modulation order $Q_m = 6$ is assumed for UL-
SCH (r* = r18 or r19, . . .)
    Case where $Q_m = 12$ is the maximum modulation order
  if the higher layer parameter mcs-Table-r* or mcs-TableTransformPrecoder-r* [or mcs-
TableDCI-0-2-r* or mcs-TableTransformPrecoderDCI-0-2-r*] given by a pusch-Config or
the higher layer parameter mcs-Table-r* or mcs-TableTransformPrecoder-r* given by
configuredGrantConfig for at least one UL BWP of the serving cell is set to 'qam4096',
maximum modulation order $Q_m = 12$ is assumed for UL-SCH; else if the higher layer
parameter mcs-Table-r* or mcs-TableTransformPrecoder-r* [or mcs-TableDCI-0-2-r* or
mcs-TableTransformPrecoderDCI-0-2-r*] given by a pusch-Config or the higher layer
parameter mcs-Table-r* or mcs-TableTransformPrecoder-r* given by
configuredGrantConfig for at least one UL BWP of the serving cell is set to 'qam1024',
maximum modulation order $Q_m = 10$ is assumed for UL-SCH; else if the higher layer
parameter mcs-Table or mcs-TableTransformPrecoder or mcs-TableDCI-0-2 or mcs-
TableTransformPrecoderDCI-0-2 given by a pusch-Config or the higher layer parameter
mcs-Table or mcs-TableTransformPrecoder given by configuredGrantConfig for at least one
UL BWP of the serving cell is set to 'qam256', maximum modulation order $Q_m = 8$ is
assumed for UL-SCH; otherwise a maximum modulation order $Q_m = 6$ is assumed for UL-
SCH (r* = r18 or r19, . . .)

---

FIG. 8 illustrates a flowchart of a method for a terminal to calculate a transport block size (TBS) by using a CQI table and an MCS table according to an embodiment of the disclosure. FIG. 8 illustrates an operation method of a terminal, for example, the terminal 120 illustrated in FIG. 1 and FIG. 3.

Referring to FIG. 8, a base station (e.g., the base station 110 illustrated in FIG. 1 and FIG. 2) may perform radio resource control (RRC) signaling for a terminal (i.e., the base station transmits an RRC message to the terminal) in consideration of a service to be provided to the terminal.

Referring to FIG. 8, in operation 801, a terminal may receive (or process) an RRC configuration, based on RRC signaling provided by a base station. In operation 803, the terminal may acquire a code rate and a modulation order which serve as a reference, based on the RRC configuration received (or processed) in operation 801.

In operation 805, the terminal may obtain the code rate if a service defined in the RRC configuration is different from a service serving as a reference. In this case, although service information itself for adjustment of the code rate may be indicated via RRC signaling, a BLER value or other parameters classified according to a service may be indicated. A specific method of acquiring (or determining) the code rate and the modulation order, and a method of adjusting the code rate conform to various embodiments (examples 1 to 7) of the disclosure.

In operation 807, the terminal may calculate a TBS by using the code rate adjusted in operation 805.

FIG. 9 illustrates a flowchart of another method for a terminal to calculate a transport block size (TBS) by using a CQI table and an MCS table according to an embodiment of the disclosure. FIG. 9 illustrates an operation method of the terminal 120 illustrated in FIG. 1 and FIG. 3.

Referring to FIG. 9, a base station (e.g., the base station 110 illustrated in FIG. 1 and FIG. 2) may perform radio resource control (RRC) signaling for a terminal (i.e., the base station transmits an RRC message to the terminal) in consideration of a service to be provided to the terminal.

Referring to FIG. 9, in operation 901, a terminal may receive (or process) an RRC configuration, based on RRC signaling provided by a base station. In operation 903, the terminal may acquire (or determine) a code rate and a modulation order which serve as a reference, based on the RRC configuration received (or processed) in operation 901.

In operation 905, the terminal may adjust the code rate if a service defined in the RRC configuration is different from a service serving as a reference. In this case, although service information itself for adjustment of the code rate may be indicated via RRC signaling, a BLER value or other parameters classified according to a service may be indicated.

A specific method of acquiring (or determining) the code rate and the modulation order, and a method of adjusting the code rate conform to various embodiments of the disclosure.

In operation 907, the terminal may feed back a channel state, based on the code rate adjusted in operation 905.

In some embodiments, the base station 110 and the terminal 120 may perform communication using at least one of wireless communication and wired communication.

Embodiment 5

When support of 1024 QAM or 4096 QAM is allowed in the 5G NR system, another example of an operation additionally required in a terminal or a base station may include receiving a phase tracking reference signal (PT-RS). The embodiment proposes a method of determining a PT-RS-related parameter by a base station and a terminal for PT-RS transmission and reception. In other words, a base station and a terminal determine PT-RS-related parameters, based on the methods of the embodiments, and perform appropriate PT-RS transmission and reception based on the parameters.

In order to transmit a PT-RS for a PDSCH during initial transmission or retransmission, a base station maps a PT-RS to physical resources via the following procedures.

First, for PT-RS mapping, a UE assumes that a PT-RS exists only in a resource block used for a corresponding PDSCH (the same even for a PUSCH PT-RS). In addition, when a PT-RS exists, the UE assumes that the PDSCH PT-RS is scaled by $\beta_{PT-RS,i}$. Here, $\beta_{PT-RS,i}$ refers to a factor for conforming to transmission power defined according to a standard when a PT-RS port associated with the PDSCH is scheduled (UE may assume the PDSCH PT-RS is scaled by a factor $\beta_{PT-RS,i}$ to conform with the transmission power specified in a standard (e.g., TS 38.214).), which is as follows.

When the UE is configured by higher-layer parameter epre-Ratio, ratio $\beta_{PT-RS,i}$ of a PT-RS EPRE to a PDSCH EPRE per layer and per RE for the PT-RS port (the ratio of PT-RS EPRE to PDSCH EPRE per layer per RE for PT-RS port) is given as shown in Table 32 according to an epre-Ratio value. In addition, PT-RS scaling factor $\beta_{PT-RS,i}$ is determined as $\beta_{PT-RS,i}=10^{\rho^{PTRS}/20}$. (* EPRE: Energy per resource element)

If the UE is not configured by higher-layer parameter epre-Ratio, the UE assumes the epre-Ratio value to be state "0", and determines $\rho_{PTRS}$ and $\beta_{PT-RS,i}$, based on Table 32 (PT-RS EPRE to PDSCH EPRE per layer per RE ($\rho_{PTRS}$)).

TABLE 32

| epre-Ratio | The number of PDSCH layers | | | | | |
| | 1 | 2 | 3 | 4 | 5 | 6 |
|---|---|---|---|---|---|---|
| 0 | 0 | 3 | 4.77 | 6 | 7 | 7.78 |
| 1 | 0 | 0 | 0 | 0 | 0 | 0 |
| 2 | | | reserved | | | |
| 3 | | | reserved | | | |

If the following two conditions (PT-RS condition 1) and (PT-RS condition 2) are satisfied, the PT-RS is mapped to resource element (k, l)$_{p,\mu}$, based on the following relational expression:

$$a_{k,l}^{(p,\mu)} = \beta_{PT-RS,i} \cdot r_k = \beta_{PT-RS,i} \cdot r(2m + k')$$

However, $r_k$ denotes a PT-RS for subcarrier k, and $r_k=r(2m+k')$. In addition, in TS38.211 which is the 5G NR standard specification, r(2m+k') indicates a DM-RS for subcarrier k and position $l_o$.

(PT-RS condition 1): An l value corresponds to a value in OFDM symbols allocated for PDSCH transmission. (l is within the OFDM symbols allocated for the PDSCH transmission)

(PT-RS condition 2]: The resource element (k, l)$_{p,\mu}$, is not used for a DM-RS, an NZP CSI-RS (however, an NZP CSI-RS configured for mobility measurement or in which parameter resourceType of corresponding higher-layer signaling CSI-ResourceConfig is configured to be "aperiodic" is excluded), a ZP CSI-RS, SS/PBCH blocks, and a detected PDCCH. Alternatively, the resource element (k, l)$_{p,\mu}$, may correspond to a resource element declared as "not available" according to the PDSCH resource mapping scheme of 3GPP specification TS 38.214.

A set of time indexes l relative to a start point of PDSCH allocation is defined as follows (for reference, when transform precoding is disabled, a set of time indexes l relative to a starting point of PUSCH allocation is also defined in the same way).

Procedure of Time Index Determination for PT-RS

Operation 1. Configuring i=0 and $l_{ref}$=0

Operation 2. When one symbol included in interval max $(l_{ref}+(i-1)L_{PT-RS}+1, l_{ref}), \ldots, l_{ref}+iL_{PT-RS}$ overlaps with a symbol to be used for a DM-RS, Configuring i=1

For a single-symbol DM-RS, configuring $l_{ref}$ as a symbol index of the DM-RS symbol, and for a double-symbol DM-RS, configuring $l_{ref}$ as a symbol index of a second DM-RS symbol When an $l_{ref}+iL_{PT-RS}$ value is within PDSCH allocation, repeating from operation 2

Operation 3. Adding the $l_{ref}+iL_{PT-RS}$ value to a time index set for a PT-RS Operation 4. Incrementing an i value by 1

Operation 5. When the $l_{ref}+iL_{PT-RS}$ value is within the PDSCH allocation, repeat from operation 2

This may be further expressed as follows.

1. set i = 0 and $l_{ref}$ = 0

2. if any symbol in the interval $\max_{\square}$ + (i − 1)$L_{PT-RS}$ + 1, $l_{ref}$), ... , $l_{ref}$ + i$L_{PT-RS}$ overlaps with a symbol used for DM-RS,

- set i = 1

- set $l_{ref}$ to the symbol index of the DM-RS symbol in case of a single-symbol DM-RS and to the symbol index of the second DM-RS symbol in case of a double-symbol DM-RS

- repeat from step 2 as long as $l_{ref}$ + i$L_{PT-RS}$ is inside the PDSCH allocation 3. add $l_{ref}$ + i$L_{PT-RS}$ to the set of time indices for PT-RS 4. increment i by one 5. repeat from step 2 above as long as $l_{ref}$ + i$L_{PT-RS}$ is inside the PDSCH allocation where $L_{PT-RS} \in \{1,2,4\}$.

In the procedure, an $L_{PT\text{-}RS} \in \{1,2,4\}$ value may be determined by PT-RS transmission and reception to be described later.

For the purpose of PT-RS mapping, numbers from 0 to $N_{RB}-1$ are assigned to resource blocks allocated for PDSCH transmission, starting from a lowest (ordered) scheduled resource block to a highest (ordered) scheduled resource block. In this set of resource blocks, corresponding subcarriers are numbered from 0 to $N_{SC}^{RB}N_{RB}-1$ in an increasing order starting from a lowest (ordered) frequency. The subcarriers are determined by the following indexes, wherein the UE assumes that the PT-RS is mapped to the subcarriers (for reference, when transform precoding is disabled, determination is made for PUSCH transmission in the same way):

$$k = k_{ref}^{RE} + \left(iK_{PT\text{-}RS} + k_{ref}^{RB}\right)N_{sc}^{RB}$$

$$k_{ref}^{RB} = \begin{cases} n_{RNTI}\text{mod}K_{PT\text{-}RS} & \text{if } N_{RB}\text{mod}K_{PT\text{-}RS} = 0 \\ n_{RNTI}\text{mod}(N_{RB}\text{mod}K_{PT\text{-}RS}) & \text{otherwise} \end{cases}$$

Here, i=0, 1, 2, . . . .

$k_{ref}^{RE}$ is a value determined by Table 33 for a DM-RS port associated with a PT-RS port. However, if parameter resourceElementOffset of higher-layer signaling PTRS-DownlinkConfig is not configured, values of columns corresponding to "offset00" in Table 33 should be used.

$n_{RNTI}$ is an RNTI associated with DCI via which transmission has been scheduled using C-RNTI, CS-RNTI, MCS-C-RNTI, or SP-CSI-RNTI, or is CS-RNTI in a case of a configured grant.

$N_{RB}$ is the number of scheduled resource blocks.

$K_{PT\text{-}RS} \in \{2,4\}$, and this may be determined by PT-RS transmission and reception to be described later.

TABLE 33

| | $k_{ref}^{RE}$ | | | | | | | |
| | DM-RS Configuration type 1 resourceElementOffset | | | | DM-RS Configuration type 2 resourceElementOffset | | | |
| DM-RS antenna port p | offset 00 | offset 01 | offset 10 | offset 11 | offset 00 | offset 01 | offset 10 | offset 11 |
|---|---|---|---|---|---|---|---|---|
| 1000 | 0 | 2 | 6 | 8 | 0 | 1 | 6 | 7 |
| 1001 | 2 | 4 | 8 | 10 | 1 | 6 | 7 | 0 |
| 1002 | 1 | 3 | 7 | 9 | 2 | 3 | 8 | 9 |
| 1003 | 3 | 5 | 9 | 11 | 3 | 8 | 9 | 2 |
| 1004 | — | — | — | — | 4 | 5 | 10 | 11 |
| 1005 | — | — | — | — | 5 | 10 | 11 | 4 |

For reference, when transform precoding is disabled, Table 34 is used for a $k_{ref}^{RE}$ value for PUSCH transmission.

TABLE 34

| | $k_{ref}^{RE}$ | | | | | | | |
| | DM-RS Configuration type 1 resourceElementOffset | | | | DM-RS Configuration type 2 resourceElementOffset | | | |
| DM-RS antenna port $\tilde{p}$ | offset 00 | offset 01 | offset 10 | offset 11 | offset 00 | offset 01 | offset 10 | offset 11 |
|---|---|---|---|---|---|---|---|---|
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | — | — | — | — | 4 | 5 | 10 | 11 |
| 5 | — | — | — | — | 5 | 10 | 11 | 4 |

The UE needs to report, based on UE capability at a given carrier frequency during initial transmission or retransmission, a preferred MCS and frequency bandwidth thresholds to the base station with respect to each subcarrier spacing applicable to a data channel at the carrier frequency. In this case, an MCS table corresponding to a maximum modulation order reported to be supportable by the terminal is assumed.

If the UE is configured with parameter phaseTrackingRS in higher-layer signaling DMRS-DownlinkConfig, 1) Parameters timeDensity and frequencyDensity in higher-layer signaling PTRS-DownlinkConfig indicate thresholds ptrs-MCS$_i$(i=1,2,3) and N$_{RB,i}$ (i=0,1) of Table 35 and Table 36, respectively.
2) If both or even one of additional higher-layer parameters timeDensity and frequencyDensity is configured, and RNTI is MCS-C-RNTI, C-RNTI, or CS-RNTI, the UE assumes the presence and pattern of a PT-RS antenna port to be a function of a scheduled bandwidth in a corresponding BWP and a corresponding scheduled MCS of a corresponding codeword, as shown in Table 35 and Table 36.
   If parameter timeDensity in higher-layer signaling PTRS-DownlinkConfig is not configured, the UE assumes that L$_{PT-RS}$=1.
   If parameter frequencyDensity in higher-layer signaling PTRS-DownlinkConfig is not configured, the UE assumes that K$_{PT-RS}$=2.
   Table 35: Time density of PT-RS as a function of scheduled MCS
   Table 36: Frequency density of PT-RS as a function of scheduled bandwidth

TABLE 35

| Scheduled MCS | Time density (L$_{PT-RS}$) |
| --- | --- |
| I$_{MCS}$ < ptrs-MCS$_1$ | PT-RS is not present |
| ptrs-MCS1 ≤ I$_{MCS}$ < ptrs-MCS2 | 4 |
| ptrs-MCS2 ≤ I$_{MCS}$ < ptrs-MCS3 | 2 |
| ptrs-MCS3 ≤ I$_{MCS}$ < ptrs-MCS4 | 1 |

TABLE 36

| Scheduled bandwidth | Frequency density (K$_{PT-RS}$) |
| --- | --- |
| N$_{RB}$ < N$_{RB0}$ | PT-RS is not present |
| N$_{RB0}$ ≤ N$_{RB}$ < N$_{RB1}$ | 2 |
| N$_{RB1}$ ≤ N$_{RB}$ | 4 |

3) If both additional higher-layer parameters timeDensity and frequencyDensity are not configured, and RNTI is MCS-C-RNTI, C-RNTI or CS-RNTI, the UE assumes that the PT-RS is present with values of L$_{PT-RS}$=1 and K$_{PT-RS}$=2, wherein it is assumed that no PT-RS is present in the following cases:
   when an MCS index scheduled from the MCS table of Table 13 is smaller than 10,
   when an MCS index scheduled from the MCS table of Table 15 is smaller than 5,
   when an MCS index scheduled from the MCS table of Table 14 is smaller than 15,
   when the number of scheduled RBs is less than 3,
4) Regardless of whether additional higher-layer parameters timeDensity and frequencyDensity are configured, when RNTI is RA-RNTI, [MsgB-RNTI], SI-RNTI, or P-RNTI, the UE assumes that no PT-RS has been present. (The expression "present" as used above may also be expressed as other appropriate words, such as appearance or existence in some cases.)

When the system allows application of 1024 QAM, especially, if the MCS table in Table 16 is configured, a condition such as "an MCS index scheduled from the MCS table in Table 16 is smaller than 3," may be added to the PT-RS configuration-related condition 3). In general, for the added MCS table, the following conditions may be expressed:

"an MCS index scheduled from the MCS table is smaller than a smallest index value among indexes corresponding to modulation order 4."

Therefore, when the system allows application of 4096 QAM, especially, if an MCS table corresponding to 4096 QAM, such as Table 26, is configured, a condition such as "an MCS index scheduled from the MCS table is smaller than 1," may be configured, and if an MCS table corresponding to 4096 QAM, such as Table 27 or Table 28, is configured, a condition such as "an MCS index scheduled from the MCS table is smaller than 2" may be configured. In addition, if an MCS table which does not support QPSK, such as Table 29, is configured, whether "PT-RS not present" is not determined via the MCS index, and whether "PT-RS not present" may be determined according to the range of a scheduled bandwidth. Even if an MCS table that does not support QPSK, such as Table 29, has been configured, a condition such as "an MCS index scheduled from the MCS table is smaller than X" may be added, in which case, a value of X is configured to a small integer value, such as 1 or 2. In addition, for a condition where X=0 is configured, since the MCS index is always a non-negative integer, it may be seen that the condition corresponds to the same operation in which whether "PT-RS not present" is not determined via the MCS index. In this case, when a lowest MCS index, i.e., index 0, is configured, it may be seen that a time density for index 0 satisfies L$_{PT-RS}$=4.

If the UE is not configured with parameter phase TrackingRS in higher-layer signaling DMRS-DownlinkConfig, and when even at least one of PT-RS time density corresponding parameter L$_{PT-RS}$ of Table 35 or frequency density corresponding parameter K$_{PT-RS}$ of Table 36 indicates "PT-RS not present," the UE may consider that no PT-RS has been present.

For higher-layer parameter PTRS-DownlinkConfig, in providing of each parameter ptrs-MCS$_i$, where (i=1,2,3), one value from 0 to 29 is determined when the MCS table of Table 13 or Table 14 is configured, one value from 0 to 28 is determined when the MCS table of Table 15 is configured, one value from 0 to 27 is determined when the MCS table of Table 16 including the 1024 QAM modulation scheme or modulation order 10 is configured, one value from 0 to 26 is determined when the MCS table of Table 26 or Table 28 including the 4096 QAM modulation scheme or modulation order 12 is configured, and one value from 0 to 27 is determined when the MCS table of Table 29 is configured. In general, a relationship in which ptrs-MCS$_1$≤ptrs-MCS$_2$≤ptrs-MCS$_3$≤(a lowest index value among reserved fields in the MCS table) is satisfied.

However, with respect to Table 34, if a value of ptrs-MCS$_3$ is 29 when the MCS table of Table 13 or Table 14 is configured, the value of ptrs-MCS$_3$ is 28 when the MCS table of Table 15 is configured, the value of ptrs-MCS$_3$ is 27 when the MCS table of Table 16 including the 1024 QAM modulation scheme or modulation order 10 is configured, the value of ptrs-MCS$_3$ is 26 when the MCS tables of Table 26 to Table 28 including the 4096 QAM modulation scheme or modulation order 12 are configured, or the value of ptrs-MCS$_3$ is 27 when the MCS table of Table 29 is configured, an I$_{MCS}$ value satisfying a condition of ptrs-MCS$_3 \leq$I$_{MCS}$<ptrs-MCS$_4$ is always an MCS index available only at retransmission, so that it may be considered that there is no case where L$_{PT-RS}$=1. (Of course, depending on the system, L$_{PT-RS}$=1 may be configured for retransmission.) In the current 5G NR system, information on a value of ptrs-MCS$_4$ is not transferred via higher-layer signaling. However, in general, 29 may be assumed and used when the MCS table of Table 13 or Table 14 is configured, 28 may be assumed and used when the MCS table of Table 15 is configured, a value of 27 may be assumed and used if the MCS table of Table 16 including the 1024 QAM modulation scheme or modulation order 10 is configured when application of 1024 QAM is allowed, a value of 26 may be assumed and used if the MCS tables of Table 26 to Table 28 including the 4096 QAM modulation scheme or modulation order 12 are configured when application of 4096 QAM is allowed, and a value of 27 may be assumed and used if the MCS table of Table 29 is configured.

If higher-layer parameter PTRS-DownlinkConfig indicates ptrs-MCS$_i$=ptrs-MCS$_{i+1}$ in each time density-related parameter ptrs-MCS$_i$ (i=1,2,3), this indicates that time density value L$_{PT-RS}$ corresponding to ptrs-MCS$_i \leq$I$_{MCS} \leq$ptrs-MCS$_{i+1}$ is unavailable or disabled. Similarly, higher-layer parameter PTRS-DownlinkConfig is determined to be one of values from 1 to 276 in providing of each parameter N$_{RB,i}$ (i=0,1), and if N$_{RB,i}$=N$_{RB,i+1}$ is indicated, this indicates that frequency density value K$_{PT-RS}$ corresponding to N$_{RB,i} \leq$N$_{RB}$<N$_{RB,i+1}$ is unavailable or disabled.

If a value of L$_{PT-RS}$ is configured to be 2 or 4 when the UE receives a PDSCH having an allocation duration of 2 symbols, or if the value of L$_{PT-RS}$ is configured to be 4 when the UE receives a PDSCH having an allocation duration of 4 symbols, it may be considered that no PT-RS is transmitted.

For configurations of the time density and frequency density, the UE may apply different configurations according to a frequency band being used. In general, an FR2/A6G band has diffraction/propagation characteristics of frequency worse than those of FR1/B6G, and has relatively strong straightness, and may be thus more susceptible to a phase error. On the other hand, since the FR1/B6G band has better frequency characteristics compared to the FR2/A6G band, the FR1/B6G band may be relatively less sensitive to a phase error. Therefore, when the UE or base station is using the FR2/A6G band, it may be configured to provide higher time density and frequency density compared to FR1/B6G. For example, for the same MCS table configuration and the same MCS index I$_{MCS}$, when a value of L$_{PT-RS}$ configurable for the FR1/B6G band is referred to as L$_{PT-RS}$ (FR1/B6G, I$_{MCS}$), and a value of L$_{PT-RS}$ configurable for the FR2/A6G band is referred to as L$_{PT-RS}$ (FR2/A6G, I$_{MCS}$), ptrs-MCS$_i$ (i=1,2,3) may be configured so that an average value of L$_{PT-RS}$ (FR1/B6G, I$_{MCS}$) is greater than an average value of L$_{PT-RS}$ (FR2/A6G, I$_{MCS}$). In particular, ptrs-MCS$_i$ (i=1,2,3) may be configured so that L$_{PT-RS}$ (FR1/B6G, I$_{MCS}$)$\geq$L$_{PT-RS}$ (FR2/A6G, I$_{MCS}$) is satisfied for any MCS index, and L$_{PT-RS}$ (FR1/B6G, I$_{MCS}$)>L$_{PT-RS}$ (FR2/A6G, I$_{MCS}$) is satisfied for at least one MCS index. As another example, ptrs-MCS$_i$ (i=1,2,3) may be configured so that "PT-RS is not present" in the FR1/B6G band, and the value of L$_{PT-RS}$ is configured to at least one of 1, 2, or 4 only for FR2/A6G. For reference, the value of L$_{PT-RS}$ may be determined according to an MCS index, but as described above, the value may also be determined according to configuration/non-configuration of higher-layer signaling.

When the UE is receiving a PDSCH for retransmission, if the UE is scheduled or configured with an MCS index greater than V, an MCS for PT-RS time density determination may be obtained based on DCI received for the same TB scheduled or configured with an MCS index equal to or smaller than V in initial transmission. For a value of V herein, V=28 may be used when the MCS table of Table 13 or Table 14 is configured, V=27 may be used when the MCS table of Table 15 is configured, V=26 may be used when the MCS table of Table 16 including the 1024 QAM modulation scheme or modulation order 10 is configured, V=25 may be used when the MCS tables of Table 26 to Table 28 including the 4096 QAM modulation scheme or modulation order 12 are configured, and V=26 may be used when the MCS table of Table 29 is configured.

In general, as a modulation order increases, a change in system performance due to a phase error may become more sensitive. For insufficient performance in phase error tracking caused by an existing time density due to introduction of 1024 QAM or 4096 QAM, a case where a parameter corresponding to the time density is smaller than 1 (e.g., 0.5, indicating that more PT-RSs are allocated or a PT-RS is allocated more frequently compared to the time intensity of 1) may be additionally defined by introducing ptrs-MCS$_5$ as in Table 37. In this case, higher-layer parameter PTRS-DownlinkConfig may provide each parameter ptrs-MCS$_i$ (i=1,2,3,4). The time density values in Table 37 are merely an example, and it is possible to express the values in a more generalized relationship as shown in Table 38, and in Table 38, it may be possible that A, B, C, and D have positive values and have a relationship of A>B>C>D. In Table 38, it may be possible that only at least one value among A, B, C, and D exists, and therefore it may be possible that there are only at least some values among ptrs-MCS$_i$, ptrs-MCS$_2$, ptrs-MCS$_3$, ptrs-MCS$_4$, and ptrs-MCS$_5$. In addition, as shown in Table 37, when at least one value among parameter values A, B, C, and D corresponding to the time density (or frequency density) is defined to be smaller than 1, since a value of (i–1)L$_{PT-RS}$ or iL$_{PT-RS}$ may not be an integer in Procedure of time index determination for PT-RS, an additional operation for a PT-RS position may be required. For example, the additional operation may be implemented via a method by which a frequency density is substantially increased.

TABLE 37

| Time density of PT-RS as a function of scheduled MCS | |
| --- | --- |
| Scheduled MCS | Time density (L$_{PT-RS}$) |
| I$_{MCS}$ < ptrs-MCS$_1$ | PT-RS is not present |
| ptrs-MCS1 $\leq$ I$_{MCS}$ < ptrs-MCS2 | 4 |
| ptrs-MCS2 $\leq$ I$_{MCS}$ < ptrs-MCS3 | 2 |
| ptrs-MCS3 $\leq$ I$_{MCS}$ < ptrs-MCS4 | 1 |
| ptrs-MCS4 $\leq$ I$_{MCS}$ < ptrs-MCS5 | 0.5 |

TABLE 38

| Time density of PT-RS as a function of scheduled MCS | |
| --- | --- |
| Scheduled MCS | Time density (L$_{PT-RS}$) |
| I$_{MCS}$ < ptrs-MCS$_1$ | PT-RS is not present |
| ptrs-MCS1 $\leq$ I$_{MCS}$ < ptrs-MCS2 | A |
| ptrs-MCS2 $\leq$ I$_{MCS}$ < ptrs-MCS3 | B |

TABLE 38-continued

| Time density of PT-RS as a function of scheduled MCS | |
| --- | --- |
| Scheduled MCS | Time density ($L_{PT\text{-}RS}$) |
| ptrs-MCS3 $\le I_{MCS}$ < ptrs-MCS4 | C |
| ptrs-MCS4 $\le I_{MCS}$ < ptrs-MCS5 | D |

In the above description, a PT-RS for a PDSCH has been described for convenience, but a similar operation may also be applied to a PUSCH PT-RS. The embodiments of the disclosure may be similarly applied to not only a PDSCH but also a PUSCH. However, for a PUSCH PT-RS, the above operations may be performed similarly based on parameter phaseTrackingRS in higher-layer signaling DMRS-Up-linkConfig, parameters timeDensity and frequencyDensity included in higher-layer signaling PTRS-UplinkConfig, and whether transform precoding is enabled/not-enabled.

Unlike PDSCH PT-RS transmission/reception or PUSCH PT-RS transmission/reception of when transform precoding is disabled, a PUSCH PT-RS may require or optimally include an additional operation when transform precoding is enabled.

In 5G NR, when transform precoding is enabled, a time density of a PUSCH PT-RS is configured to $L_{PT\text{-}RS}=2$ by higher-layer parameter timeDensityTransformPrecoding, otherwise, the UE considers $L_{PT\text{-}RS}=1$. Also, PT-RS $r_m(m')$ to be mapped to position m before transform precoding is generated as follows (However, m is a value dependent on the number $N_{group}^{PT\text{-}RS}$ of PT-RS groups, the numbers $N_{samp}^{group}$ and $M_{SC}^{PUSCH}$ of samples per PT-RS group (Scheduled bandwidth for uplink transmission, expressed as a number of subcarriers)):

$$r_m(m') = w(k')\frac{e^{j\frac{\pi}{2}(m\,mod\,2)}}{\sqrt{2}}[(1 - 2c(m')) + j(1 - 2c(m'))]$$

$$m' = N_{samp}^{group}s' + k'$$

$$s' = 0, 1, \dots, N_{group}^{PT\text{-}RS} - 1$$

$$k' = 0, 1, N_{samp}^{group} - 1$$

Here, c(i) denotes a pseudo-random sequence determined according to the standard specification, and w(i) denotes a value obtained from an orthogonal sequence as shown in Table 39.

TABLE 39

| $n_{RNTI}\,mod\,N_{samp}^{group}$ | $N_{samp}^{group} = 2$ [w(0) w(1)] | $N_{samp}^{group} = 4$ [w(0) w(1) w(2) w(3)] |
| --- | --- | --- |
| 0 | [+1 +1] | [+1 +1 +1 +1] |
| 1 | [+1 −1] | [+1 −1 +1 −1] |
| 2 | — | [+1 +1 −1 −1] |
| 3 | — | [+1 −1 −1 +1] |

Sequence $r_m(m')$ generated in this way is multiplied by scaling factor β', so as to be mapped to multiple $N_{samp}^{group} \cdot N_{group}^{PT\text{-}RS}$ symbols. Here, β' denotes a ratio of sizes between one of outermost constellation points in a signal constellation for a given modulation scheme (or modulation order) for a PUSCH and one of outermost constellation points in a signal constellation for π/2-BPSK. If transform precoding is enabled, and the UE is configured with parameter transformPrecoderEnabled of higher-layer signaling PTRS-UplinkConfig, scaling factor β' is determined based on a scheduled modulation order (or modulation scheme) as shown in Table 40 below. If also applicable to 4096 QAM, a value of PT-RS scaling factor β' is 63/$\sqrt{1365}$.

TABLE 40

| Scheduled modulation | PT-RS scaling factor (β') |
| --- | --- |
| π/2-BPSK | 1 |
| QPSK | 1 |
| 16QAM | $3/\sqrt{5}$ |
| 64QAM | $7/\sqrt{21}$ |
| 256QAM | $15/\sqrt{85}$ |
| 1024QAM | $31/\sqrt{341}$ |

Embodiment 6

Although briefly described in embodiment 4, in support of 1024 QAM or 4096 QAM in a downlink or an uplink of the wireless communication system, appropriate RRC signaling information may be defined and used as needed in the system. For example, RRC signaling (e.g., mcs-Table-r18 (19) or mcs-Table-DL-r18(19)) for indicating use of an MCS table for a PDSCH scheduled by DCI format 11 may be present in PDSCH-Config, wherein, when a UE is configured with a parameter corresponding to 4096 QAM, such as "qam4096," via an RRC signaling set (in the case that UE is configured with an RRC signaling (e.g., mcs-Table-DL-r18) set to "qam4096" in PDSCH-Config), the UE may use a 4096 QAM MCS table for the PDSCH scheduled via DCI format 1_1 to which a CRC scrambled by C-RNTI is applied. If the UE is not configured via RRC signaling to indicate use of the MCS table provided in SPS-Config, the UE may use the 4096 QAM MCS table for the PDSCH scheduled via DCI format 1_1 to which the CRC scrambled by CS-RNTI is applied. In addition, a 4096 QAM MCS table may be configured and used also for DCI format 1_2 similarly to the above.

RRC signaling (e.g., mcs-TableTransformPrecoder-UL-r18(19) or mcs-Table-UL-r18(19)) for indicating use of an MCS table for a PUSCH scheduled by DCI format 0_1 may be present in PUSCH-Config, wherein, when the UE is configured with the RRC signaling set to a parameter corresponding to 1024 QAM, such as "qam1024" (in the case that UE is configured with an RRC signaling (e.g., mcs-Table-UL-r18) set to "qam1024" in PUSCH-Config), the UE may use a 1024 QAM MCS table for the PUSCH scheduled via DCI format 0_1 to which a CRC scrambled by C-RNTI is applied. If the UE is not configured via RRC signaling to indicate use of the MCS table provided in ConfiguredGrantConfig, the UE may use the 1024 QAM MCS table for the PUSCH scheduled via DCI format 0_1 to which the CRC scrambled by CS-RNTI is applied. In addition, a 1024 QAM MCS table may be configured and used also for DCI format 0_2 similarly to the above.

When the wireless communication system supports 1024 QAM or 4096 QAM, whether the UE is able to support 1024 QAM or 4096 QAM should be indicated. For example, in 5G NR, whether the UE supports 1024 QAM or 4096 QAM for PDSCH for FR1 may be indicated using parameter pdsch-1024QAM-FR1 or pdsch-4096QAM-FR1 for only FR1 for each UE of Phy-Parameters among physical layer parameters. In addition, whether the UE supports 1024 QAM or 4096 QAM for PDSCH for FR2 may be indicated using parameter pdsch-1024QAM-FR2 or pdsch-4096QAM-FR2 for only FR2 for each band of BandNR parameters.

A maximum modulation order to be applied to a downlink may be indicated with respect to a carrier for calculation of an (approximated) maximum data rate based on Equation 1 by using FSPC-specific parameter supportedModulationOrderDL of FeatureSetDownlinkPerCC. If the parameter is included, in a corresponding serving cell, a modulation order greater than (or equal to or greater than) a value indicated in this field may be applied. (But, only in a case where the UE supports the modulation order for downlink)

If the parameter is not included,

For FR1, the network may use a modulation order indicated in pdsch-256QAM-FR1, pdsch-1024QAM-FR1, or pdsch-4096QAM-FR1.

For FR2, the network may use a modulation order indicated for each band. Here, the modulation order indicated for each band refers to its value (8, 10, or 12) when pdsch-256QAM-FR2, pdsch-1024QAM-FR2, or pdsch-4096QAM-FR2 is signaled, and when there is no signaling for a given band, modulation order 6, i.e., 64 QAM, is used.

For a PUSCH, when 1024 QAM or 4096 QAM is supported, an indication may be made using parameter pusch-1024QAM or pusch-4096QAM for each band of BandNR parameters in the same manner. A maximum modulation order to be applied to an uplink may be indicated with respect to a carrier for calculation of an (approximated) maximum data rate based on Equation 1 by using FSPC-specific parameter supportedModulationOrderUL of FeatureSetUplinkPerCC. If the parameter is included, in a corresponding serving cell, a modulation order greater than (or equal to or greater than) a value indicated in this field may be applied. (But, only in a case where the UE supports a modulation order for uplink)

If the parameter is not included,

For FR1/FR2, the network may use a modulation order indicated for each band. Here, the modulation order indicated for each band refers to its value (8, 10, or 12) when pusch-256QAM, pusch-1024QAM, or pusch-4096QAM is signaled, and when there is no signaling for a given band, modulation order 6, i.e., 64 QAM, is used.

For reference, "FSPC" indicates that signaling is performed for each feature set and or each component carrier (CC). (FSPC indicates it is signaled per feature set per component carrier (per CC per band per band combination))

Embodiment 7

The present embodiment proposes a TBS determination method and a method of determining a supported maximum (max) data rate of the system when 1024 QAM or 4096 QAM is applied in the wireless communication system.

First, for a j-th serving cell, if parameter processingType2Enabled of higher-layer signaling PDSCH-ServingCellConfig is configured to be "enable" or an MCS table corresponding to 4096 QAM is configured, and when at least one MCS index $I_{MCS}$ for a PDSCH is indicated with a value greater than V, a UE does not need to handle corresponding PDSCH transmission unless the following conditions are satisfied (Here, V has a value of 25 when an index corresponding to highest spectral efficiency is 25 as shown in Table 26 to Table 28, and has a value of 26 when the index corresponding to the highest spectral efficiency is 26 as shown in Table 29:

$$\frac{\sum_{m=0}^{M-1} V_{j,m}}{L \times T_s^\mu} \le DataRateCC$$

Here, L denotes the number of symbols assigned to the PDSCH, M denotes the number of TB(s) in the PDSCH, $$T_S^\mu = \frac{10^{-3}}{2^\mu \cdot N_{symb}^{slot}}$$

(μ: numerology of the PDSCH), and $$V_{j,m} = C' \cdot \left\lceil \frac{A}{c} \right\rceil$$

for a μ-th TB is a value determined by the number A of bits included in the corresponding TB, the number C of code blocks corresponding to the TB, and the number C' of code blocks scheduled for the TB. In addition, DataRateCC [Mbps] is a value obtained by calculating a maximum data rate for one carrier in a frequency band of the serving cell for a certain signaled band combination and feature set consistent with the serving cell, and the value is determined based on Equation 1 and scaling factor f(i).

In other words, when the number of TBS or PDSCH symbols is configured to be greater than a maximum data rate that may be calculated according to a predetermined method, since data decoding is highly likely to fail due to a high code rate, the UE either omits decoding of a reception signal corresponding to data or performs the decoding, which indicates that a part or all of data restoration can be omitted like omitting the data decoding such as LDPC decoding. However, in Equation 1, although $R_{max}=948/1024$ is configured, since a decodable code rate may differ depending on a base graph (or base matrix) BG(1) and BG(2) used for LDPC encoding and decoding in 5G NR, a different value may be applied for the $R_{max}=948/1024$ value depending on BG(1) or BG(2) according to the system. (For example, an $R_{max}$ value for BG(1) may be configured to be higher than an $R_{max}$ value for BG(2).)

A (approximated) maximum data rate for the serving cell may be determined to be a maximum value of a (approximated) maximum data rate calculated using Equation 1 according to each supported band or band combination. In addition, for a single-carrier-based 5G NR standalone (SA) operation, the UE may configure each parameter so that a data rate for a corresponding carrier has J=1 CC and a value of $v_{Layers}^{(j)} \cdot Q_m^{(j)} \cdot f^{(j)}$, which is not smaller than 4, thereby supporting the data rate to be no smaller than the data rate calculated via Equation 1.

However, if the maximum modulation order supportable in the wireless communication system is 8 (i.e., $Q_m^{(j)}=8$), when scaling factor $f^{(j)}$ is configured to be 0.4, the condition is satisfied from $v_{Layers}^{(j)} \cdot Q_m^{(j)} \cdot f^{(j)} = v_{Layers}^{(j)} \times 3.2 \ge 4$ only when $v_{Layers}^{(j)}$ is 2 or greater. That is, in the wireless communication system, there is no need to support any PDSCH or PUSCH data transmission and reception corresponding to a combination of $(v_{Layers}^{(j)}, f^{(j)})=(1, 0.4)$, or there is no need to support any PDSCH or PUSCH data transmission and reception supporting a data rate determined based on the $(v_{Layers}^{(j)}, f^{(j)})$ f (1, 0.4) combination. However, even if $f^{(j)}$ is configured to be 0.4 in the system supporting 1024 QAM or 4096 QAM, $v_{Layers}^{(j)}=1$ is supportable based on $v_{Layers}^{(j)} \cdot Q_m^{(j)} \cdot f^{(j)} = v_{Layers}^{(j)} \times 10 \times 0.4 \geq 4$ or $v_{Layers}^{(j)} \cdot Q_m^{(j)} \cdot f^{(j)} = v_{Layers}^{(j)} \times 12 \times 0.4 \leq 4.8$, and therefore when CQI or MCS tables, in which 1024 QAM or 4096 QAM is supported, such as the CQI tables of Table 12 and Table 16 or Table 21 to Table 24 or the MCS tables of Table 25 to Table 29 of the disclosure are configured, there exists a case where PDSCH or PUSCH data transmission and reception supporting the combination of $(v_{Layers}^{(j)}, f^{(j)}) = (1, 0.4)$ or a data rate equal to or greater than the (maximum) data rate determined based on the combination.

More specifically, in the wireless communication system supporting 1024QAM or 4096QAM, at least for the single-carrier-based 5G NR standalone (SA) operation, the terminal/base station may transmit and receive PDSCH or PUSCH data corresponding to a $(v_{Layers}^{(j)}, Q_m^{(j)}, f^{(j)}) = (1, 10, 0.4)$ or $(1, 12, 0.4)$ combination, or may transmit and receive PDSCH or PUSCH data supporting a data rate equal to or greater than a data rate determined based on the $(v_{Layers}^{(j)}, Q_m^{(j)}, f^{(j)}) = (1, 10, 0.4)$ or $(1, 12, 0.4)$ combination.

Of course, as described earlier, the case where the wireless communication system supports 1024 QAM or 4096 QAM (or the case where an MCS table supporting 1024 QAM or 4096 QAM is configured), indicates a special situation in which a channel environment is good, a condition for the $v_{Layers}^{(j)} \cdot Q_m^{(j)} \cdot f^{(j)}$ value may be configured differently. For example, in the system that allows a $Q_m^{(j)}$ value to be 10 or 12, a reference value for the $v_{Layers}^{(j)} \cdot Q_m^{(j)} \cdot f^{(j)}$ value may be configured to be a number greater than 4, or a value of $v_{Layers}^{(j)}$ or $f^{(j)}$ may be restricted. For example, restriction may be performed so that a combination, such as $(v_{Layers}^{(j)}, f^{(j)}) = (1, 0.4)$, cannot be configured.

In this way, in the wireless communication system, a probability of successful decoding may be increased by transmitting a TB having an appropriate TBS within a range that does not exceed a maximum data rate supportable for each UE, and as a result, unnecessary retransmission may be minimized.

When higher-layer parameter maxNrofCodeWordsScheduledByDCI indicates that transmission of two codewords is "enabled," if one of two TBs is configured to be ($I_{MCS}$=26, $rv_{id}$=1) by DCI format 1_1, the corresponding TB is "disabled." Except for such a case where the TB is "disabled" by DCI format 1_1, a TBS needs to be determined for data transmission and reception via a PDSCH assigned by a PDCCH of DCI format 1_0, format 1_1, or format 1_2 corresponding to a CRC scrambled by C-RNTI, MCS-C-RNTI, TC-RNTI, CS-RNTI, or SI-RNTI.

The TBS is determined based on a total number $N_{RE}$ of REs allocated (or allocable) for a PDSCH or PUSCH, $Q_m$ and R determined from MCS information of initial transmission, and the number v of layers used. Therefore, only for an $I_{MCS}$ value that is 0 to 28 if a CQI or MCS table having a maximum modulation order corresponding to 64 QAM is configured, only for an $I_{MCS}$ value that is 0 to 27 if a CQI or MCS table having a maximum modulation order corresponding to 256 QAM is configured, only for an $I_{MCS}$ value that is 0 to 26 if a CQI or MCS table having a maximum modulation order corresponding to 1024 QAM, as in Table 16, or a CQI or MCS table having a maximum modulation order corresponding to 4096 QAM, as in Table 29, is configured, and only for an $I_{MCS}$ value that is 0 to 25 if a CQI or MCS table having a maximum modulation order corresponding to 4096 QAM, as in Table 26 to Table 28, is configured, the TBS is determined based on $Q_m$ and R values corresponding to the MCS indexes.

First, the base station or UE determines the number $N'_{RE}$ of REs allocated (or allocable) to the PDSCH (or PUSCH)

in one PRB, as sown in $N'_{RE} = N_{sc}^{RB} \cdot N_{symb}^{sh} - N_{DMRS}^{PRB} - N_{oh}^{PRB}$. Here, $N_{sc}^{RB}$ denotes the number (e.g., 12) of sub-carriers included in one RB, $N_{symb}^{sh}$ denotes the number of OFDM symbols allocated (or allocable) to the PDSCH (or PUSCH), $N_{DMRS}^{PRB}$ denotes the number of REs in one PRB, which are occupied by a demodulation reference signal (DMRS) of a code division multiplexing (CDM) group, and $N_{oh}^{PRB}$ denotes the number (e.g., configured to be one of 0, 6, 12, and 18) of REs occupied by overhead within one PRB configured by higher signaling (e.g., xOverhead in PDSCH-ServingCellConfig or xOverhead in PUSCH-ServingCell-Config). Then, the total number $N_{RE}$ of REs allocated (or allocable) to the PDSCH (or PUSCH) may be determined as follows: $N_{RE} = \min(156, N'_{RE}) \cdot n_{PRB}$. Here, $n_{PRB}$ denotes the number of PRBs allocated (or allocable) to the UE. In addition, the TBS value is determined based on the number $N_{info} = N_{RE} \cdot Q_m \cdot R \cdot v$ of temporary information bits.

If an $I_{MCS}$ value is configured to be a value of 27 to 31 when a CQI or MCS table corresponding to a maximum modulation order of 1024 QAM as in Table 16 or a CQI or MCS table corresponding to a maximum modulation order of 4096 QAM as in Table 29 is configured, the TBS may be determined based on DCI (the DCI transported in the latest PDCCH) transmitted via the most recent PDCCH for the same TB having the $I_{MCS}$ value configured to be a value of 0 to 26. If there is no PDCCH for the same TB configured to be a value from 0 to 26, and a first PDSCH is scheduled semi-persistently for the same TB, the TBS is determined based on the most recent semi-persistent scheduling assigned (or assignable) PDCCH (the most recent semi-persistent scheduling assignment PDCCH). Likewise, if an $I_{MCS}$ value is configured to be a value of 26 to 31 when a CQI or MCS table corresponding to a maximum modulation order of 4096 QAM as in Table 26 to Table 28 is configured, the TBS may be determined based on DCI transmitted via the latest PDCCH for the same TB having the $I_{MCS}$ value configured to be a value of 0 to 25. If there is no PDCCH for the same TB configured to be a value from 0 to 26, and the first PDSCH is scheduled semi-persistently for the same TB, the TBS is determined based on the most recent semi-persistent scheduling assignment PDCCH. Likewise, if an $I_{MCS}$ value is configured to be a value of 28 to 31 when a CQI or MCS table having a maximum modulation order of 256 QAM is configured, or an $I_{MCS}$ value is configured to be a value of 29 to 31 when a CQI or MCS table having a maximum modulation order of 64 QAM is configured, the TBS in each case may be determined based on DCI transmitted via the most recent PDCCH for the same TB having the $I_{MCS}$ value configured to be 0 to 27 or for the same TB having the $I_{MCS}$ value configured to be 0 to 28. In each case, if there is no PDCCH for the same TB configured to be a value from 0 to 27 or configured to be a value from 0 to 28, and the first PDSCH is scheduled semi-persistently for the same TB, the TBS is determined based on the most recent semi-persistent scheduling assignment PDCCH.

Embodiment 8

The embodiment proposes a method of configuring an MCS index when retransmission is applied in the wireless communication system.

Typically, MCS tables, such as Table 13 to Table 18 or Table 25 to Table 29, include "reserved field," and when used during retransmission, the "reserved field" is used to indicate use of the same transport block or TBS as that for initial transmission. Specifically, if "reserved field" is indicated for a configured MCS table, a TBS value is determined from DCI transmitted via the most recent PDCCH indicated by an MCS index, instead of the "reserved field," for the same transport block (the TBS is assumed to be as determined from the DCI transported in the latest PDCCH for the same transport block not using "reserved field"). Here, a range of an MCS index that is not the "reserved field" may be changed according to the configured MCS table, for example, $0 \leq I_{MCS} \leq 28$ is indicated for an MCS table such as Table 13 or Table 14, $0 \leq I_{MCS} \leq 27$ is indicated for a case such as Table 15, Table 17, or Table 18, $0 \leq I_{MCS} \leq 26$ is indicated for a case such as Table 16 or Table 29, and $0 \leq I_{MCS} \leq 25$ is indicated for cases such as Table 26 to Table 28. One important point is that the "reserved field" guarantees that the same TBS or the same transport block is applied, but in general, does not guarantee that the same MCS combination, that is, the same modulation order and code rate combination, is applied to the same transport block. Therefore, it is also possible that a modulation order applied in initial transmission and a modulation order corresponding to the "reserved field" in retransmission are configured differently.

To describe the embodiment in detail, a procedure of communication between the base station and the UE is briefly summarized as follows.

Procedure of Initial Transmission and Retransmission Communication Between Base Station and UE (A) The UE performs appropriate channel estimation based on a reference signal transmitted from the base station, and transmits CSI or CQI information to the base station.

(B-1) The base station configures an appropriate MCS combination (a combination of a modulation order and a code rate) for the UE from the CSI or CQI information received from the UE, applies encoding and modulation to a data or transport block (or corresponding code block or code block group) to be transmitted, based on the configured MCS combination, and transmits a modulated signal to the UE. In addition, information on the MCS combination is transmitted to the UE, based on an MCS table, an MCS index, etc. via a control channel so that the UE is able to receive the modulation signal corresponding to the encoded data and perform demodulation and decoding. (The data or transport block, etc. to be transmitted may be simply expressed as PDSCH when described based on a physical channel, and therefore an operation of a transceiver may be expressed as encoding/decoding and modulation/demodulation of a PDSCH.)

(B-2) In order to transmit or receive the given data or transport block, the base station and the terminal may determine a transport block size (TBS) based on the indicated MCS combination, a configured resource amount, the number of layers, etc. The TBS may be determined based on $N_{info}$ described in embodiment 7, wherein the TBS may be determined using a table in which TBS candidate values are stored in advance according to the size of the $N_{info}$, or may be determined based on a predetermined calculation procedure. Currently, in 5G NR, when $N_{info} \leq 3824$, the TBS is determined using the table in which TBS candidate values are stored, and in other cases, the TBS value is determined based on the predetermined calculation procedure.

(C-1) The UE may receive a signal for initial transmission from the base station, perform demodulation based on the signal, successfully decode higher-layer signaling and the control channel to identify or determine parameters (e.g., $N_{RE}$, $Q_m$, R, and v) required to determine the TBS (or CBS) for the transmitted or received transport block (or corresponding code block or code block group), and then finally determine a TBS value based on the parameters. Among the parameters, values such as the modulation order or the code rate may be determined based on the configured MCS table, the indicated MCS index, and the like.

(C-2) Based on the determined TBS value and code rate values, a base matrix (or base graph) corresponding to parity check matrices of an LDPC code for performing LDPC encoding or decoding may be determined. When segmentation of the transport block is performed according to the determined TBS, the determined base matrix (graph), the number of CRC bits added to the transport block (when TBS>3824, a 24-bit CRC is added, and otherwise, a 16-bit CRC is added), and the determined size of the TBS, the parity check matrix of the LDPC code required to perform LDPC encoding may be determined based on at least some or all of values, such as the number of code blocks obtained by segmentation and the number of CRC bits added to the code blocks (e.g., the code block CRC is configured to be 24 bits). In this case, the parity check matrix may be determined based on a lifting size (Z) value which is a parameter required to perform LDPC encoding or decoding and directly corresponds to the size of the parity check matrix. (For a detailed encoding procedure, reference is made to the 5G NR standard specification of 3GPP TS 38.212) The data is restored by performing LDPC decoding based on the determined parity check matrix and values (e.g., log likelihood (LLR) values) generated to be used as an input to a decoder, via a reception procedure including demodulation from the received signal corresponding to bits (in some cases, these bits are also referred to as input bits) constituting the data or transport block (or corresponding code block or code block group).

(C-3) If the data determined via the LDPC decoding is successfully restored (or if it is determined that the LDPC decoder has successfully restored the data, based on at least a part of an LDPC syndrome, a transport block CRC, or a code block CRC), the UE transfers an ACK signal to the base station, and if the data is not successfully restored, (or if it is determined that the LDPC decoder has failed to successfully restore data, based on at least a part of the LDPC syndrome, the transport block CRC, or the code block CRC), the UE transfers an NACK signal to the base station.

(D-1) When an ACK-related signal is received from the UE, the base station prepares a subsequent data or transport block (or corresponding code block or code block group) for new transmission, and if the base station fails to receive an ACK signal related to data transmitted from the UE (that is, if an NACK-related signal is received or no feedback is received), the base station prepares to retransmit the previously transmitted data or transport block (or corresponding code block or code block group). Since retransmission is performed based on the same transport block as that for initial transmission, the TBS is also naturally the same.

(D-2) For retransmission, the modulation order and the code rate may be the same as those for initial transmission, but do not necessarily have to be the same. Therefore, when retransmitting the data, the base station may indicate, via an MCS index of the configured MCS table, the modulation order and the code rate which have been used. In this case, the MCS index may be the same as or different from the MCS index used in initial transmission. For example, for initial transmission, the base station may configure the MCS index corresponding to the MCS combination, which does not necessarily correspond to a "reserved field," and transmits the MCS index to the terminal, while, for retransmission, the base station may configure the MCS index corresponding to the "reserved field." In this case, the base station and the UE considers that the TBS of the retransmission is the same as that for the initial transmission, but a value of modulation order $Q_{reTx}$ indicated by the MCS index of retransmission may be the same as or different from a value of modulation order $Q_{initial}$ of initial transmission. However, when the modulation order is changed, while there is an advantage of obtaining optimal coding gain by utilizing the amount of allocated (or allocable) resources, new modulation needs be performed at a transmission end, which results in a problem of increased computational complexity and latency time, so that the value of modulation order $Q_{reTx}$ for retransmission may be configured to be the same as the value of modulation order $Q_{initial}$ for initial transmission.

(E-1) The UE performs demodulation based on a reception signal corresponding to retransmission, regenerates values to be used as inputs to the decoder, which correspond to bits constituting the data or transport block (or corresponding code block or code block group), and restores the data by performing LDPC decoding based on the generated values and the parity check matrix.

(E-2) In some cases, decoding may be performed after additionally applying chase combining or incremental redundancy (IR) combining. The chase combining or IR combining is a method of appropriately combining values generated based on demodulation of signals received in initial transmission or retransmissions, and refers to a technique used in HARQ. Typically, the chase combining refers to combining when substantially the same parity is transmitted for the same transport block (or code block) (e.g., when retransmission is performed by configuring the same RV during rate matching), and the IR combining refers to combining when substantially different parity is transmitted for the same transport block (or code block) (e.g., when retransmission is performed by configuring different RVs during rate matching), wherein, since the amount of parity transmitted during rate matching may be slightly different depending on the amount of resources allocated in initial transmission or retransmission of data, transmission of substantially the same or different parity may not refer to transmission of completely the same or different parity.

In addition, the values generated via the demodulation may be used as decoder input values, and especially, when the values are in the form of LLR, combining via a simple sum may be applied. If the base station or the UE is unable to perform demodulation due to a failure in interpretation of control information in initial transmission or some retransmissions so that decoder input values cannot be generated, combining may not be possible, and in this case, decoding may be performed based only on the generated values. In addition, when data restoration fails, retransmission may be repeated as many times as the number allowed by the system.

As in (C-3) of Procedure of initial transmission and retransmission communication between base station and UE, the UE transmits an NACK signal to the base station when the data is not successfully restored, and cases where the UE fails in successful data restoration may be divided into two cases: 1) when the terminal cannot perform appropriate data decoding due to a failure in acquisition of all or at least part of control channel information required for data decoding; and 2) when the control channel information required for data decoding has been acquired and appropriate data decoding has been performed, but decoding has failed.

For initial transmission (or immediately preceding retransmission), in the case of 1), if the UE fails to attempt to decode the data due to a failure in identification or acquisition of MCS information, and the base station configures an MCS index corresponding to the "reserved field" of the MCS table and retransmits the encoded data, the UE may likewise not be able to attempt to decode the data, or may perform incorrect decoding, making it impossible to restore the data. That is, if the UE fails to receive MCS-related information in initial transmission (or immediately preceding retransmission), data restoration is virtually impossible even if the base station performs retransmission by indicating the "reserved field." In order to solve such a problem, the disclosure proposes a method of first using an MCS index that does not correspond to the "reserved field" even for retransmission, and if this is not possible, using an MCS index corresponding to the "reserved field."

When the base station receives an NACK signal from the UE or fails to receive any feedback signaling related to ACK or NACK, the base station determines that the UE has failed to properly receive data, and prepares for retransmission. In this case, the UE may have actually failed to receive data or control information for a corresponding PDSCH, and the UE may have received the control information but only failed to decode the data or the corresponding PDSCH. In addition, the UE may have successfully decoded the data or the corresponding PDSCH and transmitted an ACK signal, but the base station may not have received the signal corresponding to ACK because a UL RF characteristic of the UE is very poor. As such, various situations may occur, but since the base station has difficulty in accurate determination on various situations, such as having difficulty in distinguishing whether a UL itself is erased (erasure or loss) or discontinuous transmission (DTX) has occurred to the UL, it is desirable to consider that the UE has failed to receive the data or PDSCH, and prepare for retransmission.

FIG. 10 illustrates an example of a method for a base station to determine an MCS index for retransmission according to an embodiment of the disclosure.

First, hereinafter, a method for a base station to determine an MCS index for retransmission is described. The base station may identify whether retransmission is necessary after initial transmission. The base station may identify that retransmission is necessary when the base station receives an NACK signal for initial transmission from a terminal or fails to receive feedback signaling.

In addition, the base station may identify at least one MCS combination corresponding to the same TBS value as a TBS value of initial transmission, based on information assigned (or assignable) for retransmission. For example, while changing an MCS combination of an MSC table (modulation order (Q) and code rate (R) included in "configured MCS table" or "MCS table to be configured") configured (or to be configured) for a resource amount (the number of RBs or $N_{RE}$) and the number (v) of layers, the base station may identify at least one MCS combination corresponding to the same TBS value as the TBS value of initial transmission.

In addition, the base station may perform retransmission using an MCS index corresponding to one of the identified at least one MCS communication. When multiple MCS combinations exist, the base station may select one thereof according to a predetermined rule in the system, and determine the selected one as an MCS index for retransmission. A detailed description will be provided later.

When there is no MCS combination corresponding to the same TBS value as the TBS value of initial transmission, the base station may perform retransmission using an MCS index corresponding to a modulation order to be used for retransmission among MCS indexes corresponding to a reserved field. For example, the base station may perform retransmission using the MCS index corresponding to the modulation order used in initial transmission among the MCS indexes corresponding to the reserved field.

Various embodiments may be applied to the method of identifying the at least one MCS combination, and a detailed description will be described below.

First, referring to FIG. 10, in operation 1010, the base station may calculate a TBS for at least one MCS combination, based on information assigned (or assignable) for retransmission. For example, the base station calculates the TBS while changing an MCS combination of an MSC table (modulation order (Q) and code rate (R) included in "configured MCS table" or "MCS table to be configured") configured (or to be configured) for a resource amount (the number of RBs or $N_{RE}$) and the number (v) of layers.

In addition, the base station may compare, in operation 1020, whether a TBS value of initial transmission is the same as the calculated TBS value. If there is one or more identical cases, in operation 1030, the base station may configure at least one of MCS combinations, which corresponds to the same TBS value as the TBS value of initial transmission, to be an MCS index for retransmission so as to perform retransmission.

That is, the base station may calculate TBS values for at least some or all of the MCS combinations, identify the MCS combination corresponding to the same TBS value as the TBS value of initial transmission, and configure the identified MCS combination as the MCS index for retransmission so as to perform retransmission.

Alternatively, the base station may calculate a TBS value for one MCS combination, perform an operation of identifying whether the calculated TBS and the TBS value of initial transmission are the same, and perform an operation of identifying the MCS combination corresponding to the same TBS value as the TBS value of initial transmission. In this case, the base station may stop the operations above when the MCS combination corresponding to the same TBS value as the TBS value of initial transmission is identified, or the base station may perform the operations above for all MCS combinations. However, the above-described method is merely an example for identifying the MCS combination corresponding to the same TBS value as the TBS value of initial transmission, and various methods may be used to identify the MCS combination corresponding to the same TBS value as the TBS value of initial transmission.

In operation 1030, although it is expressed as retransmission for distinguishment from initial transmission, the base station may transmit parameters required for the UE to perform decoding to the terminal in substantially the same way as initial transmission (or immediately preceding retransmission). That is, the base station may transmit the MCS index via control information for retransmission, and perform retransmission based on the same.

The UE may determine whether the same transport block as that for initial transmission (or immediately preceding retransmission) has been transmitted, by referring to whether NDI values are toggled, etc., and even if information, such as the MCS combination or TBS, cannot be properly received in initial transmission (or immediately preceding retransmission), the MCS combination, the TBS, etc. may be determined as if initial transmission were performed. If the terminal has properly received the MCS combination, the TBS, or the like in initial transmission (or immediately preceding retransmission), calculation of a TBS value for retransmission may be omitted. Of course, it is also possible to always calculate a TBS value, and if a TBS value different from the TBS calculated in initial transmission (or immediately preceding retransmission) is determined, it may be determined that other data or PDSCH has been lost in the middle, so that the UE may perform decoding by considering transmission as initial transmission.

When none of the TBS values calculated in operation 1020 is the same as the TBS value of initial transmission (or immediately preceding retransmission or if there is no MCS combination corresponding to the same TBS value as the TBS value of initial transmission), an MCS index, which corresponds to a modulation order to be applied for retransmission among MCS indexes corresponding to the "reserved field" in a configured (or to be configured) MCS table, is configured to perform retransmission, in operation 1040. In this case, in the system in which the modulation order of initial transmission and the modulation order of retransmission are the same, an MCS index that is the same as the modulation order of initial transmission among the MCS indexes corresponding to the "reserved field" may be configured.

The MCS index determination procedure for retransmission shown in FIG. 10 may be summarized in more detail as follows.

Procedure of MCS Index Determination for Retransmission

Operation 1) A TBS value for retransmission is calculated based on information (e.g., a resource amount (the number of RBs, $N_{RE}$, or the like), the number (v) of layers, and an MCS combination ((Q(i), R(i))) included in a configured (or to be configured) MCS table) assigned (or assignable) for retransmission. Here, an MCS combination used to calculate an i-th TBS is expressed as (Q(i), R(i)) for convenience.

Operation 2) If there is an MCS combination (Q(i), R(i)) where the TBS for retransmission, which is calculated in operation 1), is the same as the TBS of initial transmission (or immediately preceding retransmission), the base station determines, as an MCS index for retransmission, an MCS index corresponding to the MCS combination (Q(i), R(i)). If there are multiple MCS combinations, for which the same TBS value as that of initial transmission is determined, the base station may select one of the multiple MCS combinations according to a predetermined rule in the system, and determine the selected one as the MCS index for retransmission.

In addition, the MCS index determined for retransmission may be determined to be one of integers from 0 to 28 when an MCS table with a minimum modulation order of 2 and a maximum modulation order of 6 as shown in Table 13 or Table 14 is configured, the MCS index may be determined to be one of integers from 0 to 27 when an MCS table with a minimum modulation order of 2 and a maximum modulation order of 8 as shown in Table 15 is configured, the MCS index may be determined to be one of integers from 0 to 26 when an MCS table with a minimum modulation order of 2 and a maximum modulation order of 10 as shown in Table 16 is configured, the MCS index may be determined to be one of integers from 0 to 25 when an MCS table with a minimum modulation order of 2 and a maximum modulation order of 12 as shown in Table 26 to Table 28 is configured, and the MCS index may be determined to be one of integers from 0 to 26 when an MCS table with a minimum modulation order of 4 and a maximum modulation order of 12 as shown in Table 29 is configured.

Operation 3) If there is no MCS combination that satisfies operation 1) and operation 2), one of the MCS indexes corresponding to the "reserved field" in the configured (or to be configured) MCS table may be determined.

The MCS index determined for retransmission may be determined to be one of integers from 29 to 31 when the MCS table with the minimum modulation order of 2 and the maximum modulation order of 6 as shown in Table 13 or Table 14 is configured, the MCS index may be determined to be one of integers from 28 to 31 when the MCS table with the minimum modulation order of 2 and the maximum modulation order of 8 as shown in Table 15 is configured, the MCS index may be determined to be one of integers from 27 to 31 when the MCS table with the minimum modulation order of 2 and the maximum modulation order of 10 as shown in Table 16 is configured, the MCS index may be determined to be one of integers from 26 to 31 when the MCS table with the minimum modulation order of 2 and the maximum modulation order of 12 as shown in Table 26 to Table 28 is configured, and the MCS index may be determined to be one of integers from 27 to 31 when the MCS table with the minimum modulation order of 4 and the maximum modulation order of 12 as shown in Table 29 is configured. In particular, depending on a system configuration, the MCS index may be configured to be the same MCS index as that for the modulation order of initial transmission (or immediately preceding retransmission. For example:

If TBS for retransmission is the same as the initial TBS
Set the MCS index 0-28 (for Table 13 or Table 14), 0-27 (for Table 15), 0-26 (for Table 16 or Table 29), or 0-25 (for Table 26, Table 27, or Table 28), which is same as that for initial transmission.
Else
Set the MCS index 29-31 (table 1) or 28-31 (table 2) using the same modulation as initial transmission
End Procedure of MCS index determination for retransmission can always be applied, or can also be applied only in a predetermined situation, and can be variably applied. For example, Procedure of MCS index determination for retransmission may be applied according to a situation configured in the system, such as a situation of UL erasure or when NACK is received via a semi-static HARQ response. In addition, the procedure of MCS determination may be implemented in various methods. For example, based on the resource amount (the number of allocated or allocable RBs, $N_{RE}$, or the like), the TBS value of initial transmission (or previously calculated TBS value), and MCS combinations, buffer occupancy (BO) of bearers allocated (or allocable) for the same UE should be summed, and a sum value and a predetermined reference value should be compared to determine whether the sum value is smaller or larger, wherein, for retransmission, a procedure of recalculating the TBS via Procedure of MCS index determination for retransmission or a part of the procedure, and if the recalculated TBS is the same as the TBS of initial transmission, determining a corresponding MCS combination as a new MCS combination for retransmission may be implemented. (Here, only bearers related to the allocated or allocable amount of resources may be considered.) In this case, the base station may calculate the TBS value while changing (i.e., an operation of changing to a combination with higher spectral efficiency, or changing to a combination with lower spectral efficiency) the MCS combination according to the BO, and repeat a similar procedure until a case of the same TBS value as that of initial transmission is found. In addition, for A6G (or FR2), PTRS information may be additionally used to determine the sum of BO, or in order to obtain a changed MCS combination, DMRS information, for example, information such as an allocable PDSCH symbol length excluding all or at least some of Gap, CSI-RS PDCCH, PUCCH, DMRS, etc. (allocable PDSCH symbol length excluding Gap, CSI-RS PDCCH, PUCCH, and DMRS) may be used. In the procedure, even if an MCS combination is determined in advance, an updated, overwritten, or changed MCS combination may be determined as the MCS combination for retransmission in various ways. Of course, for retransmission, if there is no MCS combination for determination of the same value as the TBS of initial transmission, the MCS index corresponding to the "reserved field" of the MCS table is used. For example:

Input: RB, TBS, MCS
    sum BO of allocated bearers with same UE (consider only bearers with allocated RB)
(A6G) PTRS information
    DMRS information:
Allocable PDSCH symbol length excluding Gap, CSI-RS PDCCH, PUCCH and DMRS.
Output: MCS When there are multiple MCS combinations satisfying the conditions in operation 2 of Procedure of MCS index determination for retransmission, the predetermined rule for determining one MCS thereof may be configured in various ways depending on the system.

For example, when an MCS combination satisfying the conditions is obtained, the MCS combination may be determined as the MCS index without having to perform calculation on other MCS combinations, and if there are multiple MCS combinations satisfying the conditions, determination may be made according to the predetermined rule depending on the system, such as determining, as the MCS index, highest spectral efficiency or lowest spectral efficiency. In addition, when parameters corresponding to the amount of allocated (or allocable) resources, such as the number of RBs or $N_{RE}$ and overhead, are configured identically and the amount of allocated (or allocable) resources is the same as that for initial transmission (or immediately preceding retransmission), recalculation of the TBS while changing the MCS combination may be omitted, and the same MCS combination as that for initial transmission may be configured to be the MCS combination for retransmission. In general, since TBS values have discrete integer values rather than continuous integer values, if there is no significant difference in the amount of allocated (or allocable) resources, the same TBS value may also correspond to the same MCS index for initial transmission (or immediately preceding retransmission).

For convenience, for a more detailed description, when the MCS index for initial transmission is referred to as MCS(i) and a greatest index that does not correspond to the "reserved field" in the configured MCS table is referred to as MCS(max), an MCS combination enabling TBS to be the same as the TBS of initial transmission may be searched for while changing the MCS according to various methods as follows.

Method 1

MCS(i), MCS(i+1), . . . , MCS(max), MCS(i−1), MCS (i−2), . . . , 0

For each MCS combination, the TBS is calculated in the sequence above.

Method 2

MCS(i), MCS(i−1), . . . , 0, MCS(i+1), MCS(i+2), . . . , MCS(max)

For each MCS combination, the TBS is calculated in the sequence above.

Method 3

MCS(i), MCS(i−1), MCS(i+1), MCS(i−2), MCS (i+2), . . . .

or MCS(i), MCS(i+1), MCS(i−1), MCS(i+2), MCS (i−2), . . . .

Method 4

MCS(0), MCS(1), MCS(2), . . . , MCS(max)

or MCS(max), MCS(max-1), MCS(max-2), . . . , MCS(0)

For each MCS combination, the TBS is calculated in sequence above. (However, when index 0 or MCS(max) appears, each index smaller than index 0 or greater than MCS(max) is ignored.)

Of course, the methods above are merely examples, and not only various methods can be used but also respective methods can be combined and applied for testing of MCS combinations.

In addition, Procedure of MCS index determination for retransmission can also be implemented in a very simplified form applied only to a specific situation. For example, rather than repeatedly calculating the TBS while changing the MCS, the TBS may be configured to be the same as that for an MCS combination of initial transmission, or when a specific MCS combination is determined from BO, PTRS, or DMRS-related information in Procedure of MCS index determination for retransmission, if a TBS value for the specific MCS is the same as the TBS value of initial transmission, an MCS index corresponding to the specific MCS combination may be configured to be the index for retransmission, and otherwise, an MCS index corresponding to the "reserved field" may be directly configured for retransmission without repeatedly calculating the TBS while changing the MCS.

In Procedure of MCS index determination for retransmission, the method of MCS index determination based on "the same TBS as that of initial transmission" is described. However, in 5G NR, a TBS affects a channel coding application scheme as in Method of selecting a base graph (or base matrix), so that there may be additional conditions that need to be considered.

For example, according to Method of selecting a base graph (or base matrix), when 292<TBS≤3824 is satisfied, in order to perform LDPC encoding and decoding according to code rate R, BG(1) or its corresponding parity check matrix may be selected, and BG(2) or its corresponding parity check matrix may be selected. That is, if R≤0.67 is satisfied, LDPC encoding and decoding are performed based on BG(2) or its parity check matrix, and if R>0.67 is satisfied, LDPC encoding and decoding are performed based on BG(1) or its corresponding parity check matrix.

As a specific example, it is assumed that, for initial transmission and retransmission, an MCS table including cases where (modulation order, code rate) combinations are (6, 873/1024) and (8, 682.5/1024) are configured as shown in MCS indexes 19 and 20 in Table 15, MCS indexes 14 and 15 in Table 16, or MCS indexes 11 and 12 in Table 29. For convenience, when it is assumed that, if initial transmission and retransmission have the same amount of allocated resources, which is $N_{RE}$=210, and have the same configured number of layers, which is v=1, a value of $N_{info}$=$N_{RE}$·$Q_m$·R·v required for TBS determination may be $N_{info}$≅1074 for a (6, 873/1024) MCS combination and may be $N_{info}$≅1119 for a (8, 682.5/1024) MCS combination. However, both cases have the same TBS (TBS=1128) according to 3GPP 5G NR specification TS 38.214. The (6, 873/1024) MCS combination has a code rate greater than 0.67, and thus LDPC encoding and decoding needs to be performed based on BG(1) or its corresponding parity check matrix, and the (8, 682.5/1024) MCS combination has a code rate smaller than 0.67, and thus LDPC encoding and decoding needs to be performed based on BG(2) or its corresponding parity check matrix. Accordingly, when base matrices are different, LDPC matrices for LDPC encoding or decoding are also different, and therefore, even if LDPC encoding has been performed on the same transport block (or code block), parity bits are different from each other, so that chase combining, IR combining, or the like may not be possible. However, since the encoded transport block (or code block) is the same, chase combining, etc., may be possible for a reception signal corresponding only to the transport block (or code block), except for parity. However, for 5G NR channel coding, bits that are twice a lifting size (Z) which is an LDPC encoding or decoding parameter are not transmitted to a receiver in the transport block (or code block), so that chase combining (or LLR combining) may be omitted for bits corresponding to 2*Z. In addition, when the base matrices are changed as described above, the lifting size may also be changed, in which case, a length of bits that are not transmitted in the transport block may vary, such as $2*Z_1$ and $2*Z_2$, so that combining of at least $2*\min(Z_1, Z_2)$ bits is not possible.

In this way, during the initial transmission or retransmission, when the base matrices or the corresponding parity check matrices for LDPC encoding or decoding are changed, chase combining, IR combining, or the like is difficult, so that encoding gain obtainable via retransmission is not large. Therefore, when the system is configured so that the base matrix is not changed during retransmission, a condition that the base matrix is not changed may be additionally considered also in Procedure of MCS index determination for retransmission. For example, when an MCS combination that satisfies having the same TBS is found, whether the base matrix is changed is identified, and then if the base matrix is changed, a condition that the MCS combination is neither determined nor updated may be added. In this system, for retransmission, the UE does not need to consider a case where the transport block is the same in initial transmission (or immediately preceding retransmission) but the base matrix (or its corresponding parity check matrix) used in LDPC encoding is changed. (A UE is not expected to receive a retransmission with a base matrix (or base graph) that is different from the last valid base matrix (or base graph) for this transport block.)

Therefore, if there is no MCS combination enabling the TBS calculated via Procedure of MCS index determination for retransmission to be the same TBS, or although such an MCS combination exists, if there is only a case where the base matrix is changed, an MCS combination corresponding to the "reserved field" may be configured. Of course, if there is only a case where the base matrix is changed, instead of configuring the MCS combination corresponding to the "reserved field," transmission may be regarded as initial transmission, and a scheme of performing encoding again using the changed base matrix and its corresponding parity check matrix so as to perform transmission may be applied. From the UE perspective, even if the transmission is retransmission, when the base matrix (or its corresponding parity check matrix) is changed, the UE may perform decoding by ignoring a corresponding reception signal or considering the transmission as initial transmission.

For the system that allows the base matrix (or its corresponding parity check matrix) to be changed during retransmission, both a decoding procedure and performance may vary according to a terminal implementation scheme. Although transmission is retransmission, if a base matrix (or its corresponding parity check matrix) is different, some terminals may consider the transmission as initial transmission and decode only a newly received signal, and some terminals may recognize that the transmission is retransmission, and improve decoding performance via partial chase combining.

As briefly described above, from the UE perspective, although decoding of an existing PDSCH for initial transmission fails, if parameter information required for decoding is successfully received, when a retransmission signal is received, decoding may be performed after performing chase combining or IR combining. If the parameter information required for PDSCH decoding cannot be identified or acquired via a reception signal corresponding to initial transmission (or immediately preceding retransmission), then regardless of whether an NDI is toggled, decoding needs to be performed also for retransmission after calculating a TBS via identifying of an MCS index as if initial transmission were received, wherein the identified MCS index is likely to be changed to a value different from the MCS index of initial transmission (or immediately preceding retransmission), so that, if demodulation is performed on the signal received during initial transmission (or immediately preceding retransmission), based on the MCS index acquired during retransmission, there is a possibility that the demodulation is performed incorrectly due to a mismatch of modulation orders. Therefore, when the parameter information required for decoding cannot be received during initial transmission (or immediately preceding retransmission), combining of a subsequent retransmission signal and the initial transmission (or immediately preceding retransmission) signal risks deterioration of decoding performance. In particular, at least modulation order information needs to be clear to enable proper demodulation, so that, when the modulation order is uncertain, it is desirable to omit chase combining or IR combining, and combine PDSCH decoding, based only on the newly received signal. However, if retransmission is configured to always use the same modulation order as that of initial transmission (or immediately preceding retransmission) on the system, it is clear that the same modulation order and the same TBS are configured, and therefore the reception signal of previous initial transmission (or immediately preceding retransmission), in which decoding parameter acquisition and PDSCH decoding have failed, can also be demodulated, so that combining may be possible after the demodulation.

It is assumed that initial transmission and its retransmission always use the same transport block, in a state where parameter information required for decoding has been successfully received one or more times via initial transmission or retransmission, a method of determining a TBS or determining a base graph (or base matrix), a parity check matrix, or the like, such as Method of selecting a base graph (or base matrix) may be omitted, and previously used decoding parameters may be used as there are. However, depending on a transmission/reception channel situation between the base station and the UE, if the UE fails to properly receive PDSCHs, which should have been received, and all the PDSCHs are lost, there is a possibility that the base station has performed new initial transmission. Therefore, even if complexity increases, in consideration of an exceptional situation, it is also possible for the terminal to always perform, each time parameters for decoding are received, all or at least a part of a procedure of determining a TBS value or determining a base graph (or base matrix), a parity check matrix, or the like, such as Method of selecting a base graph (or base matrix). If the calculated TBS is different from the TBS value identified in existing initial transmission (or immediately preceding retransmission), even if the NDI is indicated as retransmission (i.e., not toggled), it is desirable to consider transmission as new transmission.

In addition, the embodiment provides descriptions for the case where an MCS table is configured, but if the TBS is the same, there is no need to exclude changing of the MCS table. That is, when changing of the MCS table is also possible, an MCS combination having the same TBS as that of initial transmission may be searched for in MCS combinations included in an MCS table other than the currently configured MCS table, and in this case, signaling for the MCS table and an index corresponding to the MCS combination should be transmitted together. However, when the MCS table is changed, signaling for the MCS table may be transmitted via higher-layer signaling, and the index corresponding to the MCS combination may be transmitted via DCI. When the MCS table is changed as above, since higher-layer signaling needs to be identified, a latency time may slightly increase, so that considering of even MCS table switching to search for an MCS combination having the same TBS as that for initial transmission is preferably applied when supporting a service less sensitive to the latency time.

Although the embodiment provides description based on a PDSCH, an MCS may be configured via a similar procedure for DL and UL, and the embodiment may be applied to a PUSCH in a similar manner. That is, when the terminal is to perform PUSCH retransmission, the base station may perform a procedure similar to Procedure of MCS index determination for retransmission. However, because power efficiency is more important to the terminal than to the base station, if a new MCS combination is specified for retransmission, especially when a modulation order changes, modulation should be newly performed, and power efficiency may be thus reduced. Therefore, for a PUSCH, it may be more desirable for the base station to configure an MCS combination to have the same modulation order, or to configure an MCS combination corresponding to a "reserved field." For additional coding gain, a gain of approximately 3 dB may be obtained via chase combining by configuring the same RV value to perform retransmission, or a greater coding gain may be obtained via IR combining by configuring an RV value differently. However, when the terminal fails to acquire parameters, etc. (e.g., MCS combination, etc.) for encoding, which are transmitted via a control channel (e.g., PDCCH) in initial transmission or immediately preceding retransmission, UL transmission itself would not have occurred, so that, even if an MCS combination corresponding to the "reserved field" is reconfigured, retransmission may not be possible.

In addition, since the base station has knowledge of all about configurations of the terminal, even if the terminal fails to decode a reception signal which has been transmitted during initial transmission or immediately preceding retransmission to the base station, when demodulated data is stored, it is easy to improve decoding performance via combination, such as chase combining or IR combining, with a reception signal transmitted via retransmission. Typically, even if coding gain obtained via chase combining or IR combining is not very large, a decoding success rate after combining of a retransmitted reception signal is very high, so that, for a UL, constraint on the amount of resources allocated for retransmission may be low. That is, if a TBS is the same, a probability of decoding success is very high even if an MCS index with relatively high spectral efficiency is selected, so that it may be more advantageous to determine an MCS combination with fewer resources by considering the probability of decoding success. (In $N_{info}=N_{RE} \cdot Q_m \cdot R \cdot v$, when a $Q_m \cdot R$ value is high, an $N_{RE}$ value to obtain a similar value has a characteristic of being small.) This fact is more advantageous for a UL because the base station has accurate knowledge of all decoding parameters. However, also for a DL, despite the possibility of losing decoding parameters, a decoding success rate after combining of a reception signal is still very high, so that it may not be a big problem even if an MCS combination has higher spectral efficiency than initial transmission. However, when decoding parameters are not obtained during initial transmission or immediately preceding retransmission, performance degradation may occur due to difficulty in combining a reception signal, but the probability of this happening is very low. In conclusion, for the UL, depending on the purpose of the system, retransmission may be performed using a "reserved field" in consideration of latency or power efficiency, a new MCS combination which enables a TBS to be the same may be searched for with fewer resources, and both methods may be selectively applied depending on a situation. In the searching for a new MCS combination which enables a TBS to be the same via fewer resources, additional constraints, such as restricting a modulation order to be the same as that for initial transmission or excluding a combination in which a base matrix is changed, may be considered.

In addition, since the base station already has knowledge of a TBS, a target code rate, etc. of initial transmission, and thus has base matrix (or base graph) information used in initial transmission, there is no need to identify Method of selecting a base graph (or base matrix). However, when an HARQ situation occurs according to implementation of the system, the base matrix or parity check matrices may be selected again.

Various embodiments of the disclosure may be combined and interpreted. For example, since embodiments 1 to 7 provide various methods when using an MCS table for 1024 QAM or 4096 QAM, the embodiments may be combined and interpreted. In addition, embodiment 8 includes the content of determining a TBS value by using an MCS table, in which case, the MCS table may include an MCS table, etc. for 1024 QAM or 4096 QAM disclosed in other embodiments, and accordingly, it is easy for those skilled in the art to understand that the contents of embodiments 1 to 7 are applicable.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a base station in a wireless communication system, the method comprising:
   identifying at least one transport block size (TBS) value for retransmission, wherein the at least one TBS value is determined based on an amount of resources allocated for retransmission and at least one of modulation and coding scheme (MCS) combinations included in an MCS table and each of the MCS combinations includes a modulation order and a code rate;
   identifying, among the at least one of the MCS combinations, at least one MCS combination that corresponds to a TBS value equal to a TBS value of an initial transmission;
   identifying an MCS index for retransmission among the identified at least one MCS combination based on a sum of buffer occupancies of allocated bearers for a terminal;
   transmitting, to the terminal, control information including the identified MCS index; and
   performing a retransmission based on the control information.

2. The method of claim 1, further comprising, in case that no MCS combination corresponds to the TBS value equal to the TBS value of the initial transmission, identifying an MCS index for retransmission corresponding to a reserved field included in the MCS table.

3. The method of claim 2, wherein the MCS index for retransmission corresponding to the reserved field corresponds to a modulation order of the initial transmission.

4. The method of claim 1, wherein identifying the MCS index for retransmission comprises identifying an MCS index having a highest spectral efficiency.

5. The method of claim 1, wherein, among the at least one of the MCS combinations, the at least one MCS combination corresponds to a base matrix of the initial transmission.

6. The method of claim 1, wherein, for frequency range 2 (FR2), the sum of the buffer occupancies of the allocated bearers is identified based on a phase tracking reference signal (PTRS).

7. A base station in a wireless communication system, the base station comprising:

a transceiver; and a controller coupled to the transceiver and configured to:

identify at least one transport block size (TBS) value for retransmission, wherein the at least one TBS value is determined based on an amount of resources allocated for retransmission and at least one of modulation and coding scheme (MCS) combinations included in an MCS table and each of the MCS combinations includes a modulation order and a code rate, identify, among the at least one of the MCS combinations, at least one MCS combination that corresponds to a TBS value equal to a TBS value of an initial transmission, identify an MCS index for retransmission among the identified at least one MCS combination based on a sum of buffer occupancies of allocated bearers for a terminal, transmit, to the terminal, control information including the identified MCS index, and perform a retransmission based on the control information.

8. The base station of claim 7, wherein the controller is further configured to identify an MCS index for retransmission corresponding to a reserved field included in the MCS table, in case that no MCS combination corresponds to the TBS value.

9. The base station of claim 8, wherein the MCS index for retransmission corresponding to the reserved field corresponds to a modulation order of the initial transmission.

10. The base station of claim 7, wherein the controller is configured to:

identify an MCS index having a highest spectral efficiency.

11. The base station of claim 7, wherein, among the at least one of the MCS combinations, the at least one MCS combination corresponds to a base matrix of the initial transmission.

12. The base station of claim 7, wherein, for frequency range 2 (FR2), the sum of the buffer occupancies of the allocated bearers is identified based on a phase tracking reference signal (PTRS).

* * * * *